United States Patent [19]
Takeda

[11] Patent Number: 5,878,359
[45] Date of Patent: Mar. 2, 1999

[54] VEHICULAR CONTROL DEVICE PROVIDED WITH AN ACCELERATOR DETECTING DEVICE WHICH DETECTS THE OPERATION OF AN ACCELERATOR DEVICE

[75] Inventor: Toshihiko Takeda, Chiryu, Japan

[73] Assignee: Nipponsenso Co., Ltd., Kariya, Japan

[21] Appl. No.: 659,995

[22] Filed: Jun. 7, 1996

[30] Foreign Application Priority Data

Jun. 9, 1995 [JP] Japan ................................. 7-143554

[51] Int. Cl.⁶ .................................................. F02D 45/00
[52] U.S. Cl. ............................ 701/34; 701/107; 702/104
[58] Field of Search ............................. 701/22, 102, 110,
701/34, 107; 340/438, 439; 364/571.01,
571.02; 123/399; 702/94, 104

[56] References Cited

U.S. PATENT DOCUMENTS

| | | | |
|---|---|---|---|
| 4,519,360 | 5/1985 | Murakami | 123/399 |
| 4,566,418 | 1/1986 | Yamamoto et al. | 123/479 |
| 4,597,049 | 6/1986 | Murakami | 364/431.07 |
| 4,612,615 | 9/1986 | Murakami | 364/431.07 |
| 4,893,502 | 1/1990 | Kubota et al. | 73/118.1 |
| 4,979,117 | 12/1990 | Hattori et al. | 364/431.07 |
| 5,157,956 | 10/1992 | Isaji et al. | 73/1 D |
| 5,163,402 | 11/1992 | Taguchi et al. | 123/396 |
| 5,247,444 | 9/1993 | Arai et al. | 364/431.05 |
| 5,429,092 | 7/1995 | Kamei | 123/399 |
| 5,529,296 | 6/1996 | Kato et al. | 267/155 |
| 5,553,581 | 9/1996 | Hirabayashi et al. | 123/399 |
| 5,730,238 | 3/1998 | Tamaki et al. | 180/65.8 |

FOREIGN PATENT DOCUMENTS

| | | |
|---|---|---|
| 57-26232 | 2/1982 | Japan . |
| 61-8433 | 1/1986 | Japan . |
| 3-281970 | 12/1991 | Japan . |
| 5-99058 | 4/1993 | Japan . |
| 6-58342 | 8/1994 | Japan . |

Primary Examiner—Michael Zanelli
Attorney, Agent, or Firm—Pillsbury Madison & Sutro LLP

[57] ABSTRACT

An accelerator sensor detects an operation amount of an accelerator pedal. A microcomputer determines if a relation between the detected operation amount and an operation of the accelerator mechanism deviates from a predetermined normal relation, responsive to an ON signal from an idle switch or an ON signal from a power switch. When the relation deviates from the predetermined normal relation, the detected operation amount is corrected by the deviation from the predetermined normal relation in order to cause the relation between the operation amount and the operation of the accelerator mechanism to match the predetermined normal relation.

22 Claims, 40 Drawing Sheets

FIG. 14
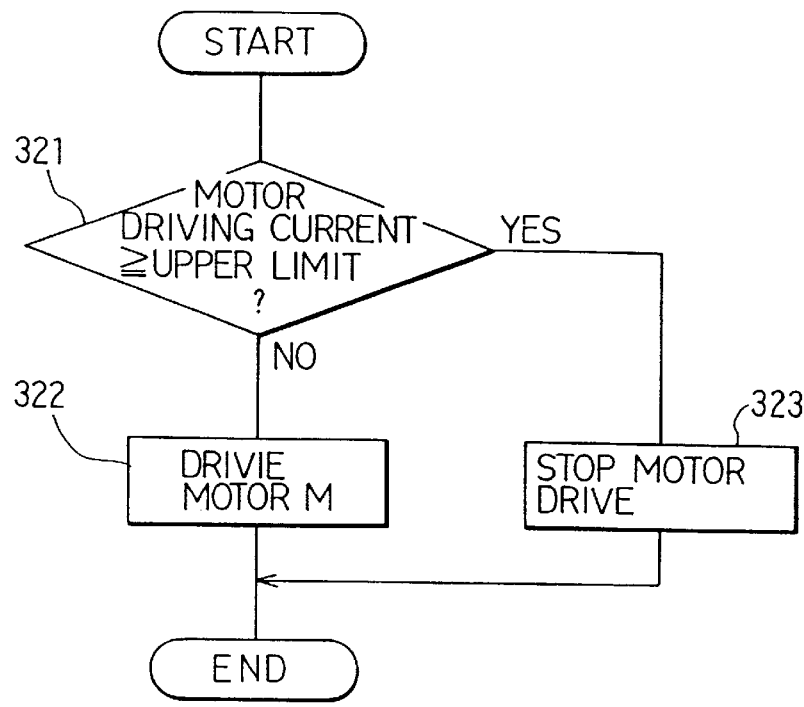
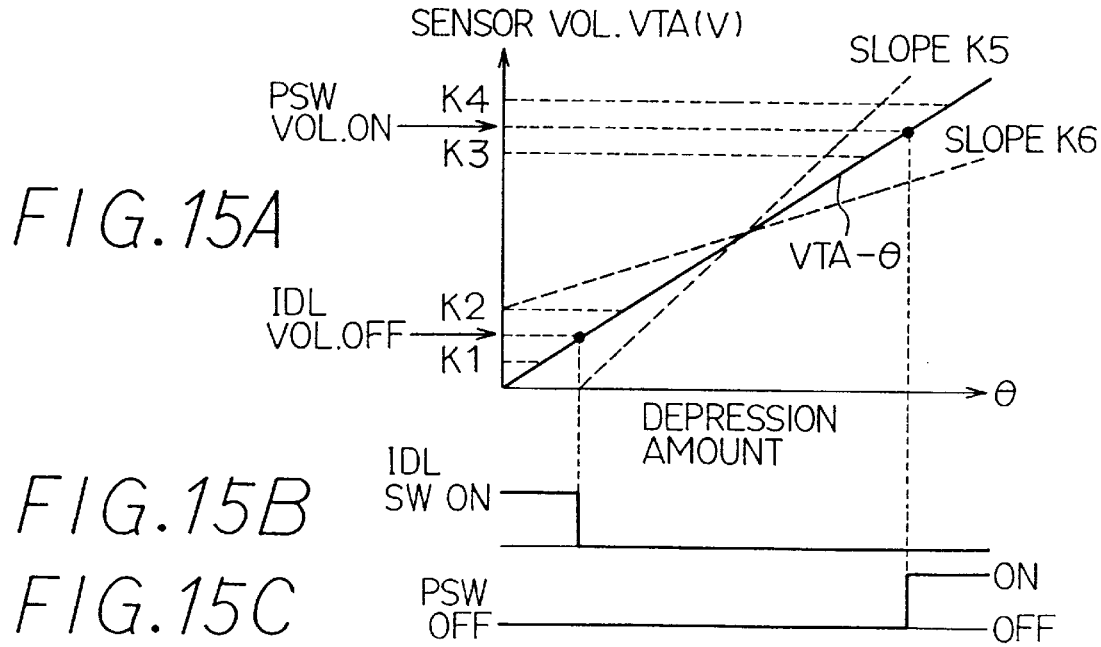
FIG. 15A
FIG. 15B
FIG. 15C

VEHICULAR CONTROL DEVICE PROVIDED WITH AN ACCELERATOR DETECTING DEVICE WHICH DETECTS THE OPERATION OF AN ACCELERATOR DEVICE

CROSS REFERENCE TO RELATED APPLICATION

This application is based upon and claims priority from Japanese Patent Application No. Hei 7-143554 filed Jun. 9, 1995, the contents of which are incorporated herein by reference.

BACKGROUND OF THE INVENTION

1. Field of the Invention

The present invention relates to a vehicular control device which detects the operation of an accelerator device (such as an accelerator pedal or a throttle valve) performed by a driver and controls an electric motor or an internal combustion engine of a vehicle responsive to the detected operation of the accelerator device.

2. Related Art

Japanese Patent Application Laid-Open No. Hei 5-99058 discloses that, in an electric motor vehicle, two accelerator sensors are provided. The accelerator sensors detect the amount that an accelerator pedal is depressed and generate output voltages corresponding to the detected depression of the accelerator pedal. The electrical motor is controlled based on a lower output voltage ACL (=min (ACL1, ACL2)) of the two output voltages ACL1, ACL2 generated by the accelerator sensors.

The accelerator sensor can be formed by a Hall element. The Hall element magnetically detects the depression of the accelerator pedal and changes the magnetically-detected amount into a voltage signal. The voltage signal generated by the Hall element is fed to a signal processing circuit. The signal processing circuit has a standard voltage generating circuit which generates a standard voltage. The standard voltage is set to an intermediate voltage value between maximum and minimum voltages that the signal processing circuit can generate. The signal processing circuit amplifies the voltage signal from the Hall element. Accordingly, the signal processing circuit generates a maximum voltage when the accelerator pedal is fully depressed and generates a minimum voltage when the accelerator pedal is not depressed.

When moisture, dust or the like affects the signal processing circuit, the signal processing circuit may malfunction. In this case, the signal processing circuit may generate an output voltage fixed at an intermediate voltage value, or the relationship between the output voltage and the change in the accelerator pedal depression, i.e. the sensitivity of the accelerator sensor, abnormally increases or decreases.

For example, in the case where an output voltage ACL1 is fixed at an intermediate voltage value as shown in FIG. 41A, the selected output voltage ACL follows the output voltage ACL1 after the depression of the accelerator pedal reaches half-way to the fully depressed position. Accordingly, even if a driver depresses the accelerator pedal, the vehicle does not accelerate responsive to the operation.

In the case where the change of the output voltage ACL1 caused by a change of the accelerator pedal depression abnormally increases as shown in FIG. 41B, the selected output voltage ACL follows the output voltage ACL1 until the output voltage ACL1 goes beyond a normal output voltage ACL2. Accordingly, even if a driver begins to depress the accelerator pedal, since the output voltage ACL1 is zero until the accelerator pedal is depressed to a certain amount, a vehicle cannot be accelerated. After that, since the output voltage ACL1 is rapidly boosted, the vehicle suddenly accelerates. Therefore, the driver can sense that the acceleration operation is abnormal.

Finally, in the case where the change of the output voltage ACL1 caused by a change of the accelerator pedal depression abnormally decreases as shown in FIG. 41C, the selected output voltage ACL follows the output voltage ACL1 after the output voltage ACL1 goes below a normal output voltage ACL2. Accordingly, even if a driver depresses the accelerator pedal, the driver does not obtain a sufficient acceleration of the vehicle. The driver can sense abnormal operation in this case as well.

If only one accelerator sensor is provided for a vehicular control device and the signal processing circuit malfunctions, an abnormal output voltage will be used in the vehicular control device. Consequently, the vehicular control device cannot properly control the vehicle.

SUMMARY OF THE INVENTION

The present invention is made in light of the foregoing problems, and it is an object of the present invention to provide a vehicular control device which can control an electrical motor or an internal combustion engine of a vehicle based on an output voltage corresponding to a depression of an accelerator device detected by an accelerator detecting device even when the output voltage is abnormal.

For attaining the object, the present invention has an accelerator detecting device which detects the amount that an accelerator mechanism is operated without contacting the accelerator mechanism and a control device which controls a driving power generating device for a vehicle based on the detected operating amount. The control device has a predetermined position detecting device which detects when the accelerator mechanism is moved to a predetermined position. The control device determines whether the operation amount detected by the accelerator detecting device is abnormal based on the operation amount of the accelerator mechanism detected when the predetermined position detecting device detects the predetermined position of the accelerator mechanism. The detected operation amount is corrected responsive to a difference of the operation amount detected when the accelerator mechanism is moved to the predetermined position and a predetermined normal operation amount at that time, when it is determined that the detected operation amount is abnormal. The control device controls the driving power generating device as a function of the corrected operation amount detected by the accelerator detecting device.

Therefore, since the driving power generating device is controlled based on the corrected operation amount, even if the detected operation amount is abnormal, the running state of the vehicle can be safely and properly controlled without sudden acceleration or sudden deceleration.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 14 is a flow chart illustrating a detailed routine for restraining the power to an electrical motor;

FIG. 15A is a graph illustrating a relation between an accelerator pedal depression amount and a sensor output voltage;

FIG. 15B is a waveform diagram illustrating relations between accelerator pedal depression and an output signal of an idle switch;

FIG. 15C is a waveform diagram illustrating relations between accelerator pedal depression and an output signal of a power switch;

DETAILED DESCRIPTION OF THE PREFERRED EMBODIMENTS

Preferred embodiments of a vehicular control device of the present invention will now be described in detail with reference to the drawings.

(First Embodiment)

Figure 1:
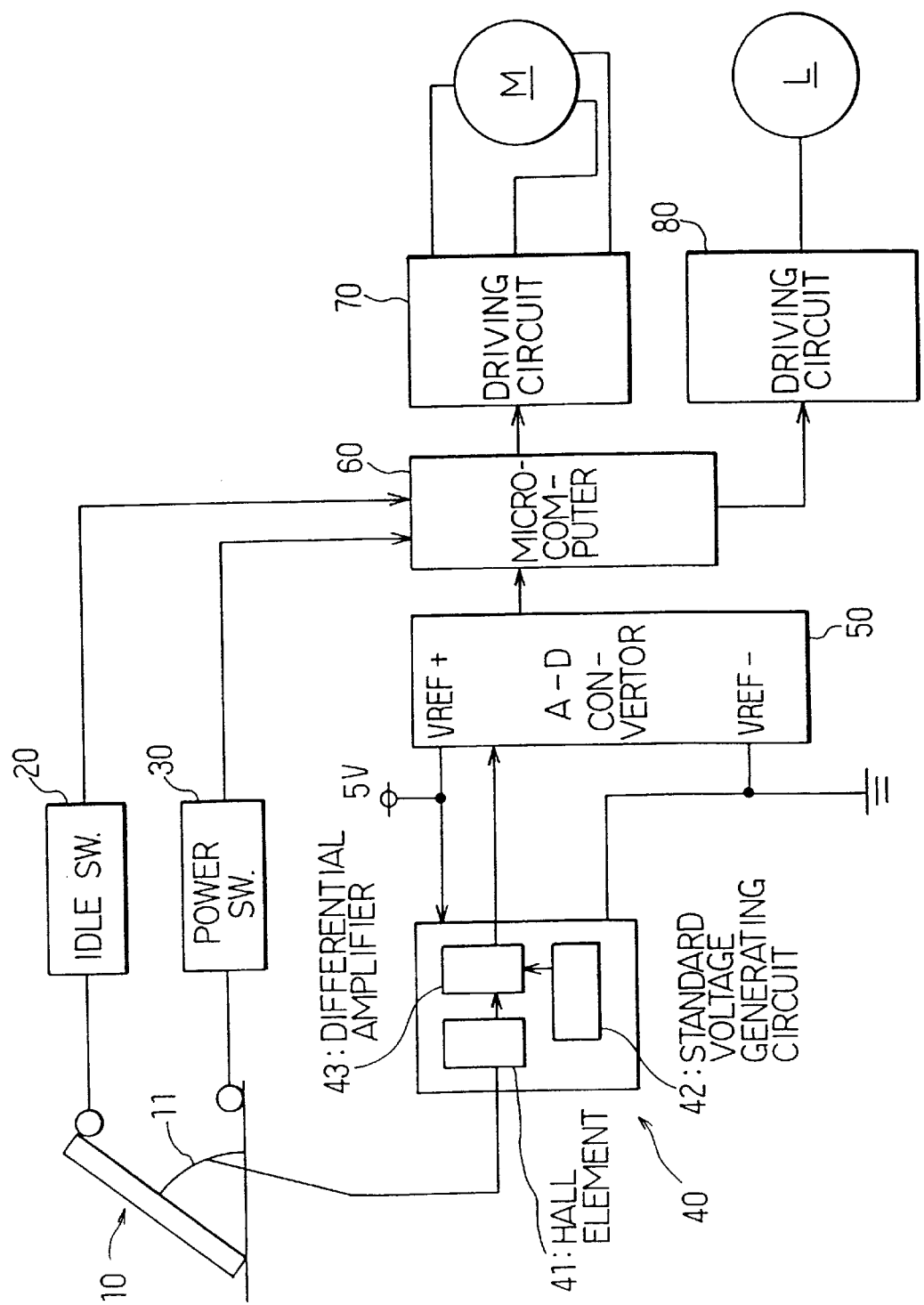
FIG. 1 is a block diagram illustrating a vehicular control device according to a first embodiment of the present invention.

FIG. 1 shows a structure of a first embodiment. In the first embodiment, the present invention is applied to an electrical vehicle control device. The electrical vehicle is provided with an electrical motor M (hereinafter, motor M) An output power of motor M varies corresponding to a depression amount θ of an accelerator pedal 10. Accelerator pedal 10 is supported by a link 11 in a state of being tilted on an interior floor and being depressible.

A control device has an idle switch (IDLSW) 20, a power switch (PSW) 30 and an accelerator sensor 40. As shown in FIG. 15B, IDLSW 20 is on when a depression amount θ of accelerator pedal 10 is zero, and turns off when accelerator pedal 10 is depressed. It should be noted that IDLSW 20 remains in an "on" state immediately after accelerator pedal 10 is depressed, because of play in link 11.

As shown in FIG. 15C, PSW 30 turns on when a depression amount θ of accelerator pedal 10 reaches a maximum depression amount θmax and turns off when accelerator pedal 10 is released from a position corresponding to the maximum depression amount θmax. PSW 30 has an insensitive range with regard to the operation of accelerator pedal 10 for the same reason as IDLSW 20.

Accelerator sensor 40 is composed of a Hall element 41, a standard voltage generating circuit 42 and a differential amplifier 43 connected to Hall element 41 and standard voltage generating circuit 42.

Hall element 41 is placed adjacent to a magnet (not shown) attached to a rod (not shown) which rotates responsive to a movement of link 11. Hall element 41 magnetically detects a rotation of the magnet without contacting the magnet and changes the detected magnet rotation into a voltage signal. The magnet rotates in a range of ±90 degrees starting from an intermediate value of the accelerator pedal depression amount (θmax/2).

Standard voltage generating circuit 42 generates a standard voltage which is equivalent to an intermediate voltage value between a maximum voltage and a minimum voltage in a voltage range over which voltage signals from Hall element 41 are amplified. Differential amplifier 43 differentially amplifies a voltage signal from Hall element 41 with respect to the standard voltage in order to generate a sensor voltage VTA.

The sensor voltage VTA varies in proportion to a depression amount θ of accelerator pedal 10 (See line VTA-θ in FIG. 15A). The range of the sensor voltage VTA is from 0(V) to 5(V). As shown in FIG. 15A, the sensor voltage VTA when IDLSW 20 turns on or off is shown as an IDL OFF voltage, and the sensor voltage VTA when PSW 30 turns on or off is shown as a PSW ON voltage.

The control device further has an analog-digital (A/D) convertor 50 connected to accelerator sensor 40 and a microcomputer 60 connected to IDLSW 20, PSW 30, and A/D convertor 50. A/D convertor 50 converts a sensor voltage VTA from accelerator sensor 40 to a digital signal and feeds the digital signal to microcomputer 60.

Microcomputer 60 performs computer programs according to flow charts shown in FIGS. 2 to 14 in order to control driving circuits 70 and 80 which drive motor M and an alarm light L, respectively, based on output signals from IDLSW 20 and PSW 30 and a digital signal from A/D convertor 50. Alarm light L is turned on at a time when accelerator sensor 40 is determined to be abnormal. The computer programs are stored in read only memory (ROM) of microcomputer 60 in advance.

Hereinafter, the process executed by microcomputer 60 is explained with reference to flow charts shown in FIGS. 2 to 14.

Figure 2:
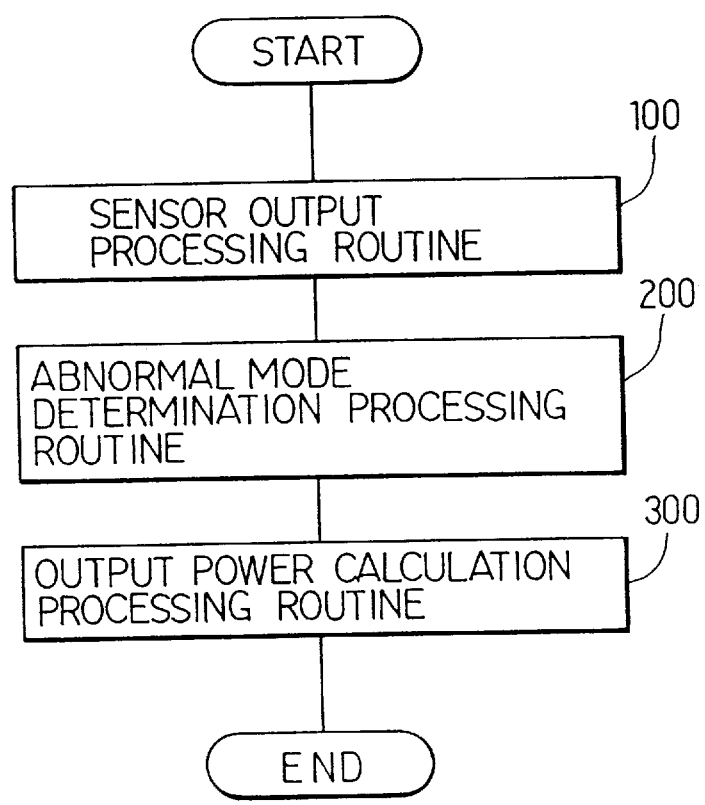
FIG. 2 is a flow chart illustrating the process performed by a microcomputer shown in FIG. 1.

When microcomputer 60 begins to execute the process according to the stored computer program, a sensor output processing routine 100 shown in FIG. 2 is firstly executed. The sensor output processing routine 100 is described in detail in FIG. 3.

Figure 3:
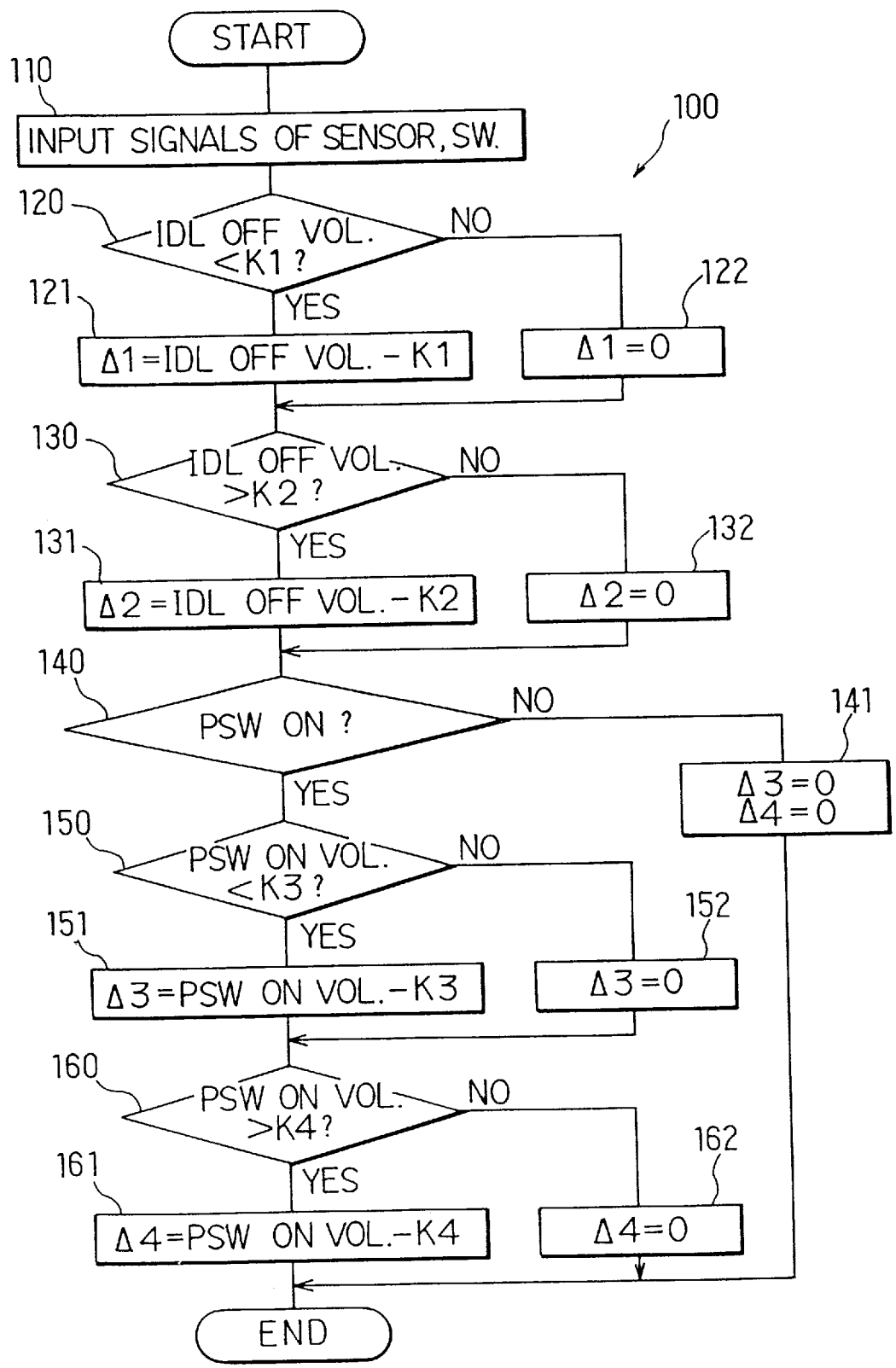
FIG. 3 is a flow chart illustrating a detailed routine for processing an output of a sensor.

In FIG. 3, output signals from IDLSW 20 and PSW 30 and a sensor voltage VTA converted into a digital signal by A/D convertor 50 are fed to microcomputer 60 at step 110. An IDL OFF voltage which is a sensor voltage when IDLSW 20 turns off is compared with a constant value K1 (See FIG. 15A) at step 120. If the IDL OFF voltage is less than the constant value K1, a correction value Δ1 is derived from the following equation (1) at step 121.

$$\Delta 1 = \text{IDL OFF voltage} - K1 \quad (1)$$

On the contrary, if at step 120, it is determined that the IDL OFF voltage is greater than or equal to the constant value K1, the correction value Δ1 is set to zero at step 122. The correction value Δ1 indicates the magnitude by which the IDL OFF voltage deviates toward the minus direction from an allowable range (from K1 to K2) in FIG. 15A. The correction value Δ1 is used to correct the detected sensor voltage VTA.

At step 130, the IDL OFF voltage is compared with a constant value K2 (See FIG. 15A). If the IDL OFF voltage is more than the constant value K2, a correction value Δ2 is derived from the following equation (2) at step 131.

$$\Delta 2 = \text{IDL OFF voltage} - K2 \quad (2)$$

On the contrary, if at step 130, it is determined that the IDL OFF voltage is less than or equal to the constant value K2, the correction value Δ2 is set to zero at step 132. The correction value Δ2 indicates the magnitude by which the IDL OFF voltage deviates toward the plus direction from an allowable range (from K1 to K2) in FIG. 15A. The correction value Δ2 is also used to correct the detected sensor voltage VTA.

Next, it is determined at step 140 if PSW 30 is on as a result of accelerator pedal 10 being fully depressed. When a negative determination is made, correction values Δ3 and Δ4 are set to zero at step 141. On the contrary, when an affirmative determination is made at step 140, a PSW ON voltage which is a sensor voltage VTA when PSW 30 turns on is compared with a constant value K3 (See FIG. 15A) at step 150. If the PSW ON voltage is less than the constant value K3, a correction value Δ3 is derived from the following equation (3) at step 151.

$$\Delta 3 = \text{PSW ON voltage} - K3 \quad (3)$$

On the contrary, if at step 150, it is determined that the PSW ON voltage is greater than or equal to the constant value K3, the correction value Δ3 is set to zero at step 152. The correction value Δ3 indicates the magnitude by which the PSW ON voltage deviates toward the minus direction from an allowable range (from K3 to K4) in FIG. 15A.

At step 160, the PSW ON voltage is compared with a constant value K4 (See FIG. 15A). If the PSW ON voltage is more than the constant value K4, a correction value Δ4 is derived from the following equation (4) at step 161.

$$\Delta 4 = \text{PSW ON voltage} - K4 \quad (4)$$

On the contrary, if at step 160, it is determined that the PSW ON voltage is less than or equal to the constant value K4, the correction value Δ4 is set to zero at step 162. The correction value Δ4 indicates the magnitude by which the PSW ON voltage deviates toward the plus direction from an allowable range (from K3 to K4) in FIG. 15A.

After the sensor output processing routine is completed, the processing of microcomputer 60 proceeds to a first abnormal determination routine 200 shown in FIG. 2. The first abnormal determination routine 200 is described in detail in FIG. 4.

Figure 4:
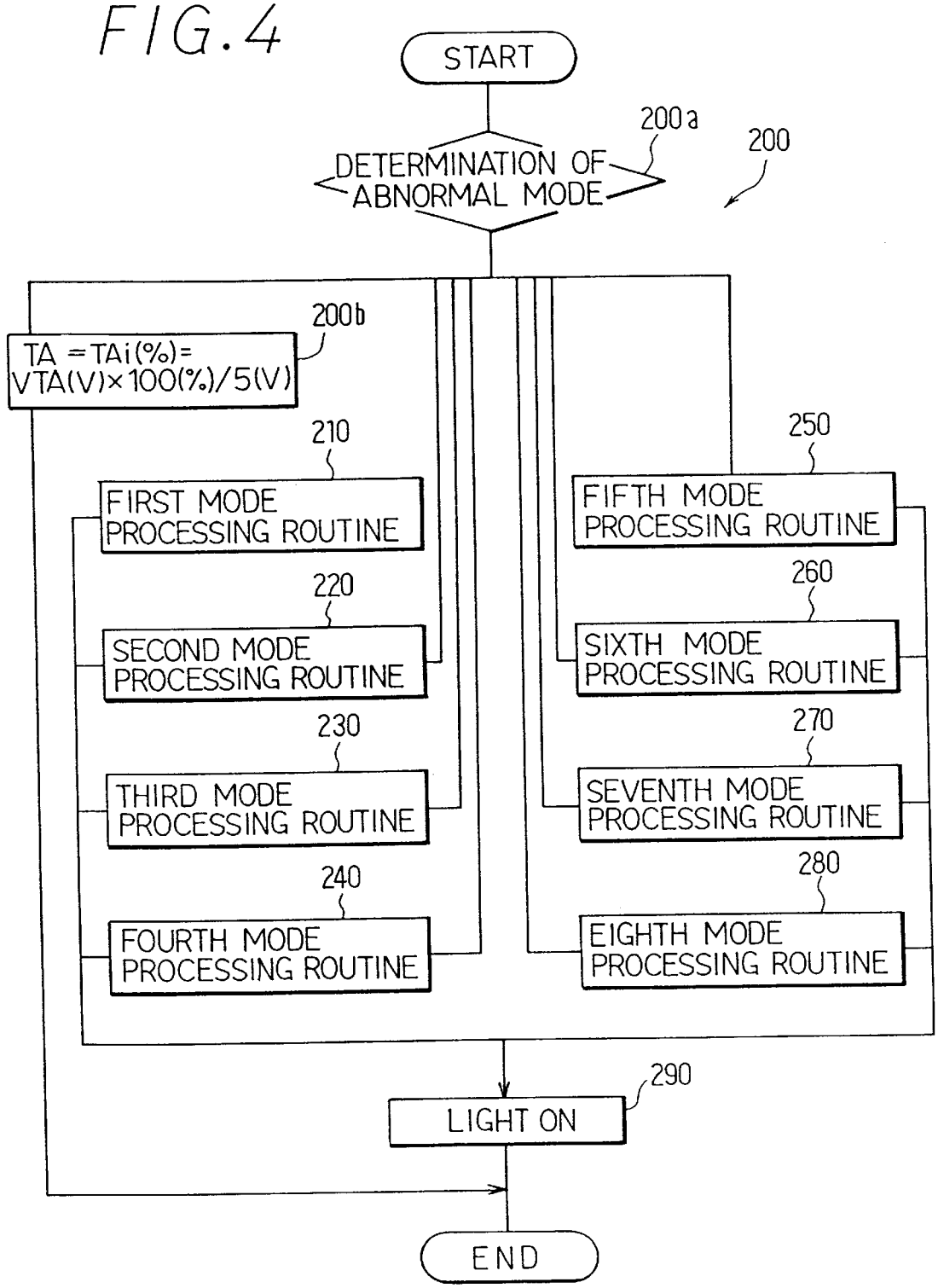
FIG. 4 is a flow chart illustrating a detailed routine for performing a first determination process to determine an abnormal mode of a sensor.
Figure 5:
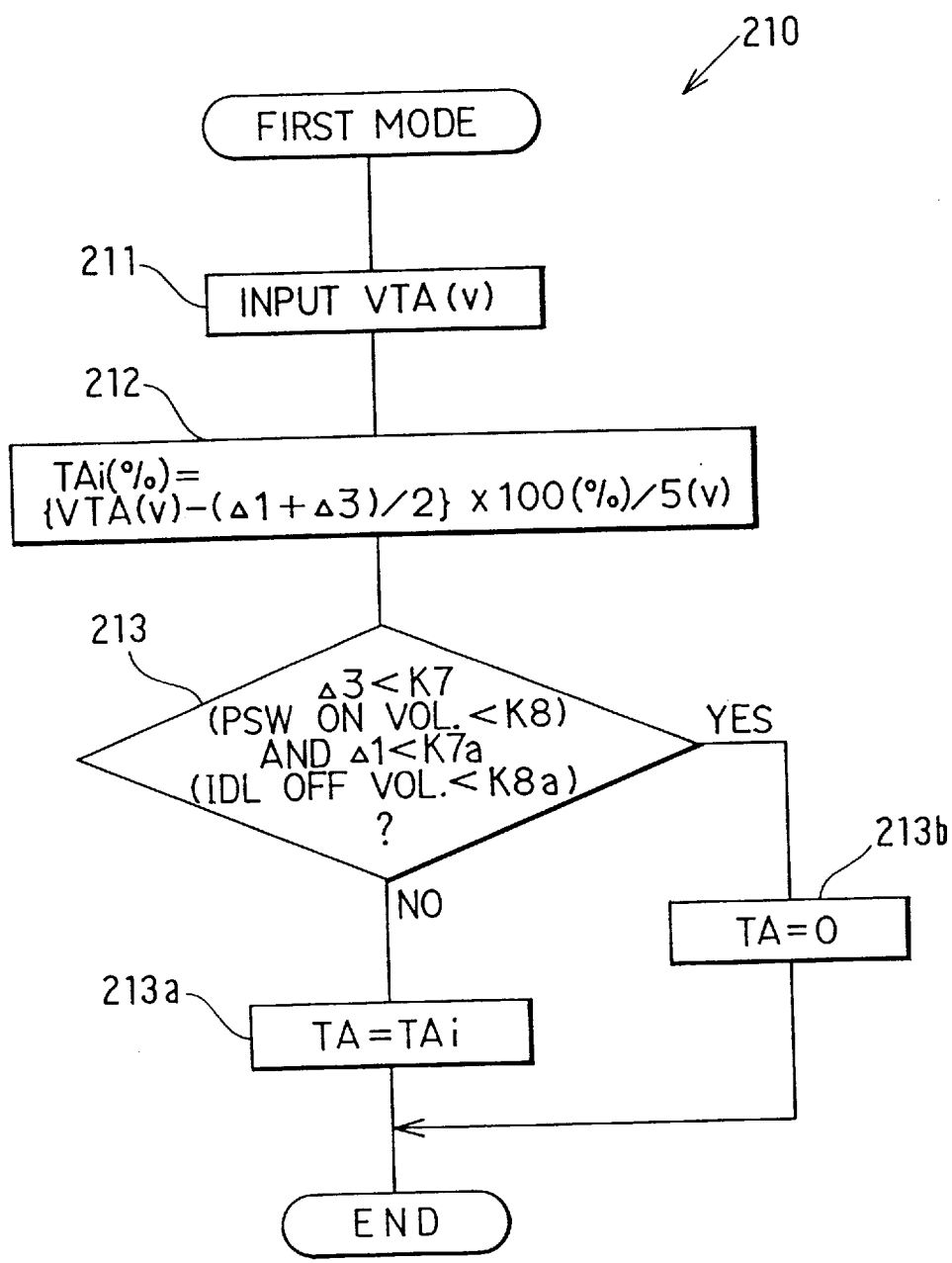
FIG. 5 is a flow chart illustrating a detailed routine performed at a time of a first abnormal mode.
Figure 6:
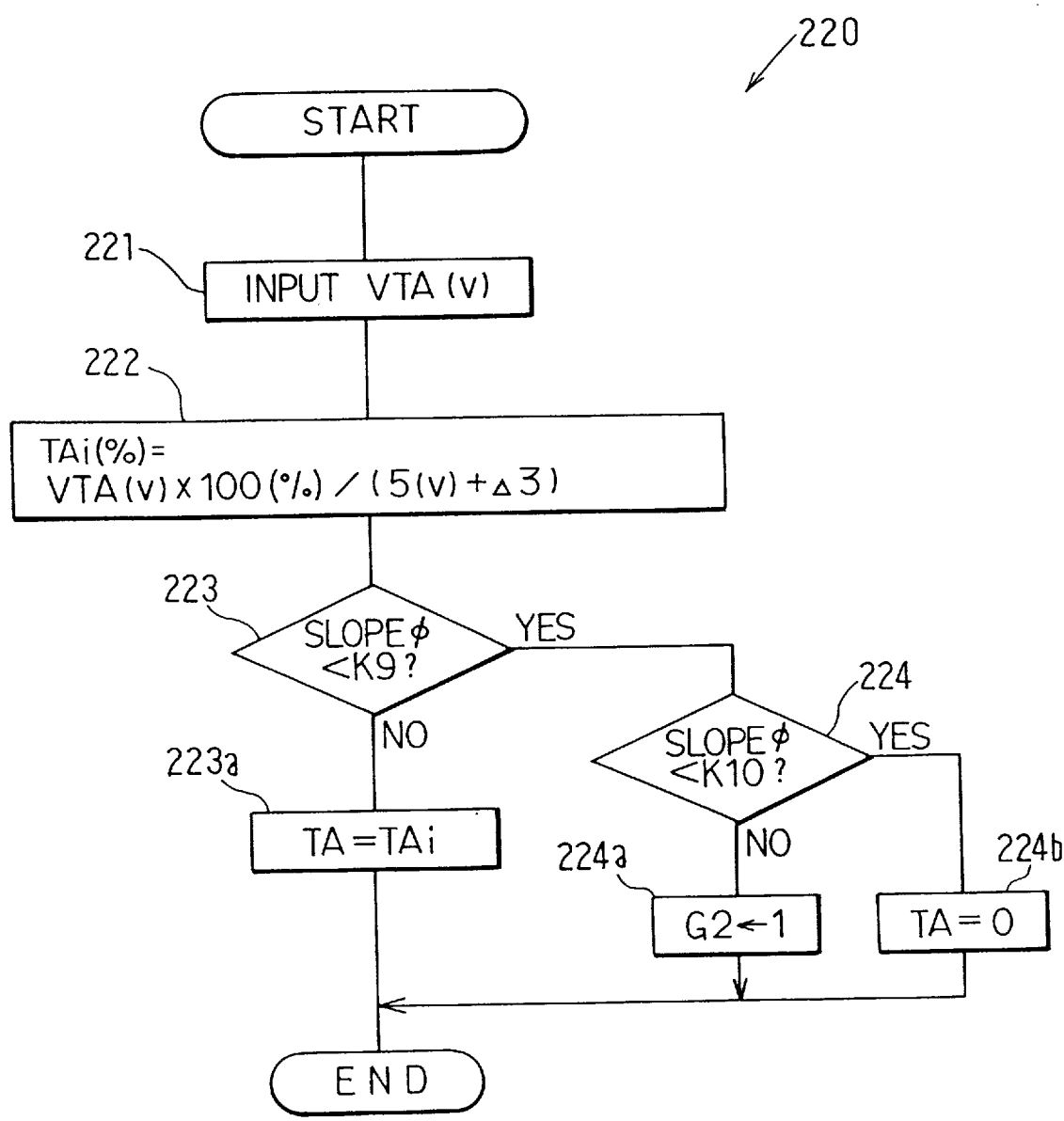
FIG. 6 is a flow chart illustrating a detailed routine performed at a time of a second abnormal mode.
Figure 7:
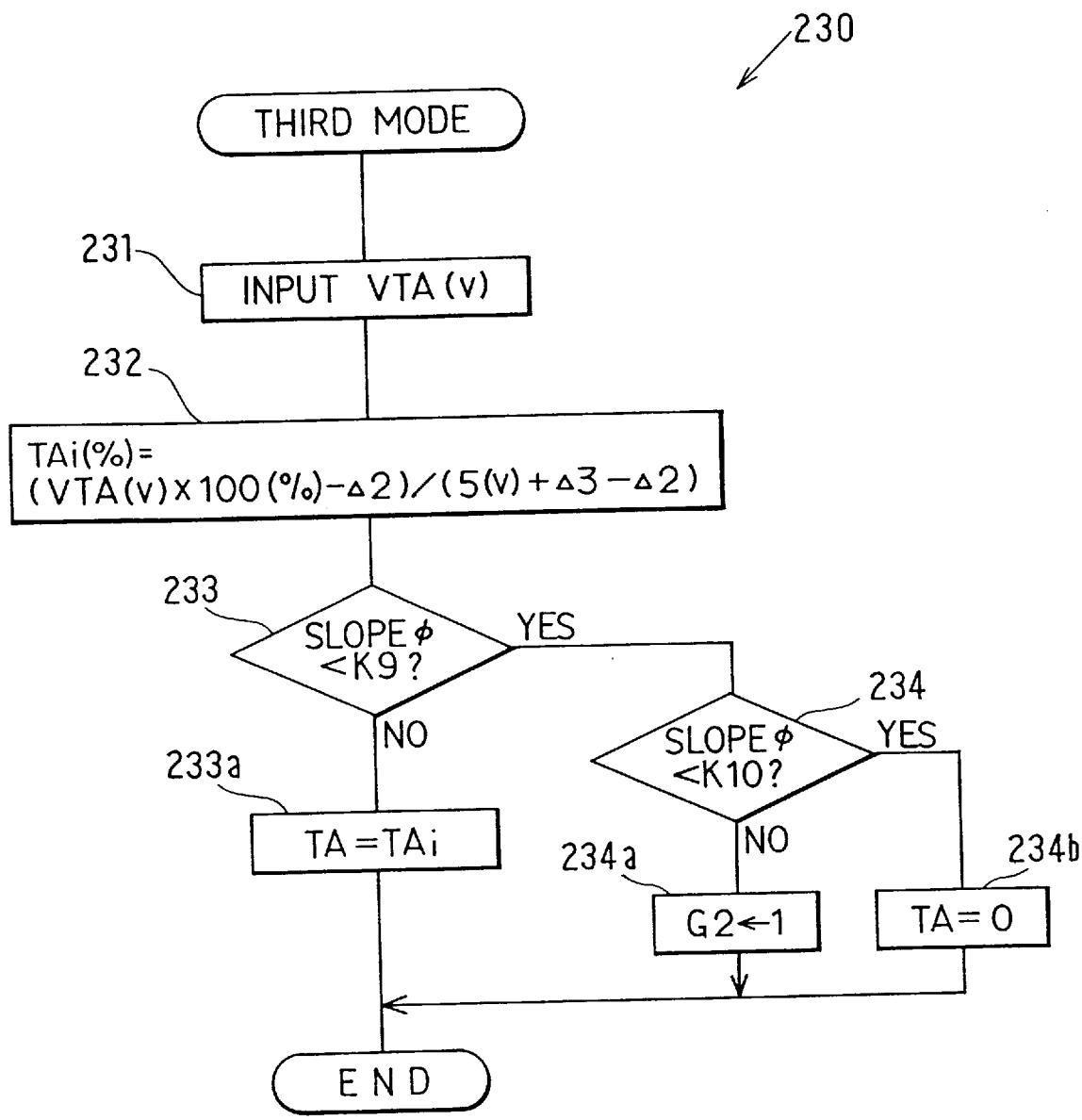
FIG. 7 is a flow chart illustrating a detailed routine performed at a time of a third abnormal mode.
Figure 8:
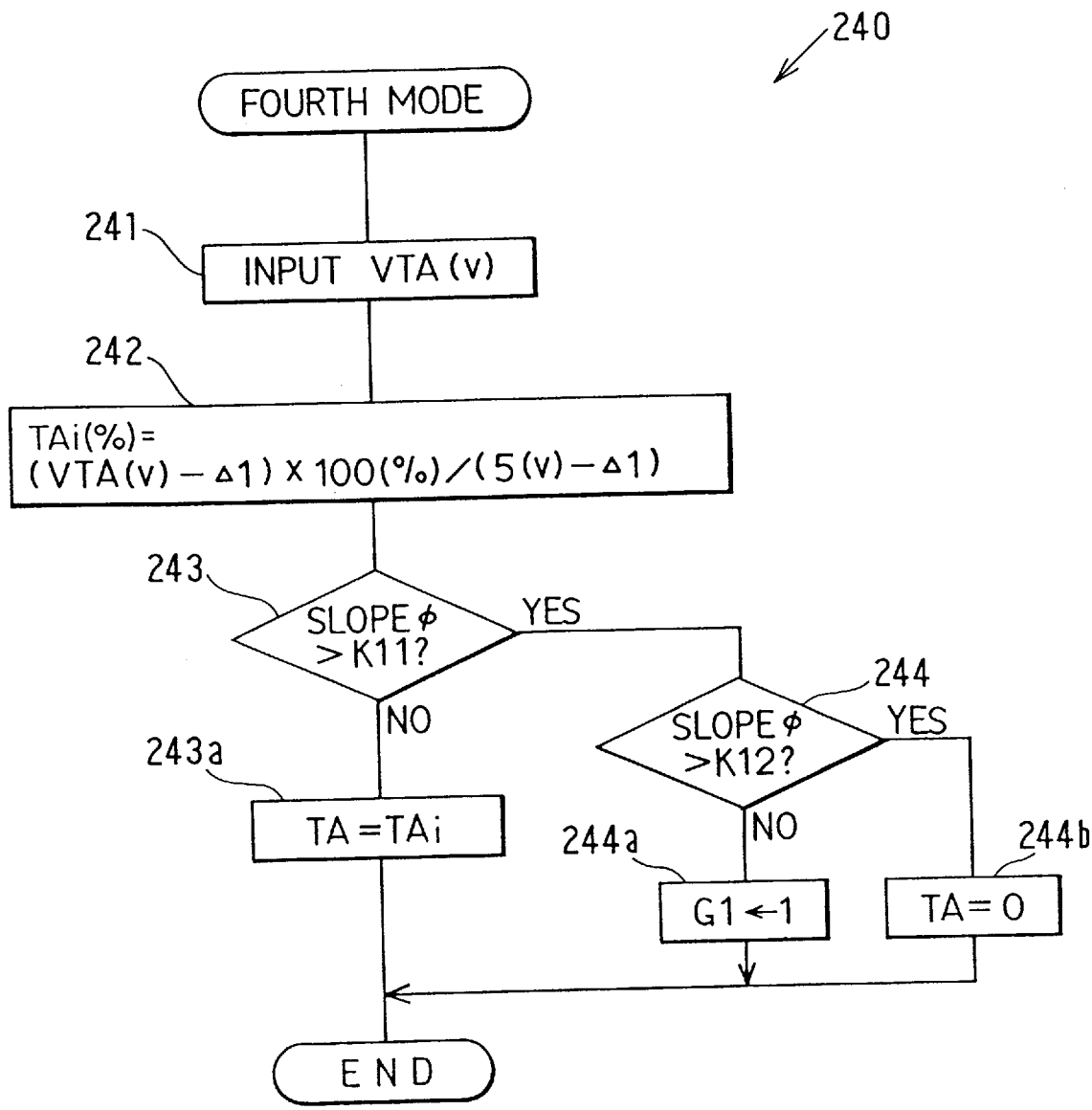
FIG. 8 is a flow chart illustrating a detailed routine performed at a time of a fourth abnormal mode.
Figure 9:
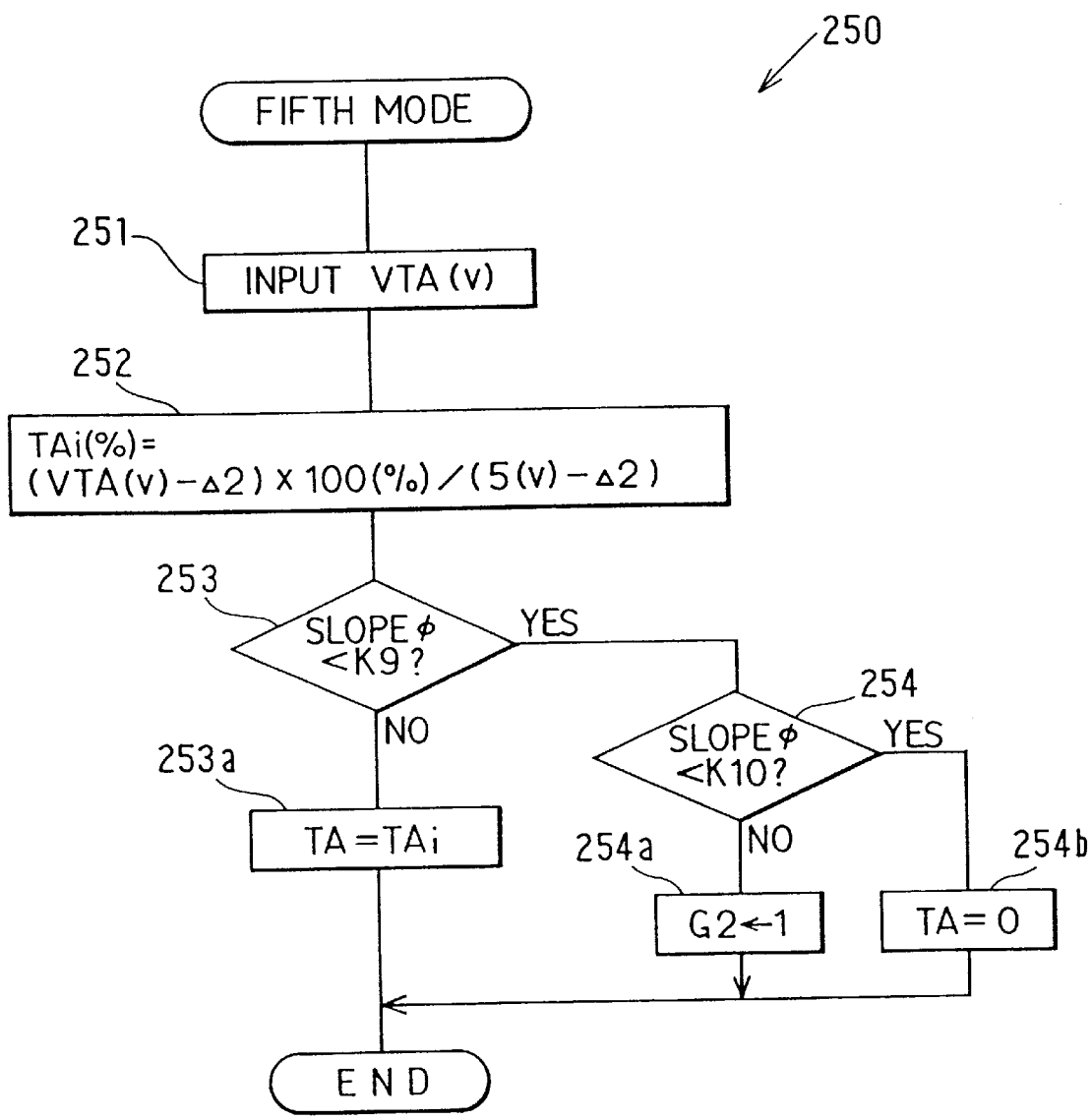
FIG. 9 is a flow chart illustrating a detailed routine performed at a time of a fifth abnormal mode.
Figure 10:
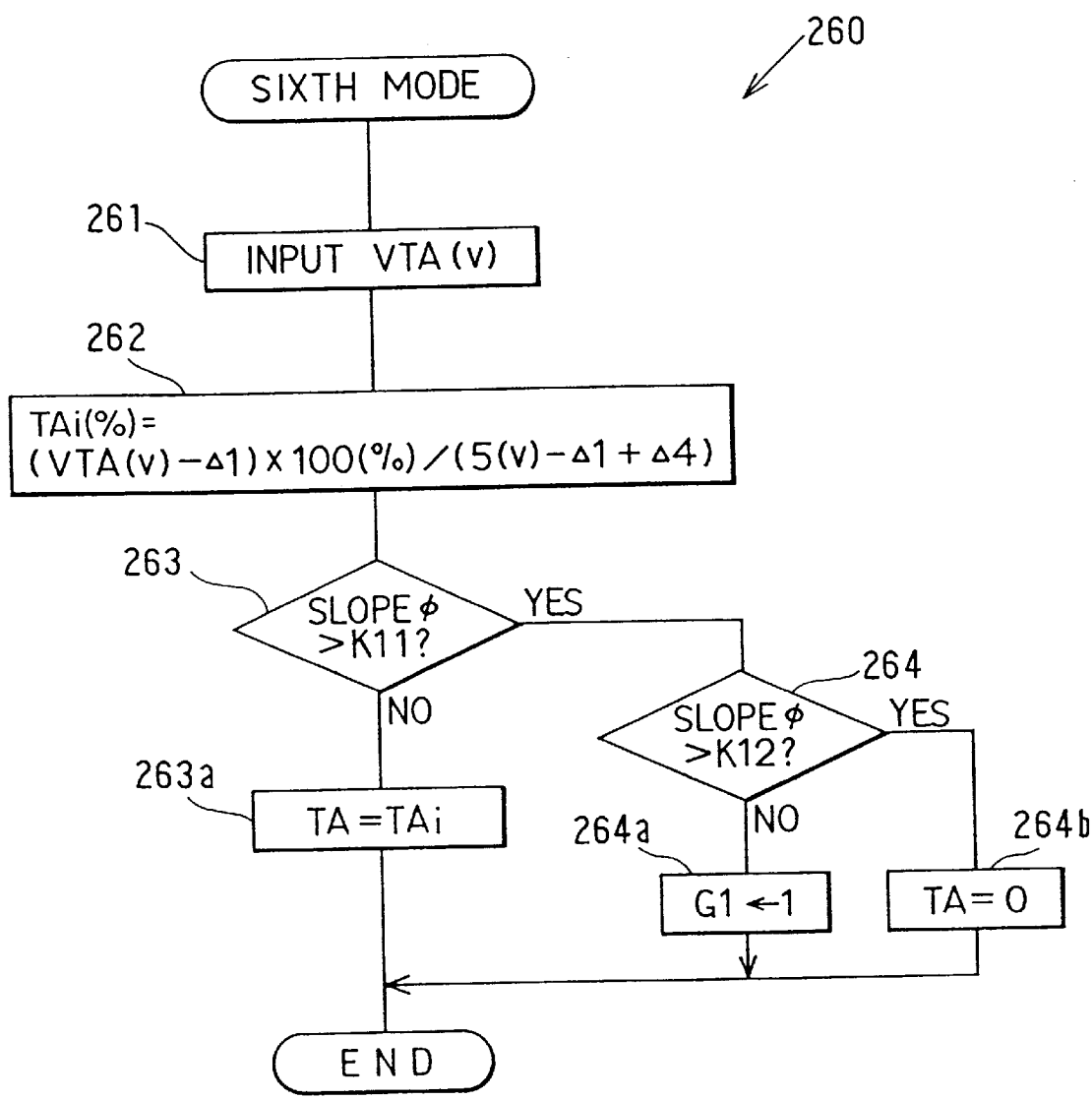
FIG. 10 is a flow chart illustrating a detailed routine performed at a time of a sixth abnormal mode.
Figure 11:
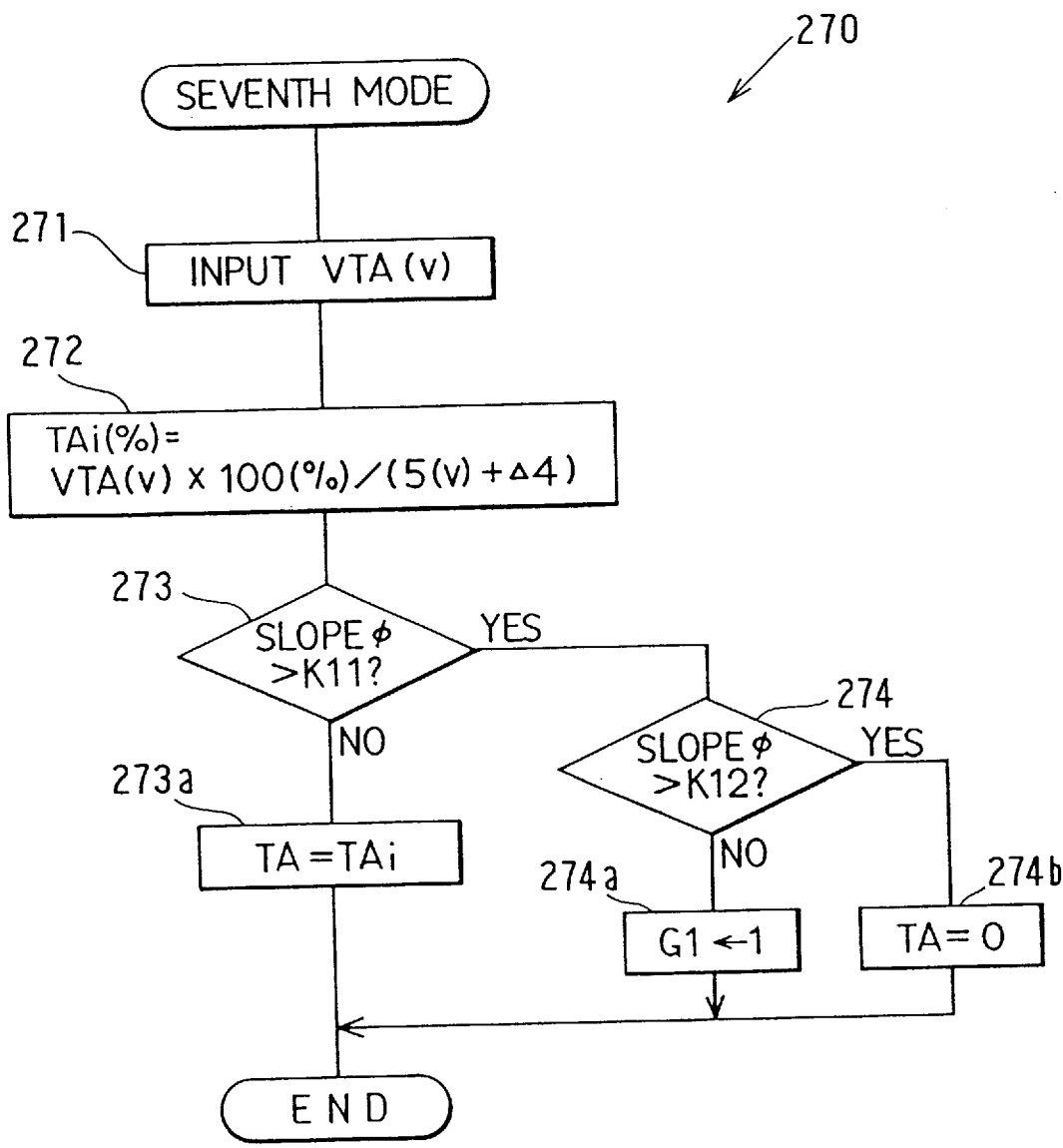
FIG. 11 is a flow chart illustrating a detailed routine performed at a time of a seventh abnormal mode.
Figure 12:
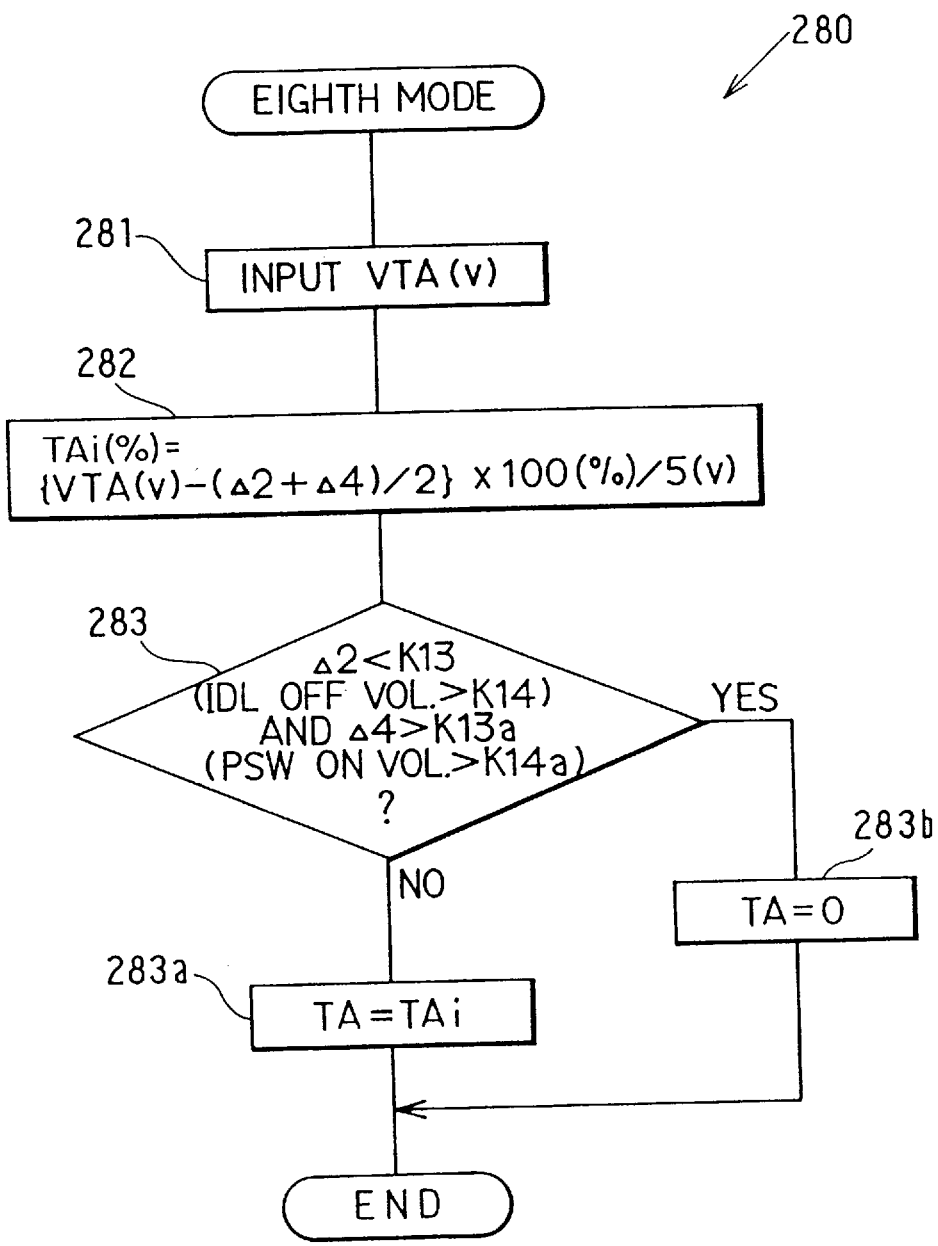
FIG. 12 is a flow chart illustrating a detailed routine performed at a time of a eighth abnormal mode.

In FIG. 4, a determination to identify an abnormal mode is made at step 200a. If all of the correction values Δ1, Δ2, Δ3 and Δ4 are set to zero in the sensor output processing routine 100, accelerator sensor 40 is determined to be normal. In this case, a detected depression amount TA is calculated at step 200b. That is, the detected depression amount TA is derived from the following equation (5) based on a sensor voltage VTA fed to microcomputer 60.

$$TA=TAi(\%)=VTA(V)\times 100(\%)\div 5(V) \quad (5)$$

In other words, when the IDL OFF voltage is within a range from K1 to K2 and the PSW ON voltage is within a range from K3 to K4, accelerator sensor is determined to be normal and the detected depression amount TA is calculated by using the sensor voltage VTA as it is.

If it is determined at step 200a that Δ1<0, Δ2=0, Δ3<0 and Δ4=0, accelerator sensor 40 is in a first abnormal mode in which a characteristic line VTA-θ in FIG. 15A deviates toward the minus direction and approximately in parallel to the normal state of a characteristic line VTA-θ. Accordingly, a first abnormal mode processing routine 210 is executed. The first abnormal mode processing routine 210 is described in detail in FIG. 5.

First of all, a sensor voltage VTA converted into a digital signal is fed to microcomputer 60 at step 211. At step 212, a detected depression amount TAi of accelerator pedal 10 is calculated based on the sensor voltage VTA according to the following equation (6).

$$TAi(\%)=\{VTA(V)-(\Delta 1+\Delta 3)/2\}\times 100(\%)\div 5(V) \quad (6)$$

At step 213, it is determined whether the abnormality in the sensor voltage VTA generated from accelerator sensor 40 can be corrected by equation (6) depending on the extent of the deviation of the sensor voltage VTA. That is, it is determined if the correction value Δ3 is less than a constant value K7. The constant value K7 is a limit value of a difference between a detected PSW ON voltage and normal PSW ON voltage. The PSW ON voltage itself can be used instead of the correction value Δ3 at step 213. In this case, the PSW ON voltage is compared with a constant value K8. The constant value K8 is a lower limit value of a normal PSW ON voltage. Further, it is determined if the correction value Δ1 is less than a constant value K7a at step 213. The constant value K7a is a limit value of a difference between a detected IDL OFF voltage and normal IDL OFF voltage. The IDL OFF voltage itself can be used instead of the correction value Δ1 at step 213. In this case, the IDL OFF voltage is compared with a constant value K8a. The constant value K8a is a lower limit value of a normal IDL OFF voltage.

If the correction value Δ3 is greater than or equal to the constant value K7, (or the PSW ON voltage is greater than or equal to the constant value K8), and the correction value Δ1 is greater than or equal to the constant value K7a, (or the IDL OFF voltage is greater than or equal to the constant value K8a), a negative determination is made at step 213 and the TAi calculated by equation (6) is substituted for a corrected depression amount TA at step 213a. On the contrary, if an affirmative determination is made at step 213, the detected depression amount TA is cleared to zero (equivalent to stopping motor M) at step 213b.

If it is determined at step 200a that Δ1=0, Δ2=0, Δ3<0 and Δ4=0, accelerator sensor 40 is in a second abnormal mode in which a characteristic line VTA-θ in FIG. 15A deviates toward the minus direction and a slope of characteristic line VTA-θ in FIG. 15A is smaller than a normal slope of a characteristic line VTA-θ, that is, a sensitivity of accelerator sensor 10 decreases. Accordingly, a second abnormal mode processing routine 220 is executed. The second abnormal mode processing routine 220 is described in detail in FIG. 6.

First of all, a sensor voltage VTA converted into a digital signal is fed to microcomputer 60 at step 221. At step 222, a detected depression amount TAi of accelerator pedal 10 is calculated based on the sensor voltage VTA according to the following equation (7).

$$TAi(\%)=VTA(V)\times 100(\%)\div (5(V)+\Delta 3) \quad (7)$$

At step 223, it is determined whether the abnormality in the sensor voltage VTA generated from accelerator sensor 40 can be corrected by equation (7) depending on a deviation of a slope φ of the detected characteristic line VTA-θ from a normal slope of the characteristic line VTA-θ in FIG. 15A. That is, it is determined if the detected slope φ is greater than or equal to a constant value K9. The constant value K9 is a lower limit value of a normal slope φ. If the detected slope φ is greater than or equal to a constant value K9, a negative determination is made at step 223 and the TAi calculated by equation (7) is substituted for a corrected depression amount TA at step 223a.

Further, if the detected slope φ is between the constant value K9 and a constant value K10 to determine that the detected slope φ is nearly zero, a second motor power restriction flag G2 is set to 1 (steps 223, 224 and 224a). If the detected slope φ is less than or equal to the constant value K10, the detected depression amount TA is cleared to zero (equivalent to stopping motor M) at step 224b.

If it is determined at step 200a that Δ1=0, Δ2>0, Δ3<0 and Δ4=0, accelerator sensor 40 is in a third abnormal mode in which the detected characteristic line of VTA-θ crosses the normal characteristic VTA-θ line in FIG. 15A and a sensitivity of accelerator sensor 10 decreases. Accordingly, a third abnormal mode processing routine 230 is executed. The third abnormal mode processing routine 230 is described in detail in FIG. 7.

First of all, a sensor voltage VTA converted into a digital signal is fed to microcomputer 60 at step 231. At step 232, a detected depression amount TAi of accelerator pedal 10 is calculated based on the sensor voltage VTA according to the following equation (8).

$$TAi(\%)=(VTA(V)-\Delta 2)\times 100(\%)\div (5(V)+\Delta 3-\Delta 2) \quad (8)$$

At step 233, it is determined whether the abnormality in the sensor voltage VTA generated from accelerator sensor 40 can be corrected by equation (8) in the same way as the second abnormal mode. That is, it is determined if the detected slope φ is greater than or equal to a constant value K9. If the detected slope φ is greater than or equal to a constant value K9, the TAi calculated by equation (7) is substituted for a corrected depression amount TA at step 233a. If the detected slope φ is between the constant value K9 and the constant value K10, the second motor power restriction flag G2 is set to 1 (steps 233, 234 and 234a). If the detected slope φ is less than or equal to the constant value K10, the detected depression amount TA is cleared to zero at step 234b.

If it is determined at step 200a that Δ1<0, Δ2=0, Δ3=0 and Δ4=0, accelerator sensor 40 is in a fourth abnormal mode in which a characteristic line VTA-θ in FIG. 15A deviates toward the minus direction and a slope of characteristic line VTA-θ in FIG. 15A is larger than a normal slope of a characteristic line VTA-θ, that is, a sensitivity of accelerator sensor 10 increases. Accordingly, a fourth abnormal mode processing routine 240 is executed. The fourth abnormal mode processing routine 240 is described in detail in FIG. 8.

First of all, a sensor voltage VTA converted into a digital signal is fed to microcomputer 60 at step 241. At step 242, a detected depression amount TAi of accelerator pedal 10 is calculated based on the sensor voltage VTA according to the following equation (9).

$$TAi(\%)=(VTA(V)-\Delta 1)\times 100(\%)\div (5(V)-\Delta 1) \qquad (9)$$

At step 243, it is determined whether the abnormality in the sensor voltage VTA generated from accelerator sensor 40 can be corrected by equation (9) depending on a deviation of a slope φ of the detected characteristic line VTA-θ from a normal slope of the characteristic line VTA-θ in FIG. 15A. That is, if the detected slope φ is less than or equal to a constant value K11, the TAi calculated by equation (9) is substituted for a corrected depression amount TA at step 243a. The constant value K11 is an upper limit value of a normal slope φ.

Further, if the detected slope φ is between the constant value K11 and a constant value K12 to determine that the detected slope φ is nearly infinity, a first motor power restriction flag G1 is set to 1 (steps 243, 244 and 244a). If the detected slope φ is greater than or equal to the constant value K12, the detected depression amount TA is cleared to zero (equivalent to stopping motor M) at step 244b.

If it is determined at step 200a that Δ1=0, Δ2>0, Δ3=0 and Δ4=0, accelerator sensor 40 is in a fifth abnormal mode in which a characteristic line VTA-θ in FIG. 15A deviates toward the plus direction and a slope of characteristic line VTA-θ in FIG. 15A is smaller than a normal slope of a characteristic line VTA-θ, that is, a sensitivity of accelerator sensor 10 decreases. Accordingly, a fifth abnormal mode processing routine 250 is executed. The fifth abnormal mode processing routine 240 is described in detail in FIG. 9.

A sensor voltage VTA converted into a digital signal is fed to microcomputer 60 at step 251. At step 252, a detected depression amount TAi of accelerator pedal 10 is calculated based on the sensor voltage VTA according to the following equation (10).

$$TAi(\%)=(VTA(V)-\Delta 2)\times 100(\%)\div (5(V)-\Delta 2) \qquad (10)$$

At steps 253 through 254b, the same steps as in the second abnormal mode are executed. As a result, the TAi calculated by equation (10) is substituted for a corrected depression amount TA at step 253a, the second motor power restriction flag G2 is set to 1 at step 254a or the detected depression amount TA is cleared to zero at step 254b.

If it is determined at step 200a that Δ1<0, Δ2=0, Δ3=0 and Δ4>0, accelerator sensor 40 is in a sixth abnormal mode in which the detected characteristic line of VTA-θ crosses the normal characteristic VTA-θ line in FIG. 15A and a sensitivity of accelerator sensor 10 increases. Accordingly, a sixth abnormal mode processing routine 260 is executed. The sixth abnormal mode processing routine 260 is described in detail in FIG. 10.

A sensor voltage VTA converted into a digital signal is fed to microcomputer 60 at step 261. At step 262, a detected depression amount TAi of accelerator pedal 10 is calculated based on the sensor voltage VTA according to the following equation (8).

$$TAi(\%)=(VTA(V)-\Delta 1)\times 100(\%)\div (5(V)-\Delta 1+\Delta 4) \qquad (11)$$

At steps 263 through 264b, the same steps as in the fourth abnormal mode are executed.

If it is determined at step 200a that Δ1=0, Δ2=0, Δ3=0 and Δ4>0, accelerator sensor 40 is in a seventh abnormal mode in which a characteristic line VTA-θ in FIG. 15A deviates toward the plus direction and a slope of characteristic line VTA-θ in FIG. 15A is larger than a normal slope of a characteristic line VTA-θ, that is, a sensitivity of accelerator sensor 10 increases. Accordingly, a seventh abnormal mode processing routine 270 is executed. The seventh abnormal mode processing routine 270 is described in detail in FIG. 11.

A sensor voltage VTA is fed to microcomputer 60 at step 271. At step 272, a detected depression amount TAi of accelerator pedal 10 is calculated based on the sensor voltage VTA according to the following equation (12).

$$TAi(\%)=VTA(V)\times 100(\%)\div (5(V)+\Delta 4) \qquad (12)$$

At steps 273 through 274b, the same steps as in the fourth abnormal mode are executed.

If it is determined at step 200a that Δ1=0, Δ2>0, Δ3=0 and Δ4>0, accelerator sensor 40 is in an eighth abnormal mode in which a characteristic line VTA-θ in FIG. 15A deviates toward the plus direction and approximately in parallel to the normal state of a characteristic line VTA-θ. Accordingly, a eighth abnormal mode processing routine 280 is executed. The eighth abnormal mode processing routine 280 is described in detail in FIG. 12.

A sensor voltage VTA is fed to microcomputer 60 at step 281. At step 282, a detected depression amount TAi of accelerator pedal 10 is calculated based on the sensor voltage VTA according to the following equation (13).

$$TAi(\%)=\{VTA(V)-(\Delta 2+\Delta 4)/2\}\times 100(\%)\div 5(V) \qquad (13)$$

At step 283, it is determined whether the abnormality in the sensor voltage VTA generated from accelerator sensor 40 can be corrected by equation (13) depending on the extent of the deviation of the sensor voltage VTA. That is, it is determined if the correction value Δ2 is greater than a constant value K13. The constant value K13 is an upper limit value of a difference between a detected IDL OFF voltage and normal IDL OFF voltage. The IDL OFF voltage itself can be used instead of the correction value Δ2 at step 283. In this case, the IDL OFF voltage is compared with a constant value K14. The constant value K14 is an upper limit value of a normal IDL OFF voltage.

Further, it is determined if the correction value Δ4 is greater than a constant value K13a at step 213. The constant value K13a is an upper limit value of a difference between a detected PSW ON voltage and normal PSW ON voltage. The PSW ON voltage itself can be used instead of the correction value Δ4 at step 283. In this case, the PSW ON voltage is compared with a constant value K14a. The constant value K14a is an upper limit value of a normal PSW ON voltage.

If the correction value Δ2 is less than or equal to the constant value K13, (or the IDL OFF voltage is less than or equal to the constant value K14), and the correction value Δ4 is less than or equal to the constant value K13a, (or the PSW ON voltage is less than or equal to the constant value K14a), the TAi calculated by equation (13) is substituted for a corrected depression amount TA at step 283a. On the contrary, if an affirmative determination is made at step 283, the detected depression amount TA is cleared to zero at step 283b.

After the process from step 210 to step 280 is completed, an alarm light is lit at step 290 as shown in FIG. 4. Accordingly, a driver is notified that accelerator sensor 40 is malfunctioning.

Figure 13:
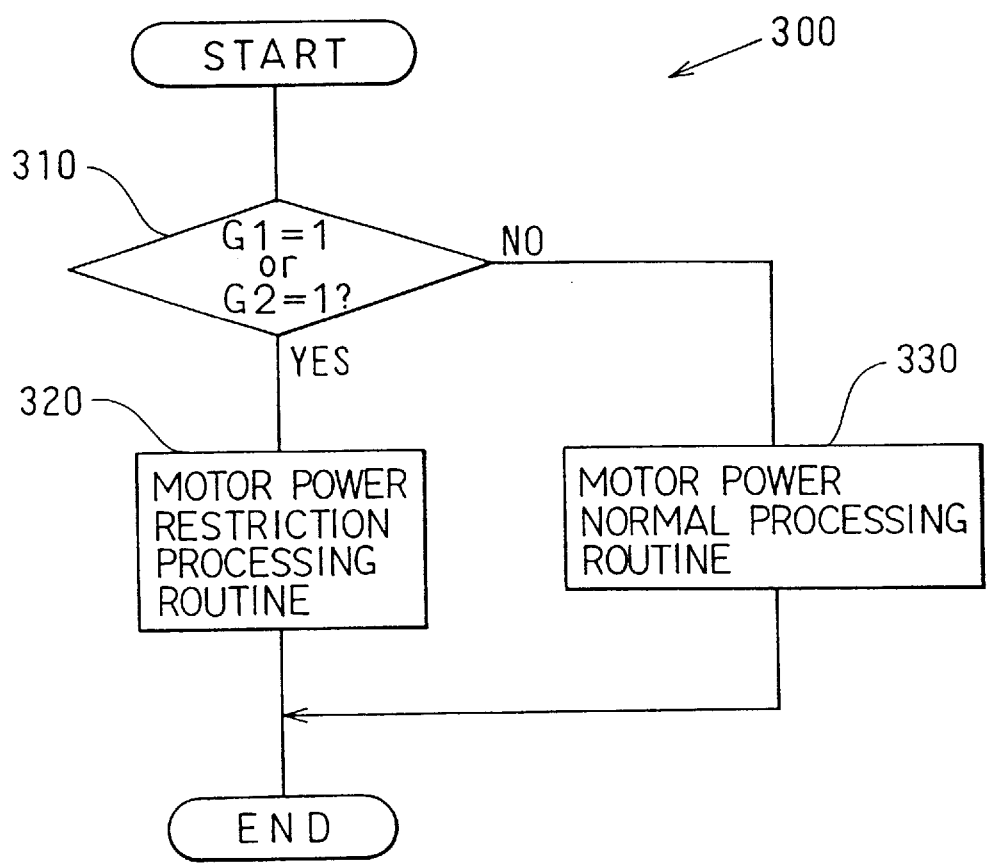
FIG. 13 is a flow chart illustrating a detailed routine to calculate an output signal to an electrical motor of a vehicle.

Next, microcomputer 60 executes a routine shown in FIG. 13 to calculate an output signal to a motor M of the vehicle.

In the routine shown in FIG. 13, it is determined at step 310 if first or second motor power restriction flag G1 or G2 has been set to 1. When G1=1 or G2=1, a routine to execute a motor power restriction processing shown in FIG. 14 is started. In FIG. 14, it is determined at step 321 if a motor driving current corresponding to the detected depression amount TA calculated at each step of first through eighth abnormal modes is greater than or equal to a predetermined upper limit of a motor driving current. When an affirmative determination is made at step 321, an instruction not to provide a motor driving current to the motor M is fed to driving circuit 70. On the contrary, when a negative determination is made at step 321, an instruction to provide a motor driving current is fed to driving circuit 70 at step 322. As a result, the motor driving current is provided to the motor M from driving circuit 70 and the vehicle travels at a speed corresponding to the detected depression amount TA.

When G1=0 and G2=0 at step 310, a normal motor power output routine at step 330 is executed. That is, driving circuit 70 is instructed so as to provide a motor driving current corresponding to the detected depression amount TA calculated at each step of the abnormal modes to the motor M. As a result, the vehicle travels at a speed corresponding to the detected depression amount TA calculated based on the sensor voltage VTA generated from a normal accelerator sensor.

As described above, even when the sensor voltage VTA generated from accelerator sensor 40 is abnormal, the detected depression amount TA is calculated from the sensor voltage VTA compensated based on a deviation from its normal output. Accordingly, the traveling of the vehicle is properly controlled based on the calculated detected depression amount TA.

Figure 16:
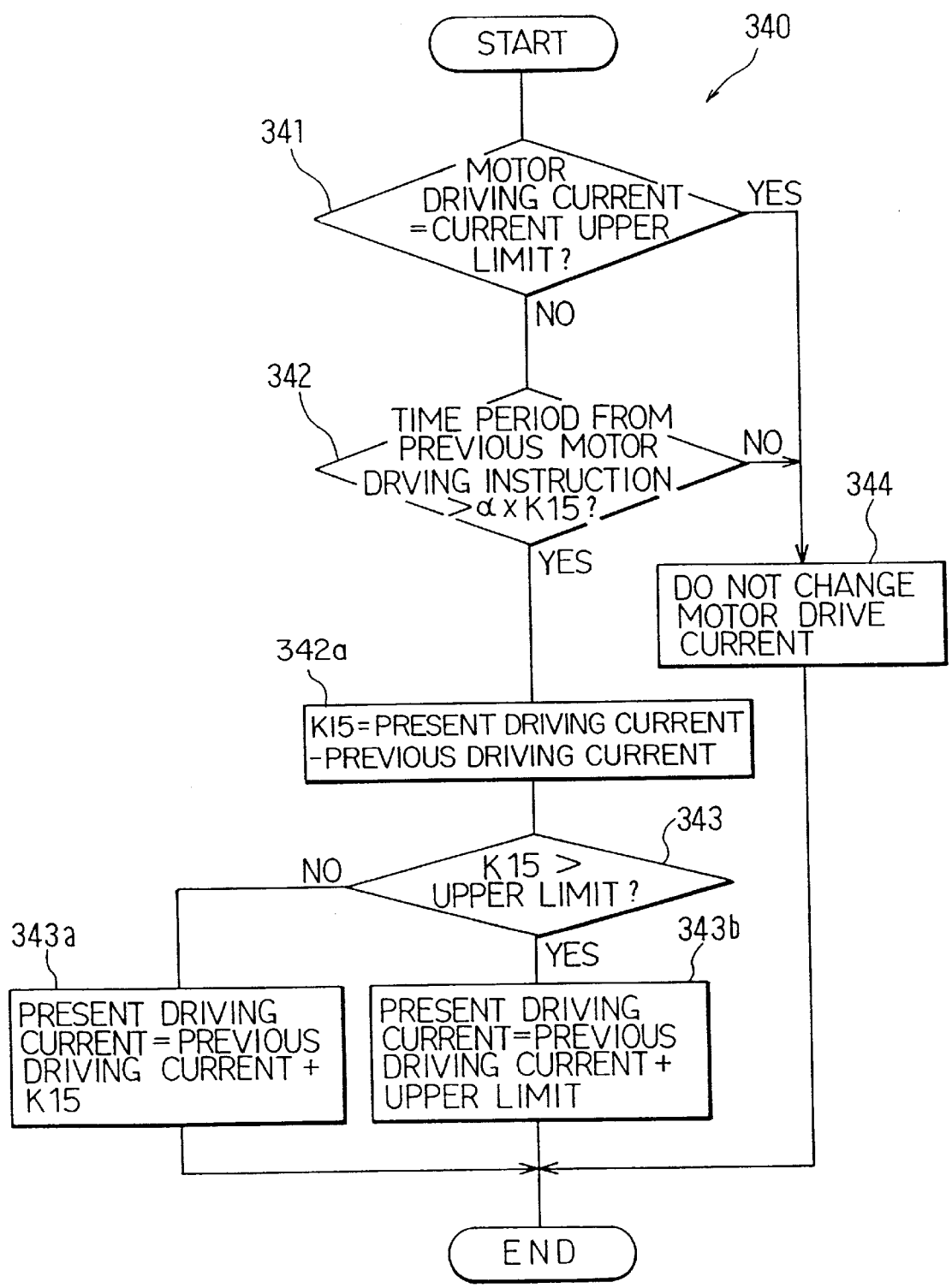
FIG. 16 is a flow chart illustrating a modified routine for restraining the power to an electrical motor.
Figure 17:
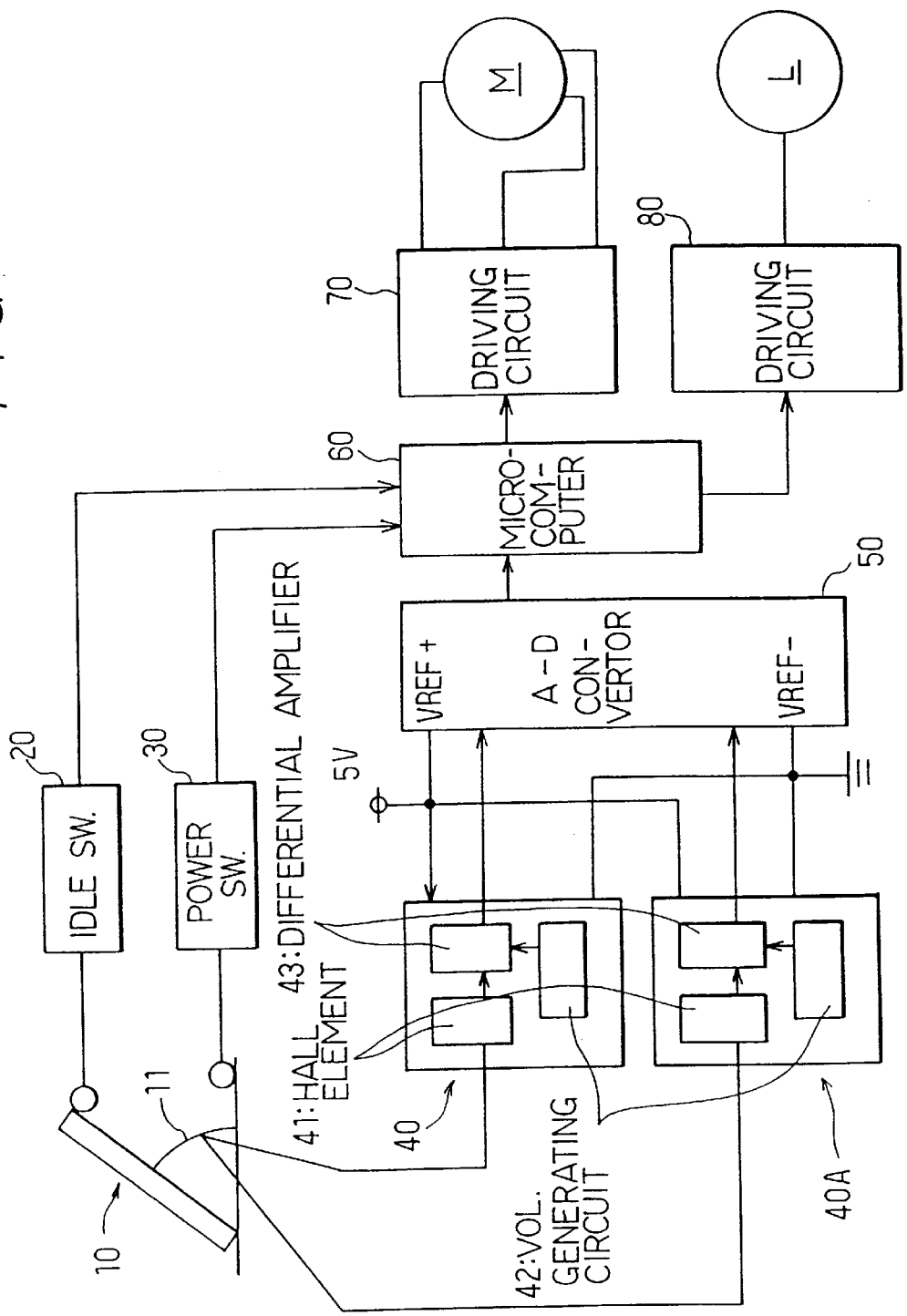
FIG. 17 is a block diagram illustrating a vehicular control device according to a second embodiment of the present invention.

FIG. 16 shows a modification of the first embodiment. In this modification, a flow chart shown in FIG. 16 is used in place of the flow chart shown in FIG. 14. The other structure of the modification is the same as the first embodiment.

In FIG. 16, it is determined at step 341 if a present motor driving current agrees with an upper limit of a motor driving current. When a negative determination is made at step 341, it is determined at step 342 if a time duration passing from a previous instruction to control a motor driving current is greater than or equal to a predetermined time period $\alpha \times K15$ ($\alpha$ is a coefficient to change a current value K15 into a time value). When an affirmative determination is made at step 341 or a negative determination is made at step 342, an instruction to change a motor driving current is prohibited at step 344. Consequently, the motor M keeps its driving state (i.e., its rotational speed) as it is.

When the time duration passing from a previous instruction to control a motor driving current is greater than or equal to the predetermined time period $\alpha \times K15$, a current difference value K15 is calculated from the following equation (14).

$$K15 = \text{present motor driving current} - \text{previous motor driving current} \quad (14)$$

After that, it is determined at step 343 if the current difference value K15 is larger than a predetermined upper difference value. When K15 is larger than the predetermined upper difference value, the present motor driving current is derived from the following equation (15).

$$\text{present motor driving current} = \text{previous motor driving current} + \text{predetermined upper difference value} \quad (15)$$

According to this modification, since the current difference value K15 is calculated as a difference between a present and a previous motor driving currents, the larger is the difference, the longer step 342 holds the motor driving current unchanged. Therefore, it is possible to drive the motor M stably.

(Second Embodiment)

Next, a second embodiment of the present embodiment is explained with reference to FIGS. 17 through 28.

A control circuit of the second embodiment has a second accelerator sensor 40A in addition to a first accelerator sensor 40. Second accelerator sensor 40A has a same structure as first accelerator sensor 40 described in the first embodiment. Hereinafter, a sensor voltage of first accelerator sensor 40 is VTA1 and a sensor voltage of second accelerator sensor 40A is VTA2. An analog-digital convertor 50 converts both sensor voltage VTA1 and sensor voltage VTA2 into digital signals.

Further, in the second embodiment, microcomputer 60 executes flow charts shown in FIGS. 18 through 28 in place of flow charts shown in FIGS. 4 through 13 described in the first embodiment. The other structures of the second embodiment are the same as the first embodiment.

In the second embodiment, a sensor output processing routine 100 shown in FIGS. 2 and 3 is executed with respect to sensor outputs from first and second accelerator sensors 40 and 40A, respectively. After the sensor output processing routine 100 is completed, the processing of microcomputer 60 proceeds to a first abnormal determination routine 200A shown in FIG. 18.

Figure 18:
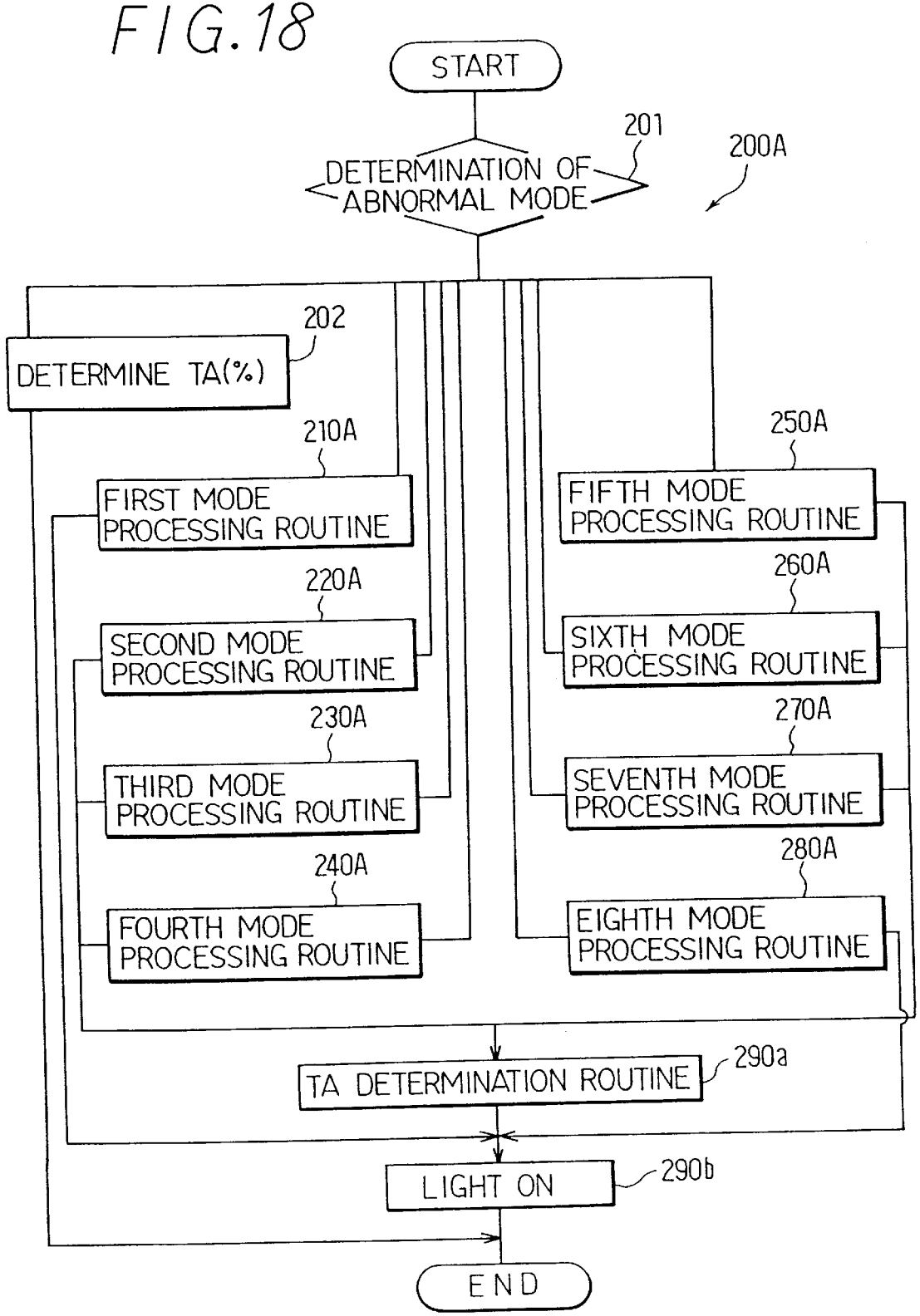
FIG. 18 is a flow chart illustrating a detailed routine for performing a first determination process made by a microcomputer shown in FIG. 17.

In FIG. 18, a determination to identify an abnormal mode is made at step 201. If all of the correction values $\Delta 1, \Delta 2, \Delta 3$ and $\Delta 4$ (hereinafter, the correction values of first accelerator sensor 40 are represented by $\Delta 11, \Delta 21, \Delta 31$, and $\Delta 41$, the correction values of second accelerator sensor 40A are represented by $\Delta 12, \Delta 22, \Delta 32$, and $\Delta 42$.) of first and second accelerator sensors 40 and 40A are set to zero in the sensor output processing routine 100, first and second accelerator sensors 40 and 40A are determined to be normal. That is, first and second detected depression amounts TA1 and TA2 are derived from sensor voltages VTA1 and VTA2, respectively, according to the foregoing equation (5). In this case, a final detected depression amount TA is determined by choosing a minimum value of first and second detected depression amounts TA1 and TA2 or calculating an average value thereof at step 202.

Figure 19:
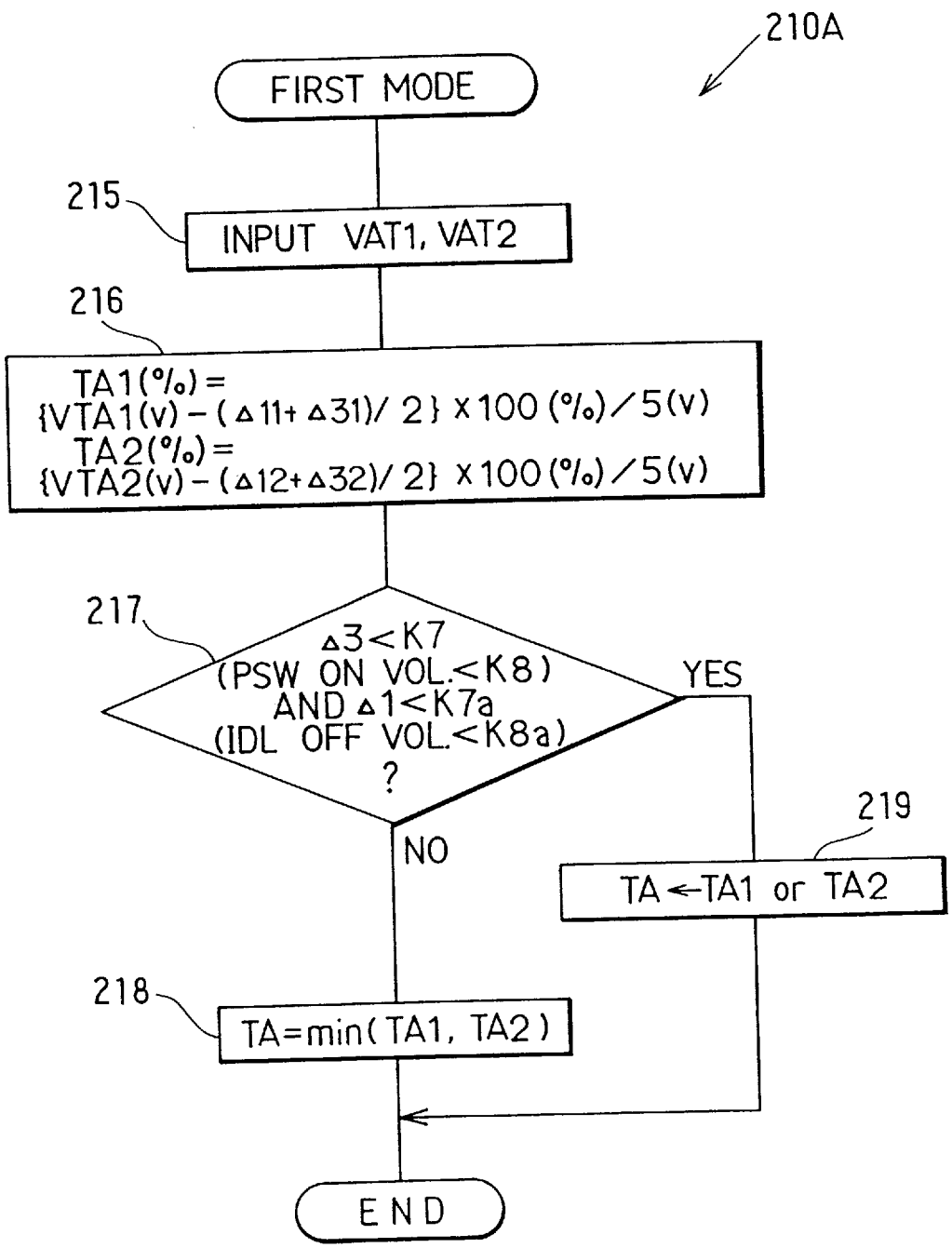
FIG. 19 is a flow chart illustrating a detail of a routine performed at a time of a first abnormal mode shown in FIG. 18.

If it is determined at step 201 that $\Delta 1 < 0, \Delta 2 = 0, \Delta 3 < 0$ and $\Delta 4 = 0$ with respect to either one of first and second accelerator sensors 40 and 40A, one of accelerator sensors 40 and 40A is in a first abnormal mode in which a characteristic line VTA-$\theta$ in FIG. 15A deviates toward the minus direction and approximately in parallel to the normal state of a characteristic line VTA-$\theta$. Accordingly, a first abnormal mode processing routine 210A shown in FIG. 19 is executed.

First of all, sensor voltages VTA1 and VTA2 converted into digital signals are fed to microcomputer 60 at step 215. At step 216, first and second detected depression amounts TA1 and TA2 are calculated based on sensor voltages VTA1 and VTA2 according to the following equations (16) and (17).

$$TA1(\%)=\{VTA1(V)-(\Delta 11+\Delta 31)/2\}\times 100(\%)\div 5(V) \quad (16)$$

$$TA2(\%)=\{VTA2(V)-(\Delta 12+\Delta 32)/2\}\times 100(\%)\div 5(V) \quad (17)$$

At step 217, it is determined with respect to an accelerator sensor in the first abnormal mode whether the abnormality in the sensor voltage VTA1 or VTA2 can be corrected by equation (16) or (17) depending on to the extent of the deviation of the sensor voltage VTA1 or VTA2. The process of step 217 is the same as that of step 213 described in the first embodiment.

If the correction value $\Delta 3$ is greater than or equal to the constant value K7, and the correction value $\Delta 1$ is greater than or equal to the constant value K7a, a negative determination is made at step 217 and a final detected depression amount TA is determined by choosing a minimum value of first and second detected depression amounts TA1 and TA2 calculated by equations (16) and (17) at step 218. On the contrary, if an affirmative determination is made at step 217, the detected depression amount TA is determined at step 219 from either one of TA1 and TA2, which is calculated based on a normal sensor voltage VTA1 or VTA2.

Although both the first and second detected depression amounts TA1 and TA2 are calculated according to the same equations to correct the abnormality in the first abnormal mode, after identifying the accelerator sensor thrown into the first abnormal mode, equation (16) or (17) may be applied only to the identified accelerator sensor to get a detected depression amount TA1 or TA2. This is the same in the other abnormal modes described later.

Figure 20:
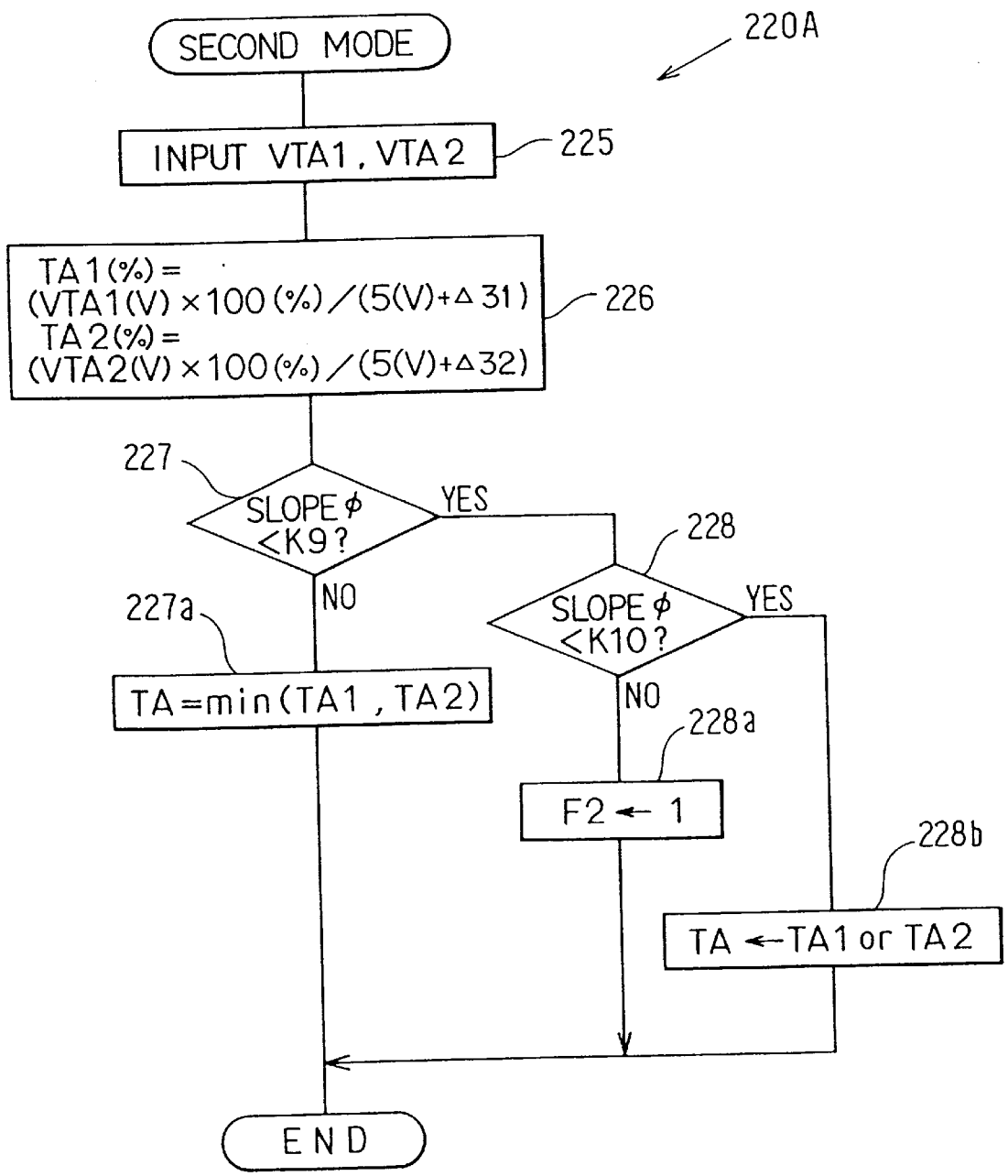
FIG. 20 is a flow chart illustrating a detail of a routine performed at a time of a second abnormal mode shown in FIG. 18.

If it is determined at step 201 that $\Delta 1=0$, $\Delta 2=0$, $\Delta 3<0$ and $\Delta 4=0$ with respect to either one of first and second accelerator sensors 40 and 40A, one of accelerator sensors 40 and 40A is in a second abnormal mode in which a characteristic line VTA-$\theta$ in FIG. 15A deviates toward the minus direction and a slope of characteristic line VTA-$\theta$ in FIG. 15A is smaller than a normal slope of a characteristic line VTA-$\theta$, that is, a sensitivity of accelerator sensor 10 decreases. Accordingly, a second abnormal mode processing routine 220A shown in FIG. 20 is executed.

First of all, sensor voltages VTA1 and VTA2 converted into digital signals are fed to microcomputer 60 at step 225. At step 226, first and second detected depression amounts TA1 and TA2 are calculated based on sensor voltages VTA1 and VTA2 according to the following equations (18) and (19).

$$TA1(\%)=VTA1(V)\times 100(\%)\div (5(V)+\Delta 31) \quad (18)$$

$$TA2(\%)=VTA2(V)\times 100(\%)\div (5(V)+\Delta 32) \quad (19)$$

At step 227, it is determined with respect to an accelerator sensor in the second abnormal mode whether the abnormality in the sensor voltage VTA1 or VTA2 generated from an accelerator sensor can be corrected by equation (18) or (19) depending on a deviation of a slope $\phi$ of the detected characteristic line VTA-$\theta$ from a normal slope of the characteristic line VTA-$\theta$ in FIG. 15A. The process of step 227 is the same as that of step 222 described in the first embodiment.

When the detected slope $\phi$ of the abnormal accelerator sensor is greater than or equal to the constant value K9, a negative determination is made at step 227 and a final detected depression amount TA is determined by choosing a minimum value of first and second detected depression amounts TA1 and TA2 calculated by equation (18) and (19) at step 227a.

Further, if the detected slope $\phi$ is between the constant value K9 and the constant value K10, a second detection flag F2 is set to 1 (steps 227, 228 and 228a). If the detected slope $\phi$ is less than or equal to the constant value K10, the detected depression amount TA is determined at step 228b from either one of TA1 and TA2, which is calculated based on a normal sensor voltage VTA1 or VTA2.

Figure 21:
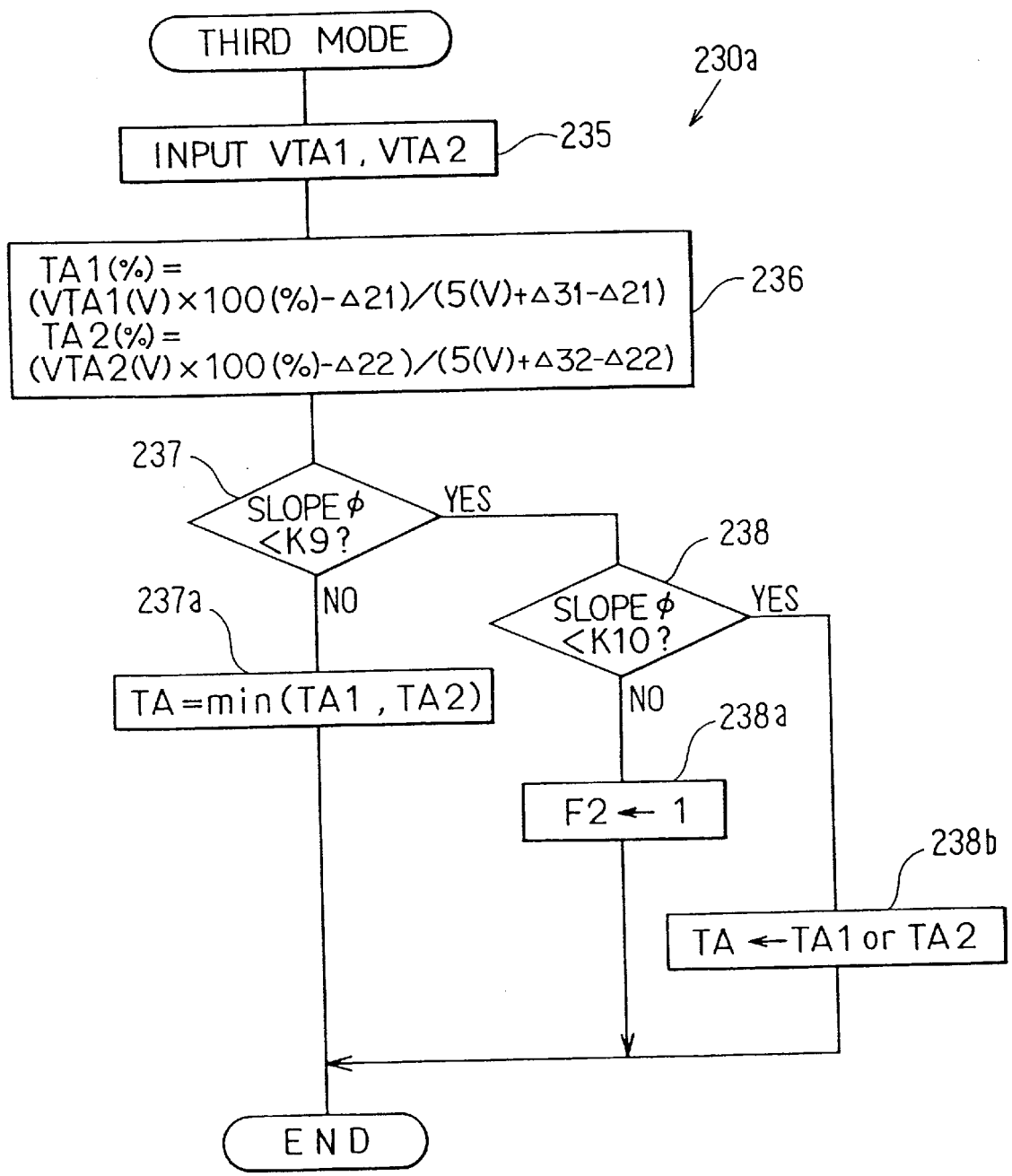
FIG. 21 is a flow chart illustrating a detail of a routine performed at a time of a third abnormal mode shown in FIG. 18.

If it is determined at step 201 that $\Delta 1=0$, $\Delta 2>0$, $\Delta 3<0$ and $\Delta 4=0$ with respect to either one of first and second accelerator sensors 40 and 40A, one of accelerator sensors 40 and 40A is in a third abnormal mode in which the detected characteristic line of VTA-$\theta$ crosses the normal characteristic VTA-$\theta$ line in FIG. 15A and a sensitivity of accelerator sensor 10 decreases. Accordingly, a third abnormal mode processing routine 230A shown in FIG. 21 is executed.

Sensor voltages VTA1 and VTA2 converted into digital signals are fed to microcomputer 60 at step 235. At step 236, first and second detected depression amount TA1 and TA2 of accelerator pedal 10 are calculated based on the sensor voltages VTA1 and VTA2, respectively, according to the following equations (20) and (21).

$$TA1(\%)=(VTA1(V)-\Delta 21)\times 100(\%)\div (5(V)+\Delta 31-\Delta 21) \quad (20)$$

$$TA2(\%)=(VTA2(V)-\Delta 22)\times 100(\%)\div (5(V)+\Delta 32-\Delta 22) \quad (21)$$

At step 237, it is determined with respect to an accelerator sensor in the second abnormal mode whether the abnormality in the sensor voltage VTA1 or VTA2 generated from an accelerator sensor can be corrected by equation (20) or (21) in the same way as the second abnormal mode. If the detected slope $\phi$ of the abnormal accelerator sensor is greater than or equal to the constant value K9, a final detected depression amount TA is determined at 237a by choosing a minimum value of first and second detected depression amounts TA1 and TA2 calculated by equation (20) and (21). If the detected slope $\phi$ is between the constant value K9 and the constant value K10, the second detection flag F2 is set to 1 (step 238a). If the detected slope $\phi$ is less than or equal to the constant value K10, the final detected depression amount TA is determined at step 238b from either one of TA1 and TA2, which is calculated based on a normal sensor voltage VTA1 or VTA2.

Figure 22:
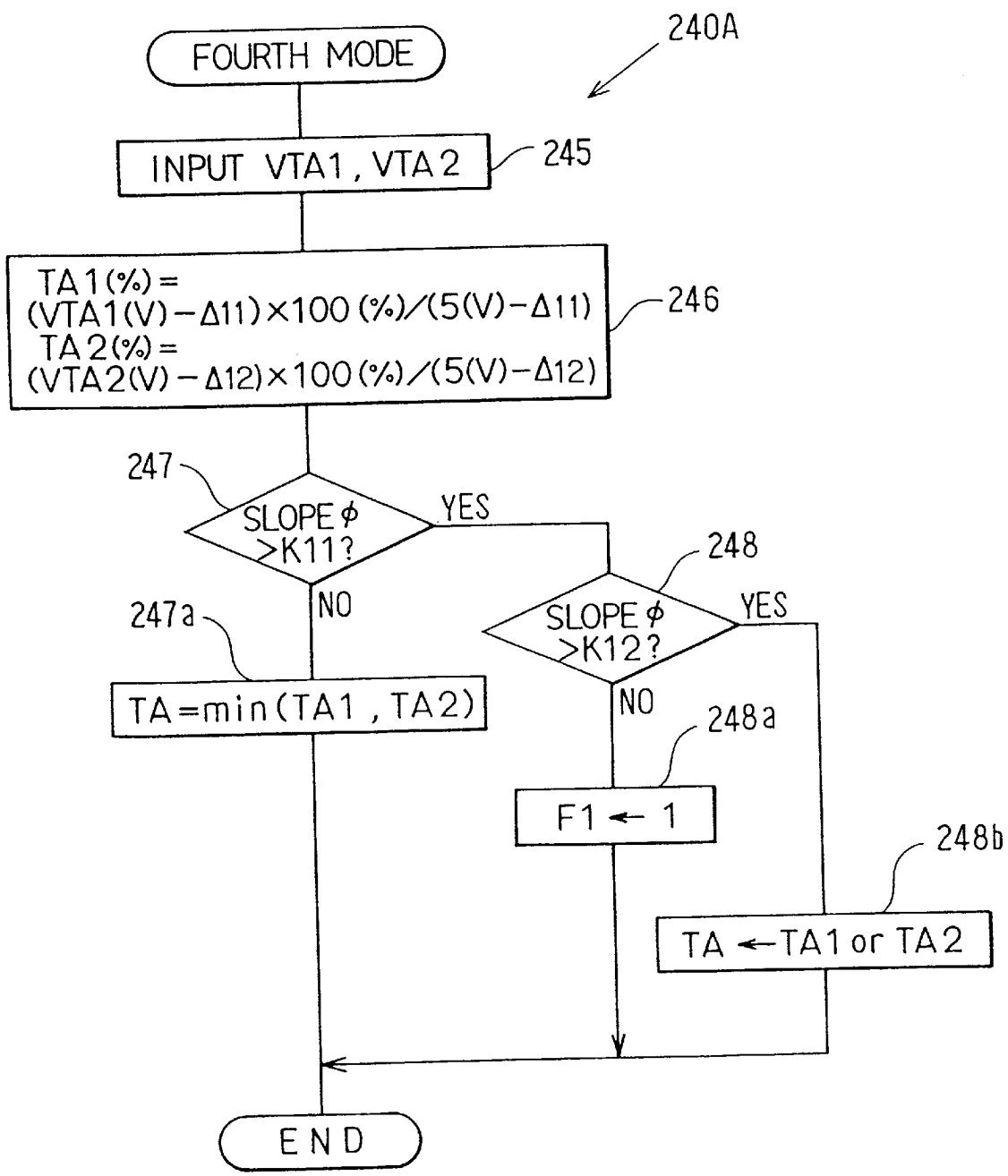
FIG. 22 is a flow chart illustrating a detail of a routine performed at a time of a fourth abnormal mode shown in FIG. 18.

If it is determined at step 201 that $\Delta 1<0$, $\Delta 2=0$, $\Delta 3=0$ and $\Delta 4=0$ with respect to either one of first and second accelerator sensors 40 and 40A, one of accelerator sensors 40 and 40A is in a fourth abnormal mode in which a characteristic line VTA-$\theta$ in FIG. 15A deviates toward the minus direction and a slope of characteristic line VTA-$\theta$ in FIG. 15A is larger than a normal slope of a characteristic line VTA-$\theta$, that is, a sensitivity of accelerator sensor 10 increases. Accordingly, a fourth abnormal mode processing routine 240A shown in FIG. 22 is executed.

Sensor voltages VTA1 and VTA2 converted into digital signals are fed to microcomputer 60 at step 245. At step 246, first and second detected depression amounts TA1 and TA2 of accelerator pedal 10 are calculated based on the sensor voltages VTA1 and VTA2, respectively, according to the following equations (22) and (23).

$$TA1(\%)=(VTA1(V)-\Delta 11)\times 100(\%)\div (5(V)-\Delta 11) \quad (22)$$

$$TA2(\%)=(VTA2(V)-\Delta 12)\times 100(\%)\div (5(V)-\Delta 12) \quad (23)$$

At step 247, it is determined with respect to an accelerator sensor in the second abnormal mode whether the abnormality in the sensor voltage VTA1 or VTA2 generated from an accelerator sensor can be corrected by equation (22) or (23). That is, when the detected slope φ of the abnormal accelerator sensor is less than or equal to the constant value K11, a final detected depression amount TA is determined at 247a by choosing a minimum value of first and second detected depression amounts TA1 and TA2 calculated by equations (22) and (23). If the detected slope φ is between the constant value K11 and the constant value K12, a first detection flag F1 is set to 1 (step 248a). If the detected slope φ is larger than or equal to the constant value K12, the final detected depression amount TA is determined at step 248b from either one of TA1 and TA2, which is calculated based on a normal sensor voltage VTA1 or VTA2.

Figure 23:
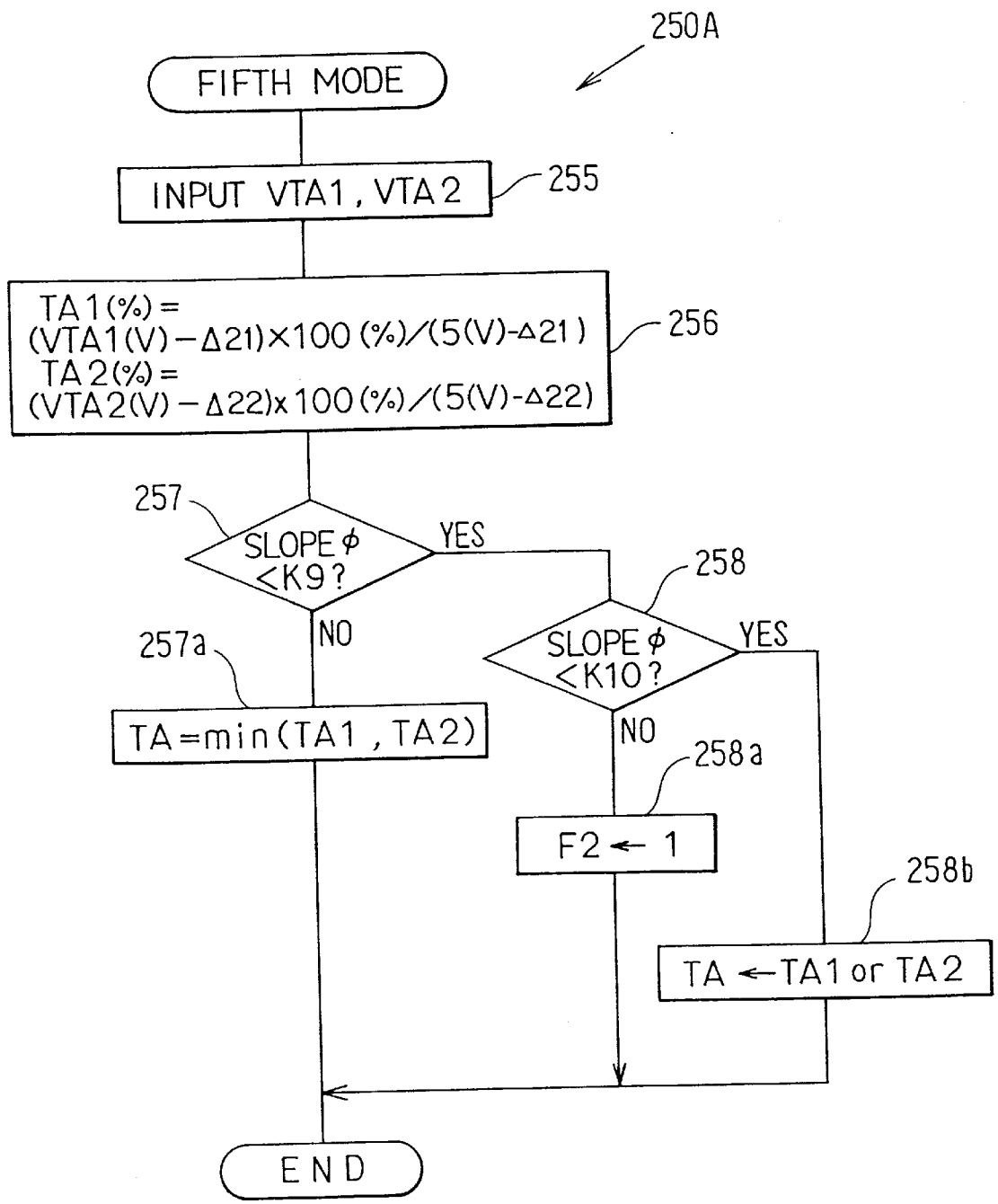
FIG. 23 is a flow chart illustrating a detail of a routine performed at a time of a fifth abnormal mode shown in FIG. 18.

If it is determined at step 201 that Δ1=0, Δ2>0, Δ3=0 and Δ4=0 with respect to either one of first and second accelerator sensors 40 and 40A, one of accelerator sensors 40 and 40A is in a fifth abnormal mode in which a characteristic line VTA-θ in FIG. 15A deviates toward the plus direction and a slope of characteristic line VTA-θ in FIG. 15A is smaller than a normal slope of a characteristic line VTA-θ, that is, a sensitivity of accelerator sensor 10 decreases. Accordingly, a fifth abnormal mode processing routine 250A shown in FIG. 23 is executed.

Sensor voltages VTA1 and VTA2 converted into digital signals are fed to microcomputer 60 at step 255. At step 256, first and second detected depression amounts TA1 and TA2 are calculated based on the sensor voltages VTA1 and VTA2, respectively, according to the following equations (24) and (25).

$$TA1(\%)=(VTA1(V)-\Delta 21)\times 100(\%) \div (5(V)-\Delta 21) \quad (24)$$

$$TA2(\%)=(VTA2(V)-\Delta 22)\times 100(\%) \div (5(V)-\Delta 22) \quad (25)$$

At steps 257 through 258b, the same steps as in the second abnormal mode are executed. As a result, a final detected depression amount TA is determined at step 257a by choosing a minimum value of first and second detected depression amounts TA1 and TA2 calculated by equations (24) and (25). When the detected slope φ is between K11 and K12, a second detection flag F2 is set to 1 (step 258a). When the detected slope φ is greater than K12, the final detected depression amount TA is determined at step 258b from either one of TA1 and TA2, which is calculated based on a normal sensor voltage VTA1 or VTA2.

Figure 24:
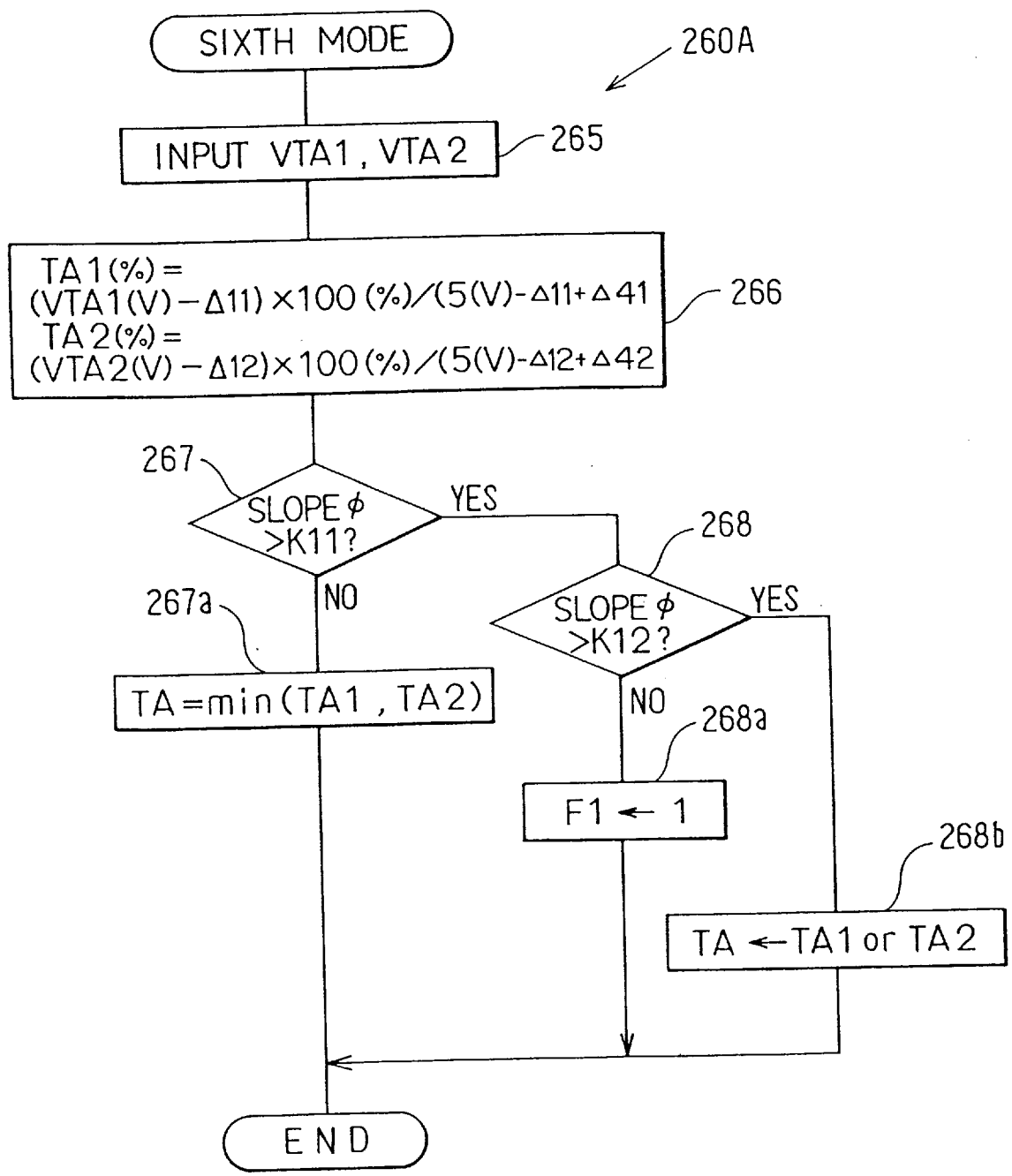
FIG. 24 is a flow chart illustrating a detail of a routine performed at a time of a sixth abnormal mode shown in FIG. 18.

If it is determined at step 201 that Δ1<0, Δ2=0, Δ3=0 and Δ4>0 with respect to either one of first and second accelerator sensors 40 and 40A, one of accelerator sensors 40 and 40A is in a sixth abnormal mode in which the detected characteristic line of VTA-θ crosses the normal characteristic VTA-θ line in FIG. 15A and a sensitivity of accelerator sensor 10 increases. Accordingly, a sixth abnormal mode processing routine 260A shown in FIG. 24 is executed.

Sensor voltages VTA1 and VTA2 converted into digital signals are fed to microcomputer 60 at step 265. At step 266, first and second detected depression amounts TA1 and TA2 are calculated based on the sensor voltages VTA1 and VTA2, respectively, according to the following equations (26) and (27).

$$TA1(\%)=(VTA1(V)-\Delta 11)\times 100(\%) \div (5(V)-\Delta 11+\Delta 41) \quad (26)$$

$$TA2(\%)=(VTA2(V)-\Delta 12)\times 100(\%) \div (5(V)-\Delta 12+\Delta 42) \quad (27)$$

At steps 267 through 268b, the same steps as in the fourth abnormal mode are executed.

Figure 25:
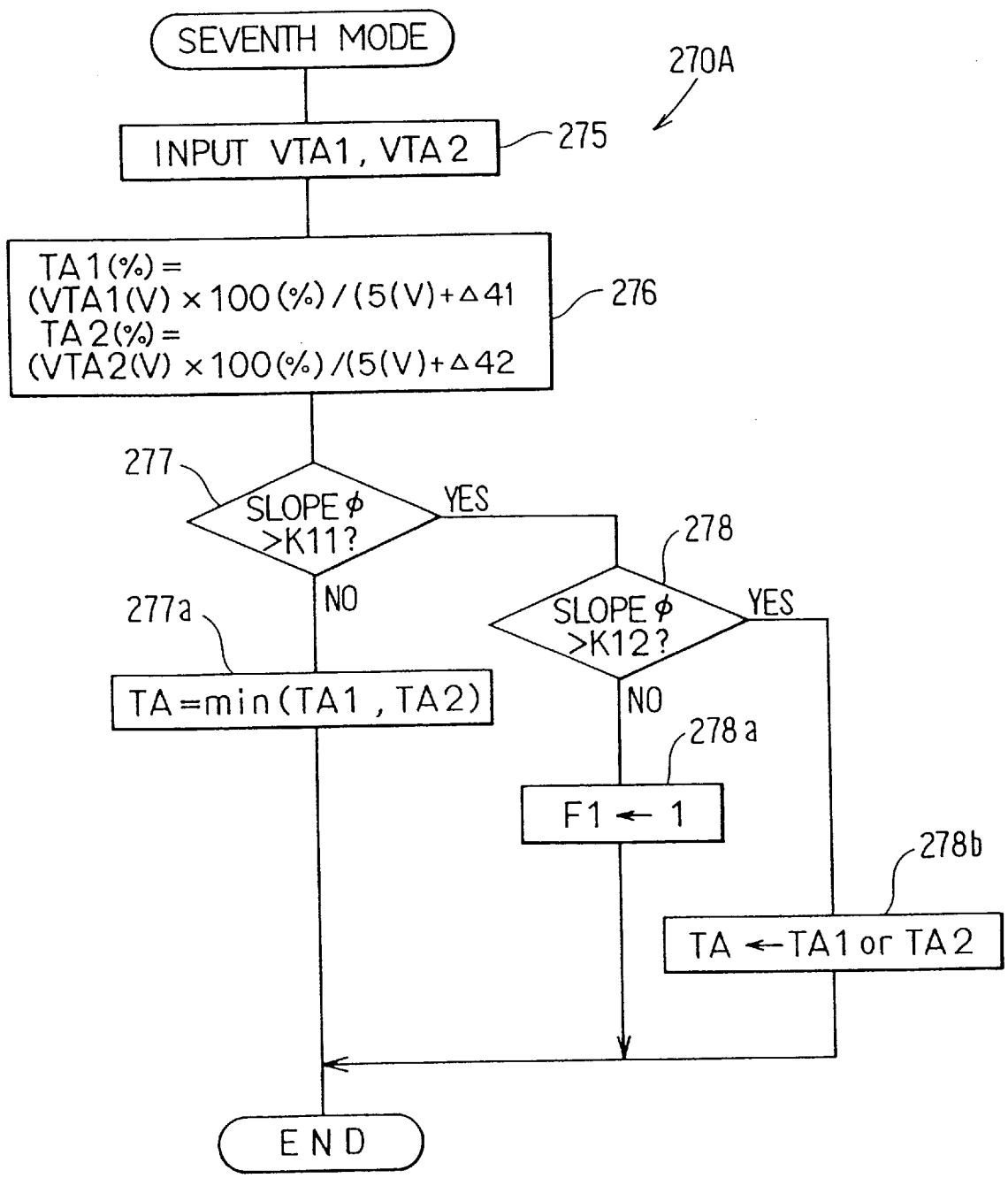
FIG. 25 is a flow chart illustrating a detail of a routine performed at a time of a seventh abnormal mode shown in FIG. 18.

If it is determined at step 201 that Δ1=0, Δ2=0, Δ3=0 and Δ4>0 with respect to either one of first and second accelerator sensors 40 and 40A, one of accelerator sensors 40 and 40A is in a seventh abnormal mode in which a characteristic line VTA-θ in FIG. 15A deviates toward the plus direction and a slope of characteristic line VTA-θ in FIG. 15A is larger than a normal slope of a characteristic line VTA-θ, that is, a sensitivity of accelerator sensor 10 increases. Accordingly, a seventh abnormal mode processing routine 270A shown in FIG. 25 is executed.

Sensor voltages VTA1 and VTA2 are fed to microcomputer 60 at step 275. At step 276, first and second detected depression amounts TA1 and TA2 are calculated based on the sensor voltages VTA1 and VTA2, respectively, according to the following equations (28) and (29).

$$TA1(\%)=VTA1(V)\times 100(\%) \div (5(V)+\Delta 41) \quad (28)$$

$$TA2(\%)=VTA2(V)\times 100(\%) \div (5(V)+\Delta 42) \quad (29)$$

At steps 277 through 278b, the same steps as the fourth abnormal mode are executed.

Figure 26:
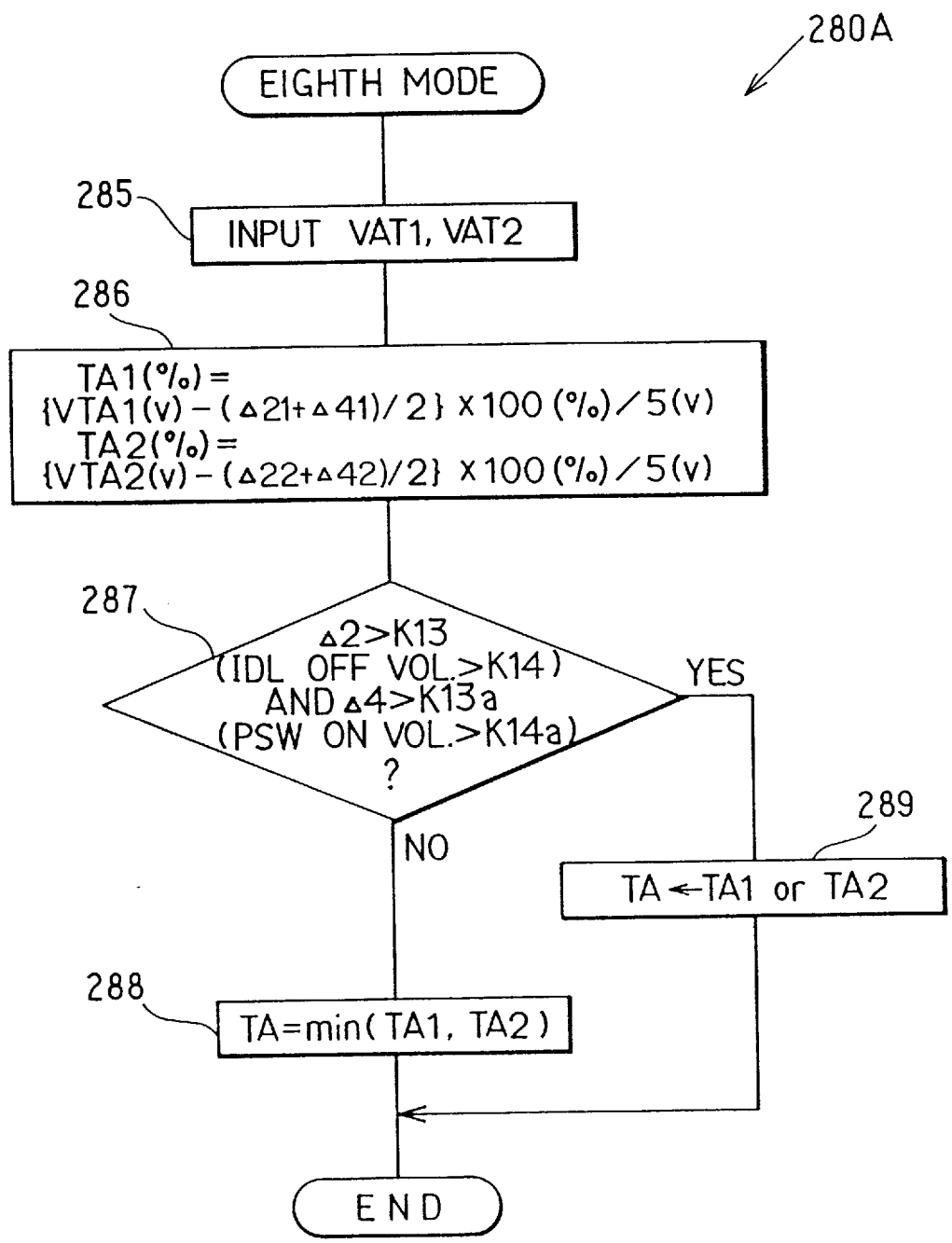
FIG. 26 is a flow chart illustrating a detail of a routine performed at a time of a eighth abnormal mode shown in FIG. 18.

If it is determined at step 201 that Δ1=0, Δ2>0, Δ3=0 and Δ4>0 with respect to either one of first and second accelerator sensors 40 and 40A, one of accelerator sensors 40 and 40A is in an eighth abnormal mode in which a characteristic line VTA-θ in FIG. 15A deviates toward the plus direction and approximately in parallel to the normal state of a characteristic line VTA-θ. Accordingly, an eighth abnormal mode processing routine 280A shown in FIG. 26 is executed.

Sensor voltages VTA1 and VTA2 are fed to microcomputer 60 at step 285. At step 286, first and second detected depression amounts TA1 and TA2 are calculated based on the sensor voltages VTA1 and VTA2, respectively, according to the following equations (30) and (31).

$$TA1(\%)=\{VTA1(V)-(\Delta 21+\Delta 41)/2\}\times 100(\%) \div 5(V) \quad (30)$$

$$TA2(\%)=\{VTA2(V)-(\Delta 22+\Delta 42)/2\}\times 100(\%) \div 5(V) \quad (31)$$

At step 287, it is determined with respect to an accelerator sensor in the eighth abnormal mode whether the abnormality in the sensor voltage VTA1 or VTA2 generated from an abnormal accelerator sensor can be corrected by equation (30) or (31) depending on the extent of the deviation of the sensor voltage VTA1 or VTA2. The process of step 287 is the same as that of step 283 described in the first embodiment. If the correction value Δ2 is less than or equal to the constant value K13 and the correction value Δ4 is less than or equal to the constant value K13a, a negative determination is made at step 287 and a final detected depression amount TA is determined by choosing a minimum value of first and second detected depression amounts TA1 and TA2 calculated by equations (30) and (31) (step 288). On the contrary, if an affirmative determination is made at step 287, the detected depression amount TA is determined at step 289 from either TA1 or TA2, which is calculated based on a normal sensor voltage VTA1 or VTA2.

Figure 27:
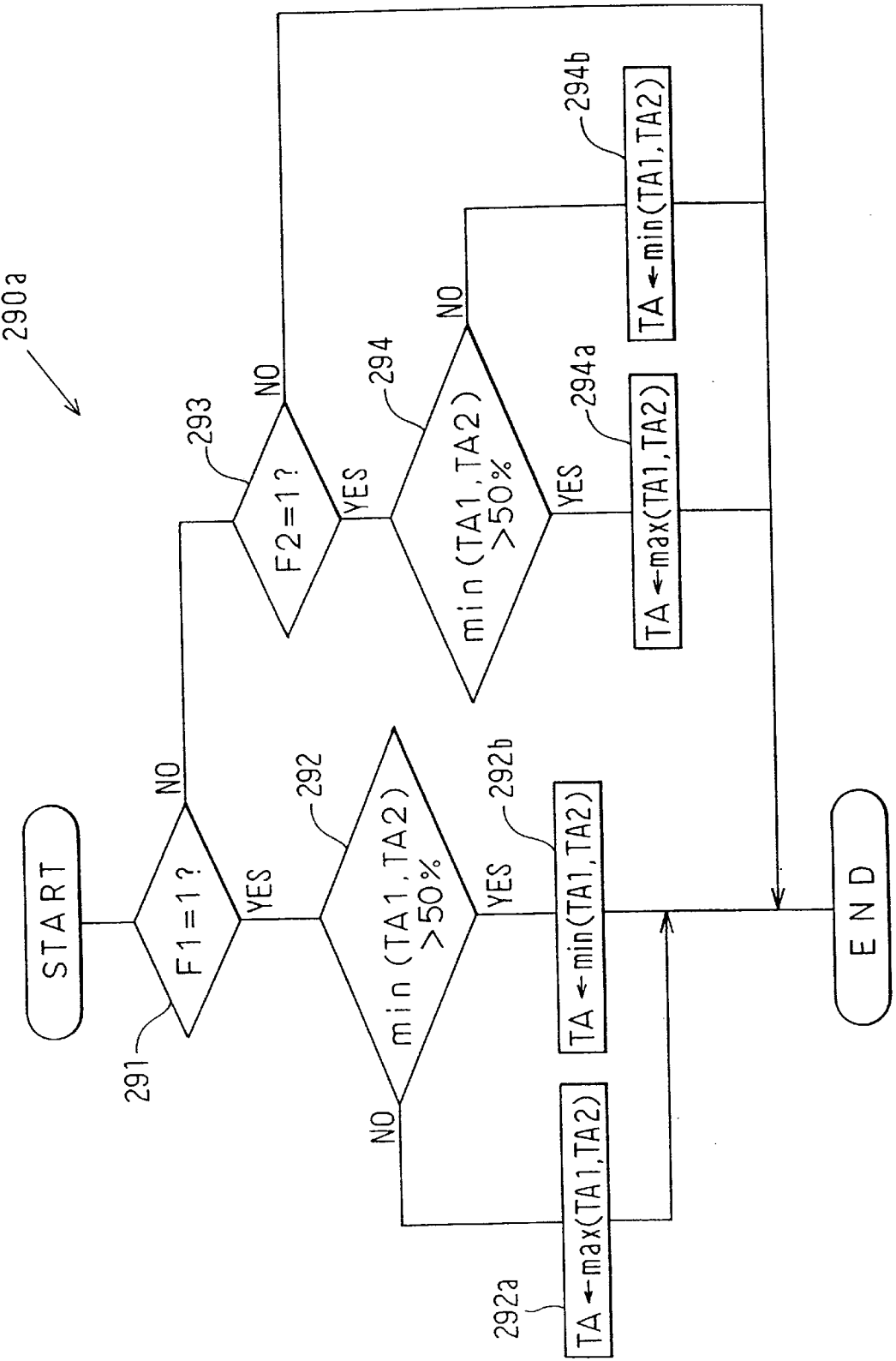
FIG. 27 is a flow chart illustrating a detail of a routine to calculate a detected depression amount TA shown in FIG. 18.

After any one of second abnormal mode processing routine 220A to seventh abnormal mode processing routine 270A is completed, a TA determination processing routine 290a shown in FIG. 27 is executed.

In the TA determination processing routine 290a, it is determined at step 291 if the first detection flag F1 is set to 1. When F1=1, the slope of characteristic line VTA-θ of one of accelerator sensors 40 and 40A becomes larger than that of a normal characteristic line VTA-θ. Accordingly, through the process of steps 292, 292a and 292b, a detected depression amount TA is determined so as to avoid the situation that a vehicle does not accelerate immediately when a driver starts depressing accelerator pedal 10. That is, it is determined at step 292 if a minimum value of TA1 and TA2 is larger than 50%. If a negative determination is made at step 292 (i.e., the minimum value is 50% or less), a maximum value of TA1 and TA2 is selected to determine a final detected depression amount TA (step 292a). If an affirmative determination is made at step 292, the minimum value is selected to determine a final detected depression amount TA (step 292b).

When F is not 1, it is determined at step 293 if the second detection flag F2 is set to 1. When F2=1, the slope of characteristic line VTA-θ of one of accelerator sensors 40 and 40A becomes smaller than that of a normal characteristic line VTA-θ. Accordingly, through the process of steps 294, 294a and 294b, a detected depression amount TA is determined so as to avoid the situation that a vehicle does not accelerate responsive to the depression of accelerator pedal 10 after accelerator pedal 10 is depressed more than half-way. That is, it is determined at step 294 if a minimum value of TA1 and TA2 is larger than 50%. If a negative determination is made at step 294 (i.e., the minimum value is 50% or less), the minimum value is selected as a final detected depression amount TA (step 294b). If an affirmative determination is made at step 294, a maximum value of TA1 and TA2 is selected as a final detected depression amount TA (step 294a).

When F1=F2=0, since a final detected depression amount TA has been already calculated in each abnormal mode processing routine, the TA determination processing routine 290a is terminated.

After processing from step 210A to step 290a is completed, an alarm light is lit at step 290b as shown in FIG. 18. Accordingly, a driver is notified that one of accelerator sensors 40 and 40A malfunctions.

Figure 28:
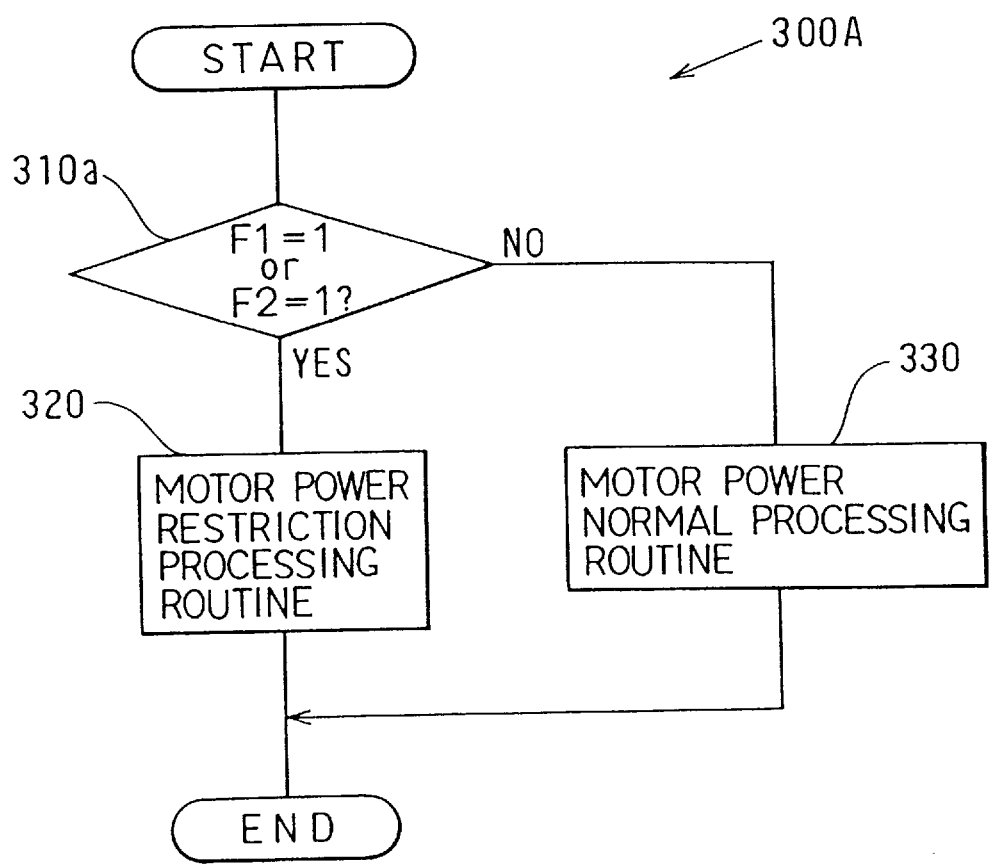
FIG. 28 is a flow chart illustrating a detailed routine to calculate an output signal to an electrical motor of a vehicle in the second embodiment.

Next, microcomputer 60 executes a routine 300A shown in FIG. 28 to calculate an output signal to electrical motor M of the vehicle.

In the routine 300A shown in FIG. 28, it is determined at step 310a if first or second detection flag F1 or F2 has been set to 1. When F1=1 or F2=1, microcomputer 60 starts a routine 320 to execute a motor power restriction processing which is the same as the routine shown in FIG. 14. When F1=0 and F2=0 at step 310a, a normal motor power output routine at step 330 is executed in the same manner as the first embodiment.

As described above, even when the sensor voltage (VTA1 or VTA2) generated from accelerator sensor (40 or 40A) is abnormal, a normal detected depression amount (TA1 or TA2) can be calculated from the sensor voltage (VTA1 or VAT2) while the output is compensated base on the deviation from its normal output. In addition, a final detected depression amount TA is determined by generally choosing a minimum value of TA1 and TA2. Therefore, electrical motor M of the vehicle can be controlled safely.

In the second embodiment, it is assumed that either of first and second accelerator sensors 40 and 40A malfunctions. This is because it is inconceivable that both of first and second accelerator sensors 40 and 40A fail at the same time. However, even when it happens, since normal detected depression amounts TA1 and TA2 can be calculated due to the equations described above corresponding to their abnormal modes, the motor M can be controlled normally.

(Third Embodiment)

Next, a third embodiment of the present embodiment is explained with reference to FIGS. 29 and 30.

Figure 29:
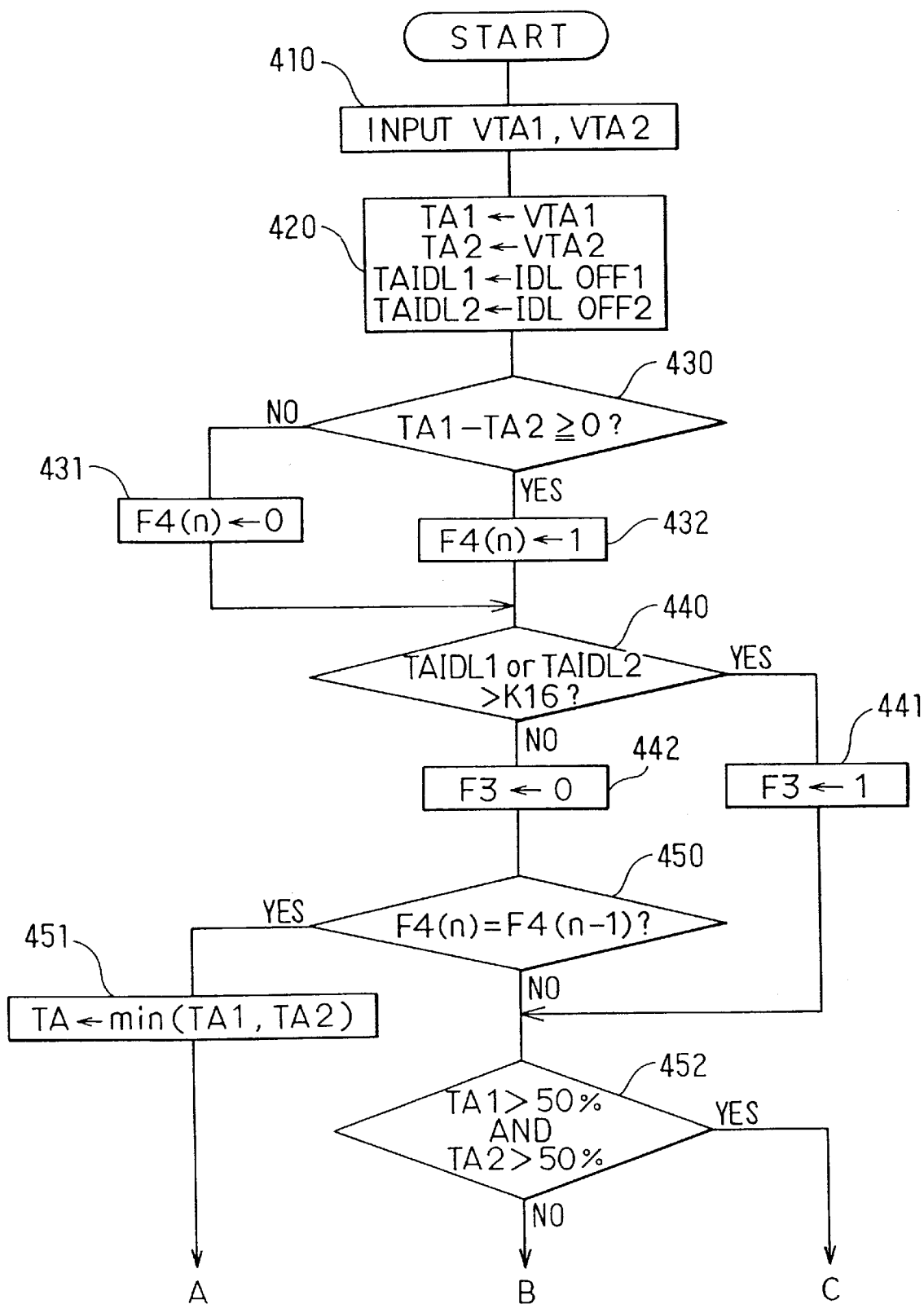
FIG. 29 is a flow chart illustrating a part of a process performed by a microcomputer in a third embodiment.
Figure 30:
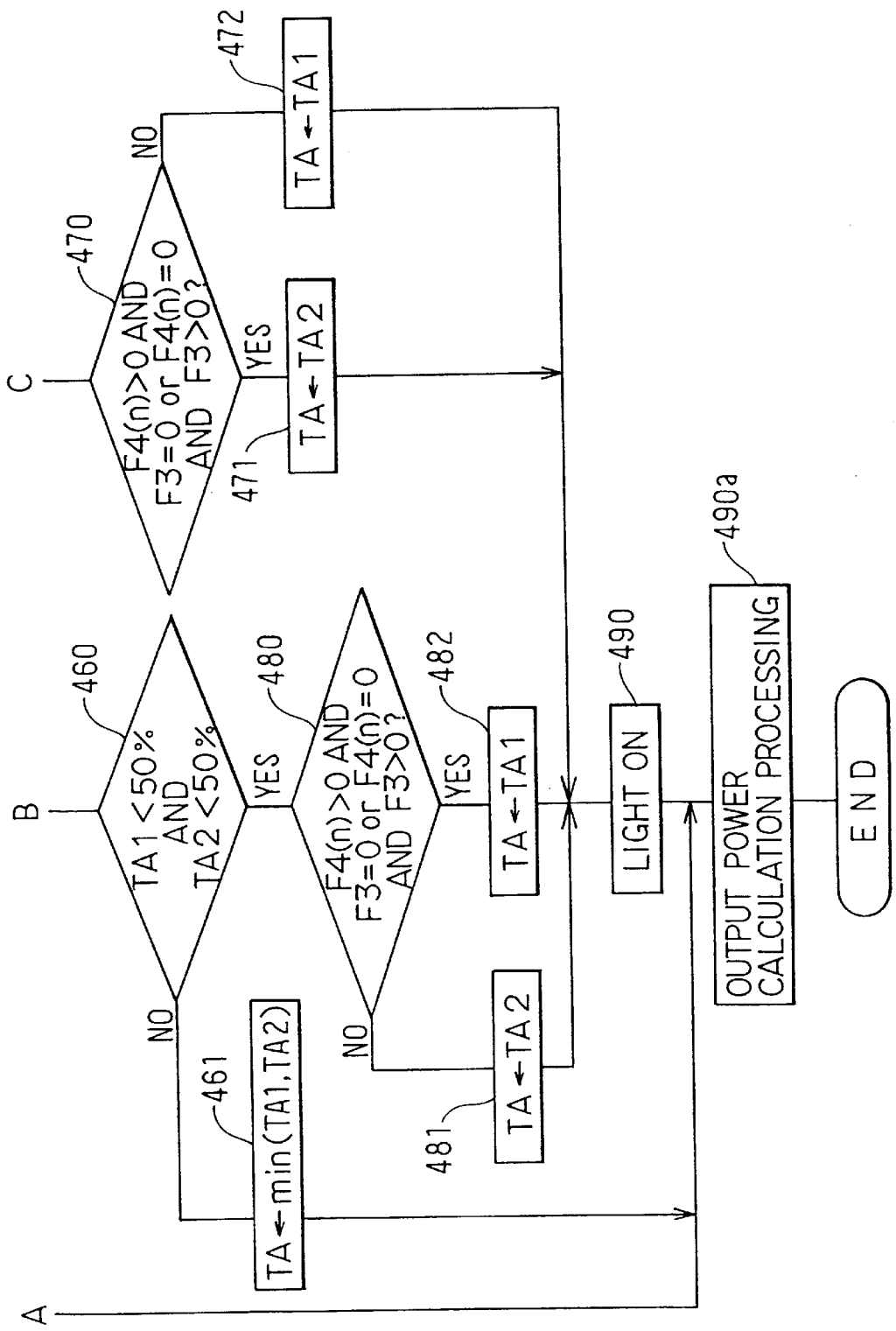
FIG. 30 is a flow chart illustrating a remainder of a process performed by a microcomputer in a third embodiment.

A microcomputer 60 of the third embodiment executes flow charts shown in FIGS. 29 and 30 instead of flow charts shown in FIGS. 2, 3, 18 through 28 described in the second embodiment. The other structures of the third embodiment are the same as the second embodiment.

In FIG. 29, sensor voltages VTA1 and VTA2 converted into digital signals are fed to microcomputer 60 at step 410. At step 420, first and second detected depression amounts TA1 and TA2 are calculated based on sensor voltages VTA1 and VTA2 according to the foregoing equation (5), respectively. In addition, first and second IDL depression amounts TAIDL1 and TAIDL2 are calculated from sensor voltages VTA1 and VTA2, respectively, when IDLSW 20 outputs an ON signal.

At step 430, first detected depression amount TA1 is compared with second detected depression amount TA2. When TA1<TA2, a flag F4(n) is set to 0 at step 431. When TA1≧TA2, the flag F4(n) is set to 1 at step 432. That is, the flag F4(n) shows which of TA1 and TA2 is greater.

At step 440, it is determined if first IDL depression amount TAIDL1 or second IDL depression amount TAIDL2 is larger than a constant value K16. When TAIDL1>K16 or TAIDL2>K16, since it is assumed that the sensitivity of either of accelerator sensors 40 and 40A decreases, a sensitivity decrease flag F3 is set to 1 at step 441. When TAIDL1≦K16 and TAIDL2≦K16, the sensitivity decrease flag F3 is set to 0 at step 442.

It is determined at step 450 if a flag F4(n) is equal to a flag F4 (n–1). F4 (n–1) shows a previous relation between TA1 and TA2. It should be noted that if a relation of F4(n)=F4 (n–1) is not fulfilled even once, the processing of microcomputer 60 proceeds from step 450 to step 452 ever afterward. In other words, the processing of step 450 is executed to determine whether one of accelerator sensors 40 and 40A erroneously produces a sensor voltage that is offset from the other, even though both sensors might have the same sensitivity.

When the relation of F4=F4(n–1) is fulfilled, a final detected depression amount TA is determined at step 451 by choosing a minimum value of TA1 and TA2 in order to drive electrical motor M safely.

When the relation of F4(n)=F4(n–1) is not fulfilled, it is determined at step 452 if first and second detected depression amounts TA1 and TA2 are both greater than 50% and it is determined at step 460 (FIG. 30) if first and second detected depression amounts TA1 and TA2 are both less than 50%. If TA1=TA2=50%, or one of TA1 and TA2 is greater than 50% and the other of TA1 and TA2 is less than 50%, a final detected depression amount TA is determined at step 461 by choosing a minimum value of TA1 and TA2 in order to drive electrical motor M safely.

When TA1<50% and TA2<50%, an abnormal mode of either of accelerator sensors 40 and 40A is identified at step 480. That is, if F4(n)>0 and F3=0, it can be assumed that second accelerator sensor 40A is in an abnormal mode in which the sensitivity of second accelerator sensor 40A increases. In addition, if F4(n)=0 and F3>0, it can be assumed that second accelerator sensor 40A is in an abnormal mode in which the sensitivity of second accelerator sensor 40A decreases. Accordingly, in these cases, a final detected depression amount TA is determined based only on first detected depression amount TA1 at step 482.

In contrast, When F4(n)>0 and F3>0, it can be assumed that first accelerator sensor 40 is in an abnormal mode in which the sensitivity of first accelerator sensor 40 decreases. In addition, if F4(n)=0 and F3=0, it can be assumed that first accelerator sensor 40 is in an abnormal mode in which the sensitivity of first accelerator sensor 40 increases. Accordingly, in these cases, a final detected depression amount TA is determined based only on second detected depression amount TA2 at step 481.

When TA1>50% and TA2>50%, an abnormal mode of either of accelerator sensors 40 and 40A is identified at step 470. That is, if F4(n)>0 and F3=0, it can be assumed that first accelerator sensor 40 is in an abnormal mode in which the sensitivity of first accelerator sensor 40 increases. In addition, if F4(n)=0 and F3>0, it can be assumed that first accelerator sensor 40 is in an abnormal mode in which the sensitivity of first accelerator sensor 40 decreases. Accordingly, in these cases, a final detected depression amount TA is determined based only on second detected depression amount TA21 at step 471.

In contrast, When F4(n)>0 and F3>0, it can be assumed that second accelerator sensor 40A is in an abnormal mode in which the sensitivity of second accelerator sensor 40A decreases. In addition, if F4(n)=0 and F3=0, it can be assumed that second accelerator sensor 40 is in an abnormal mode in which the sensitivity of second accelerator sensor 40A increases. Accordingly, in these cases, a final detected depression amount TA is determined based only on first detected depression amount TA1 at step 472.

After any one of steps 471, 472, 481 and 482 is completed, an alarm light L is lit at step 490.

At step 490a, microcomputer 60 executes a processing to calculate an output signal to motor M based on the final detected depression amount TA calculated in FIGS. 29 and 30.

By the processing shown in FIGS. 29 and 30, when first accelerator sensor 40 or second accelerator sensor 40A malfunctions, a final detected depression amount TA is determined from either of first and second detected depression amounts TA1 and TA2 which is derived from a normal sensor voltage. Therefore, the motor M is safely and properly controlled responsive to the final detected depression amount TA.

It is preferable to calculate a corrected detected depression amount by using the equations described in the second embodiment, when accelerator sensors 40 and 40A malfunction. This is because the motor M can be controlled even when both accelerator sensors malfunction at the same time.

Next, a first modification of the third embodiment will be explained with reference to FIGS. 31 and 32.

Figure 31:
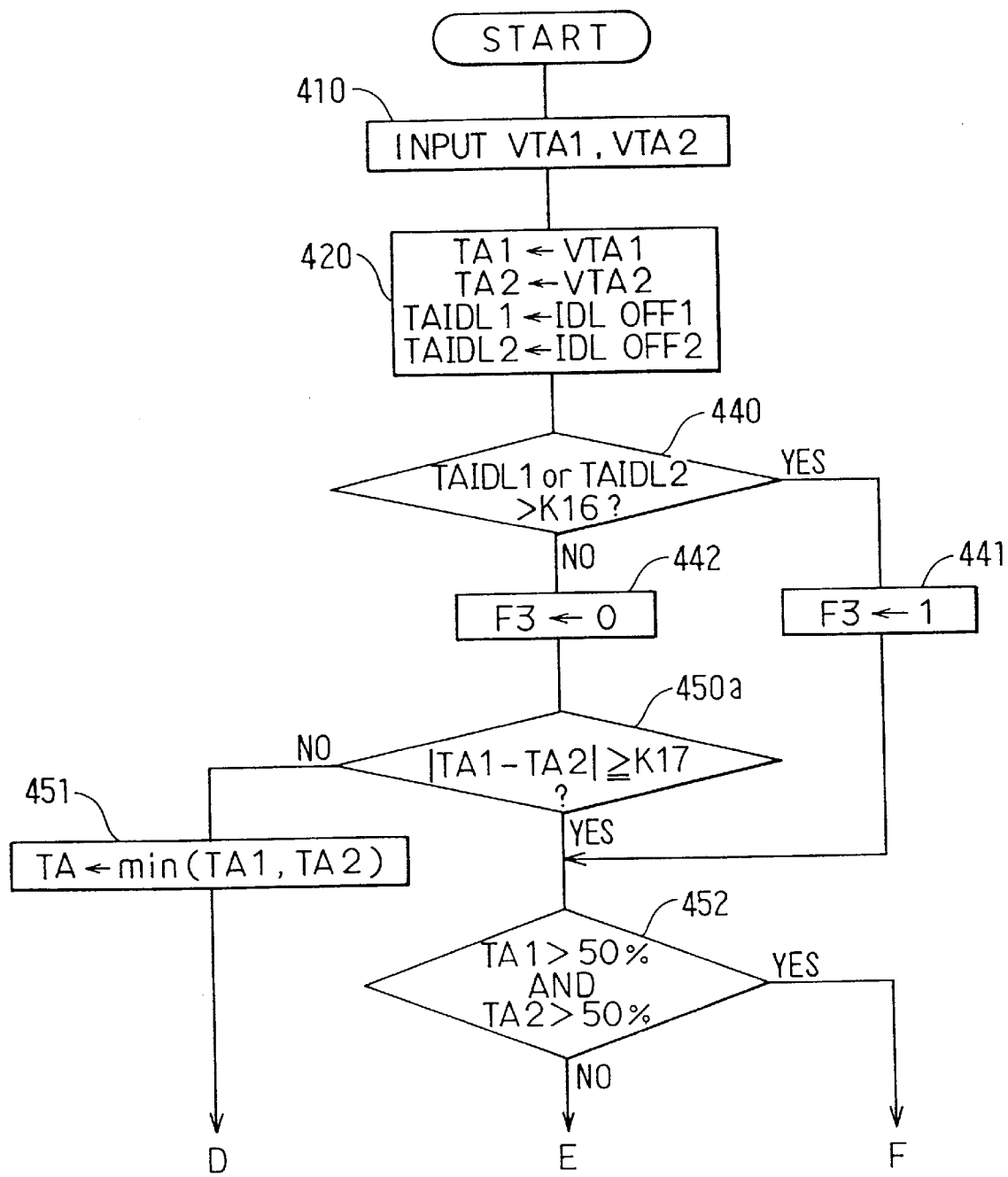
FIG. 31 is a flow chart illustrating a part of a process performed by a microcomputer in a first modification of the third embodiment.
Figure 32:
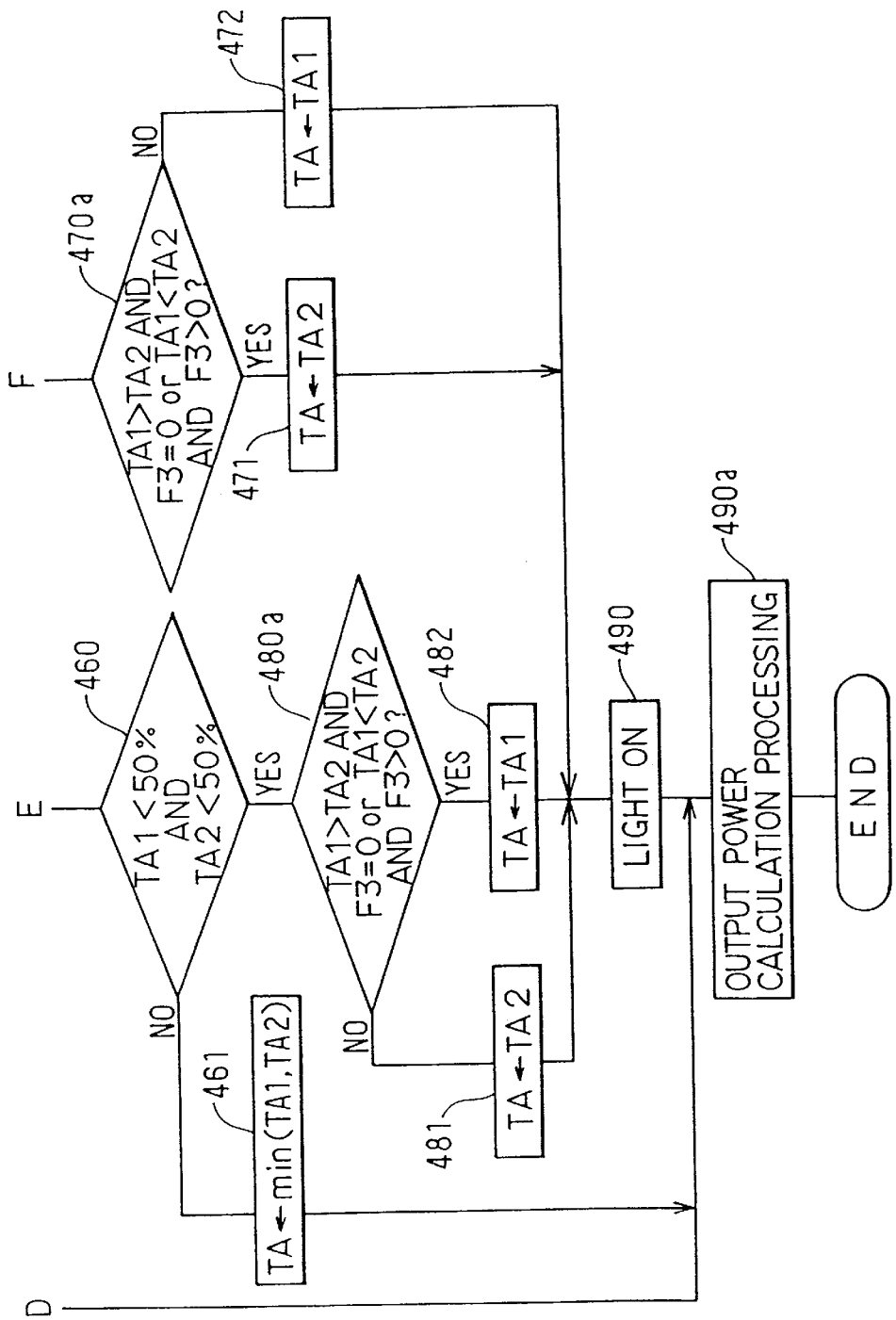
FIG. 32 is a flow chart illustrating a remainder of a process performed by a microcomputer in a first modification of the third embodiment.

In the first modification, flow charts shown in FIGS. 31 and 32 are executed instead of flow charts shown in FIGS. 29 and 30. The other structure of the third embodiment is the same as the third embodiment.

After, the same process of steps 410, 420, and 440–442 as the third embodiment is completed, the absolute value of the difference between TA1 and TA2 is compared with a constant value K17 at step 450a. If a negative determination is made at step 450a, a final detected depression amount TA is determined at step 451 by choosing a minimum value of TA1 and TA2 in order to drive the electrical motor M safely.

If an affirmative determination is made at step 450a, it can be assumed that the sensitivity of one of first and second accelerator sensors 40 and 40A increases. This is because the difference of TA1 and TA2 is remarkably large regardless of detecting no decrease of a sensor sensitivity.

At steps 452 and 460 (see FIG. 32), it is determined if first and second detected depression amounts TA1 and TA2 are both greater than 50% or are both less than 50%. If TA1=TA2=50%, or one of TA1 and TA2 is greater than 50% and the other of TA1 and TA2 is less than 50%, a final detected depression amount TA is determined at step 461 by choosing a minimum value of TA1 and TA2 in order to drive electrical motor M safely.

When TA1<50% and TA2<50%, an abnormal mode of either of accelerator sensors 40 and 40A is identified at step 480a. That is, if TA1>TA2 and F3=0, it can be assumed that second accelerator sensor 40A is in an abnormal mode in which the sensitivity of second accelerator sensor 40A increases. In addition, if TA1<TA2 and F3>0, it can be assumed that second accelerator sensor 40A is in an abnormal mode in which the sensitivity of second accelerator sensor 40A decreases. Accordingly, in these cases, a final detected depression amount TA is determined based only on first detected depression amount TA1 at step 482.

In contrast, When TA1>TA2 and F3>0, it can be assumed that first accelerator sensor 40 is in an abnormal mode in which the sensitivity of first accelerator sensor 40 decreases. In addition, if TA1<TA2 and F3=0, it can be assumed that first accelerator sensor 40 is in an abnormal mode in which the sensitivity of first accelerator sensor 40 increases. Accordingly, in these cases, a final detected depression amount TA is determined only based on second aimed depression amount TA2 at step 481.

When TA1>50% and TA2>50%, an abnormal mode of either of accelerator sensors 40 and 40A is identified at step 470a. That is, if TA1>TA2 and F3=0, or TA1<TA2 and F3>0, it can be assumed that first accelerator sensor 40 is in an abnormal mode. Accordingly, in these cases, a final detected depression amount TA is determined based only on second detected depression amount TA2 at step 471.

In contrast, When TA1>TA2 and F3>0, or TA1<TA2 and F3=0, it can be assumed that second accelerator sensor 40 is in an abnormal mode. Accordingly, in these cases, a final detected depression amount TA is determined based only on first detected depression amount TA1 at step 472.

The first modification can realize the same function and result as the third embodiment.

Next, a second modification of the third embodiment is explained with reference to FIG. 33.

Figure 33:
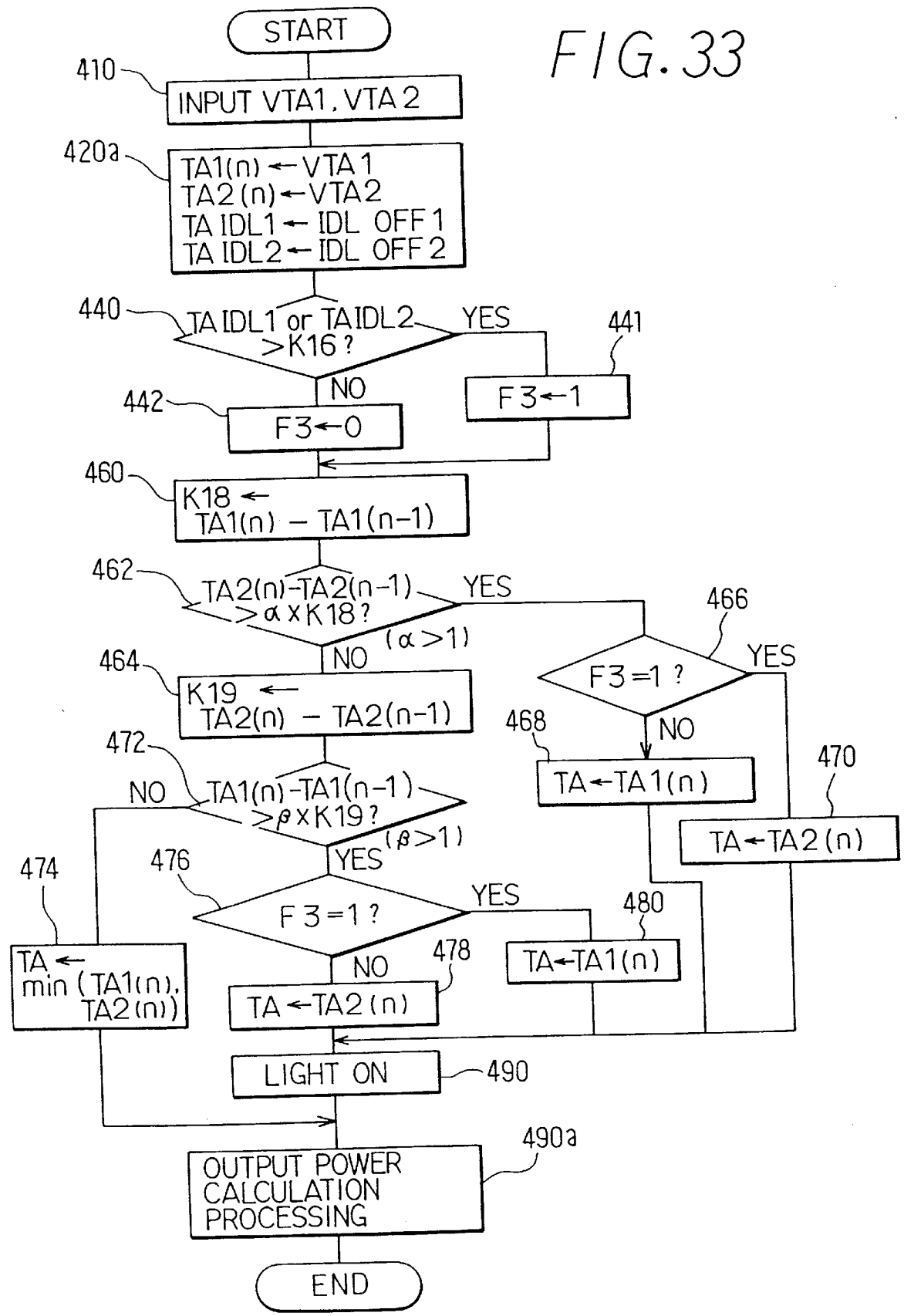
FIG. 33 is a flow chart illustrating a process performed by a microcomputer in a second modification of the third embodiment.

In the second modification, the flow chart shown in FIG. 33 is executed instead of flow charts shown in FIGS. 29 and 30. The other structures of this second modification of the third embodiment are the same as the third embodiment.

After the same process of steps 410 as the third embodiment is completed, at step 420a, present first detected depression amount TA1(n) and present second detected depression amount TA2(n) are calculated based on first and second sensor voltages VTA1 and VTA2, respectively. In addition, first and second IDL depression amounts TAIDL1 and TAIDL2 are calculated from sensor voltages VTA1 and VTA2, respectively, when IDLSW 20 outputs an ON signal.

At step 440, it is determined if the sensitivity of either of accelerator sensors 40 and 40A decreases. When the sensitivity decreases, a sensitivity decrease flag F3 is set to 1 at step 441. When the sensitivity does not decrease, the sensitivity decrease flag F3 is set to 0 at step 442.

At step 460, a difference between present and previous first detected depression amounts TA1(n) and TA1(n−1) is substituted for K18. It is determined at step 462 if the difference between present and previous second detected depression amounts TA2(n) and TA2(n−1) is greater than a value α×K18 (α>1). If an affirmative determination is made, it is determined at step 466 if F3=1. If F3 is not 1, since the sensitivity of second accelerator sensor 40A has increased abnormally, a final detected depression amount TA is determined based on TA1(n) at step 468. If F3=1, since the sensitivity of first accelerator sensor 40 has decreased abnormally, a final detected depression amount TA is determined based on TA2(n) at step 470.

When a negative determination is made at step 462, the difference between TA2(n) and TA2(n-1) is substituted for K19 at step 464. It is determined at step 472 whether the difference between present and previous first detected depression amounts TA1(n) and TA1(n-1) is greater than a value β×K19 (β>1). If an affirmative determination is made, it is determined at step 476 if F3=1. If F3 is not 1, since the sensitivity of first accelerator sensor 40 has increased abnormally, a final detected depression amount TA is determined based on TA2(n) at step 478. If F3=1, since the sensitivity of second accelerator sensor 40A has decreased abnormally, a final detected depression amount TA is determined based on TA1(n) at step 480.

If a negative determination is made at step 472, a final detected depression amount TA is determined at step 474 by choosing a minimum value of TA1(n) and TA2(n) in order to drive electrical motor M safely.

When the TA is set at steps 468, 470, 478 and 480, an alarm light L is lit at step 490. At step 490a, microcomputer 60 executes a processing to calculate an output signal to motor M based on the final detected depression amount TA calculated in FIG. 33.

The second modification can realize the same function and result as the third embodiment.

(Fourth Embodiment)

Next, a fourth embodiment of the present embodiment will be explained with reference to FIGS. 34 and 35.

Figure 34:
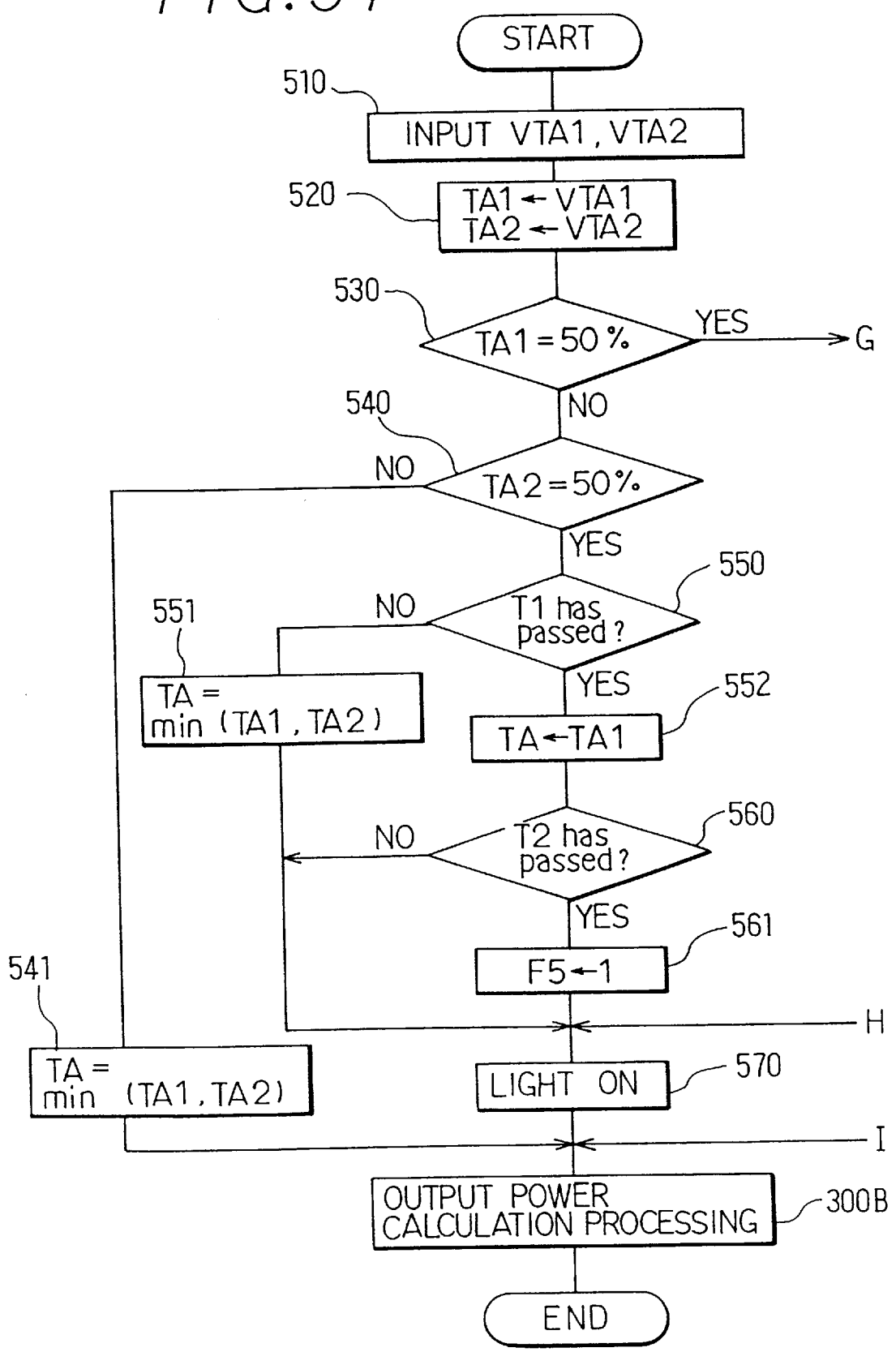
FIG. 34 is a flow chart illustrating a part of a process performed by a microcomputer in a fourth embodiment.
Figure 35:
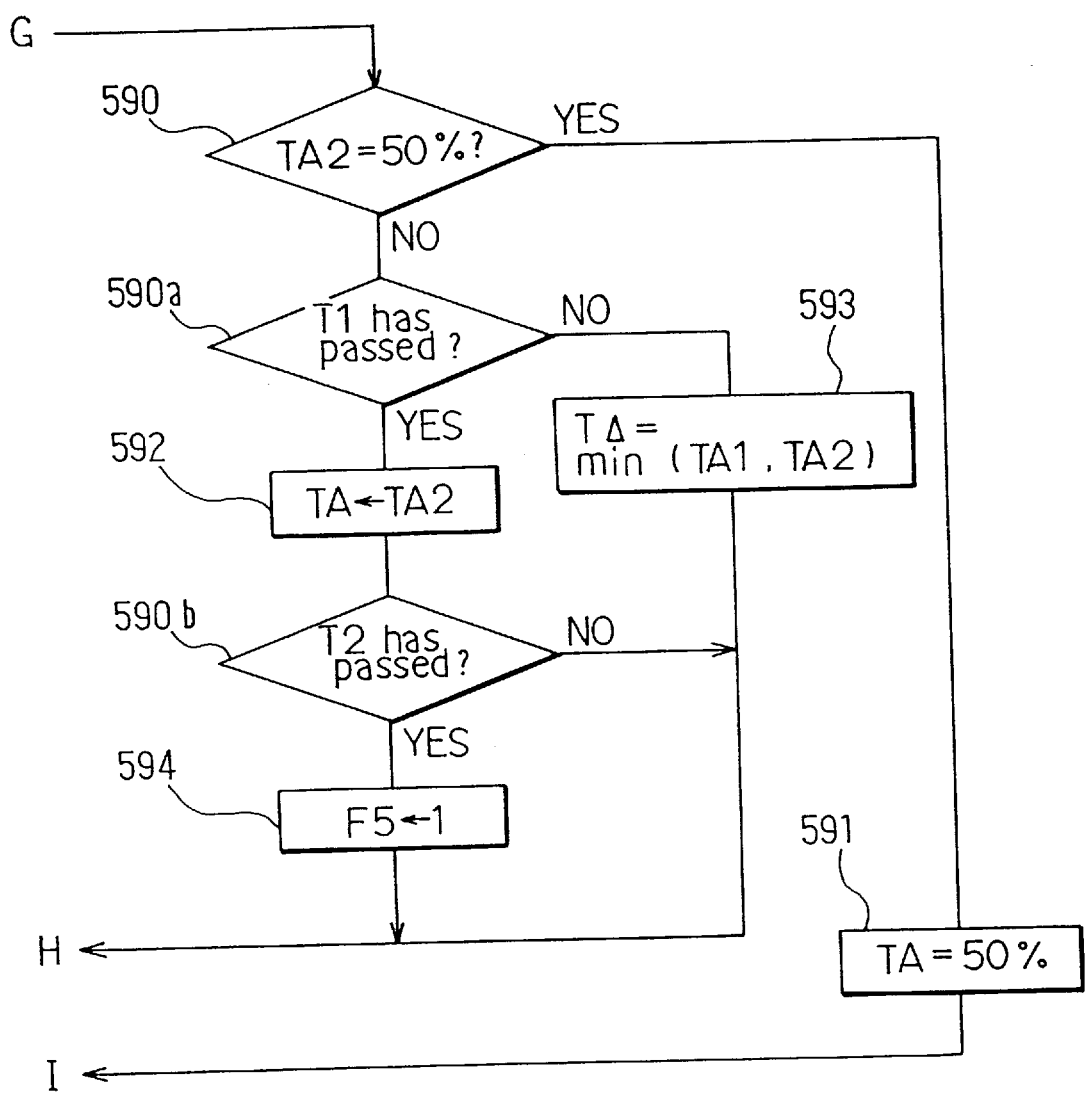
FIG. 35 is a flow chart illustrating a remainder of a process performed by a microcomputer in a fourth embodiment.

A microcomputer 60 of the fourth embodiment executes flow charts shown in FIGS. 34 and 35 instead of flow charts shown in FIGS. 2, 3, 18 through 28 described in the second embodiment. The other structures of the fourth embodiment are the same as the second embodiment.

In FIG. 34, sensor voltages VTA1 and VTA2 converted into digital signals are fed to microcomputer 60 at step 510. At step 520, first and second detected depression amounts TA1 and TA2 are calculated based on sensor voltages VTA1 and VTA2 according to the foregoing equation (5).

If both first and second detected depression amounts TA1 and TA2 are 50%, a final detected depression amount TA is set to 50% (steps 530→590(See FIG. 35)→591). In contrast, if neither first nor second detected depression amounts TA1, TA2 are 50%, a final detected depression amount TA is determined by choosing a minimum value of TA1 and TA2 in order to drive electrical motor M safely (steps 530→540→541).

If it is determined that TA1=50% and TA2≠50% (steps 530 and 590), the processing of microcomputer 60 proceeds to step 590a and it is determined if a state of TA1=50% and TA2≠50% lasts for a first predetermined period T1 (e.g., 100 ms). When a negative determination is made at step 590a, a final detected depression amount TA is determined by choosing a minimum value of TA1 and TA2 in order to drive electrical motor M safely.

When an affirmative determination is made at step 590a, since first accelerator sensor 40 is not working properly, the final detected depression amount TA is set from second detected depression amount TA2 at step 592. At step 590b, it is determined if the state of TA1=50% and TA2≠50% lasts for a second predetermined period T2 (e.g., 500 ms) which is longer than the first predetermined period T1. If an affirmative determination is made at step 590b, first accelerator sensor 40 has an abnormality since it is continuing to output an intermediate voltage. Therefore, flag F5, showing that the abnormality has occurred in one of first and second accelerator sensors 40 and 40A, is set to 1 at step 594.

When an affirmative determination is made at step 540, it is determined at step 550 if a state of TA1≠50% and TA2=50% lasts for the first predetermined period T1. When a negative determination is made at step 550, a final detected depression amount TA is determined at step 551 by choosing a minimum value of TA1 and TA2 in order to drive electrical motor M safely.

When an affirmative determination is made at step 550, since the second accelerator sensor 40A is not working properly, the final detected depression amount TA is set from first detected depression amount TA1 at step 552. At step 560, it is determined if the state of TA1=50% and TA2≠50% lasts for the second predetermined period T2 which is longer than the first predetermined period T1. If an affirmative determination is made at step 560, second accelerator sensor 40A has an abnormality since it is continuing to output an intermediate voltage. Therefore, flag F5, showing that the abnormality has occurred in one of first and second accelerator sensors 40 and 40A, is set to 1 at step 561.

After the processing of step 551, 561, 593 or 594 is completed, an alarm light L is lit at step 570.

Figure 36:
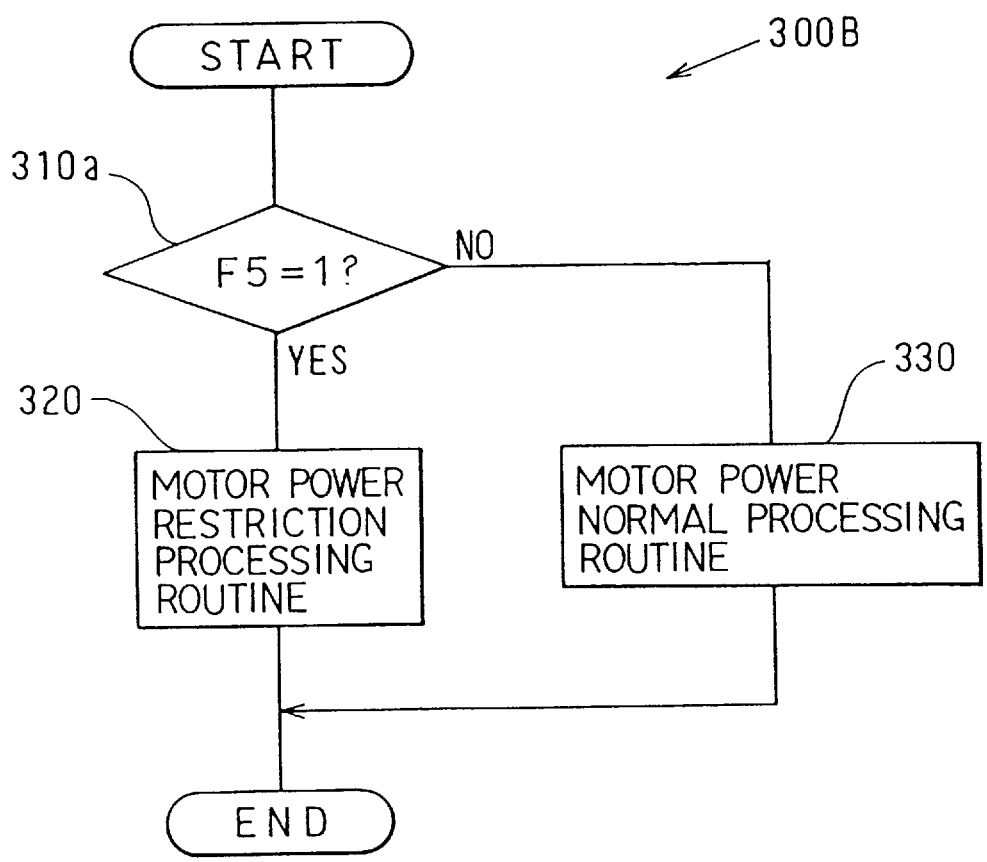
FIG. 36 is a flow chart illustrating a detailed routine to calculate an output signal to an electrical motor of a vehicle in the fourth embodiment.

After that, microcomputer 60 executes a routine 300B shown in FIGS. 34 and 36 to calculate an output signal to motor M based on the final detected depression amount TA calculated in step 541, 551, 552, 591, 592 or 593. In the routine 300B, when flag F5 has been set to 1 at step 561 or 594, the same motor power restriction processing as that shown in FIG. 13 and described in the first embodiment is started at step 320. When flag F5 is set to 0, a normal motor power output processing is executed at step 330.

As described above, when either first or second accelerator sensor 40 or 40A has an abnormality since it continues to output an intermediate voltage, the final detected depression amount TA is derived from only a detected depression amount calculated based on a normal sensor voltage generated by an accelerator sensor having no abnormality. Therefore, the motor M can be safely and properly driven.

In the fourth embodiment, first and second detected depression amounts TA1 and TA2 are calculated so as to be in proportion to the sensor voltages VTA1 and VTA2, respectively. However, first and second detected depression amounts TA1 and TA2 may be calculated correcting sensor voltages VTA1 and VTA2 in the same way as the second embodiment.

(Fifth Embodiment)

Next, a fifth embodiment of the present embodiment is explained with reference to FIGS. 37 and 38.

Figure 37:
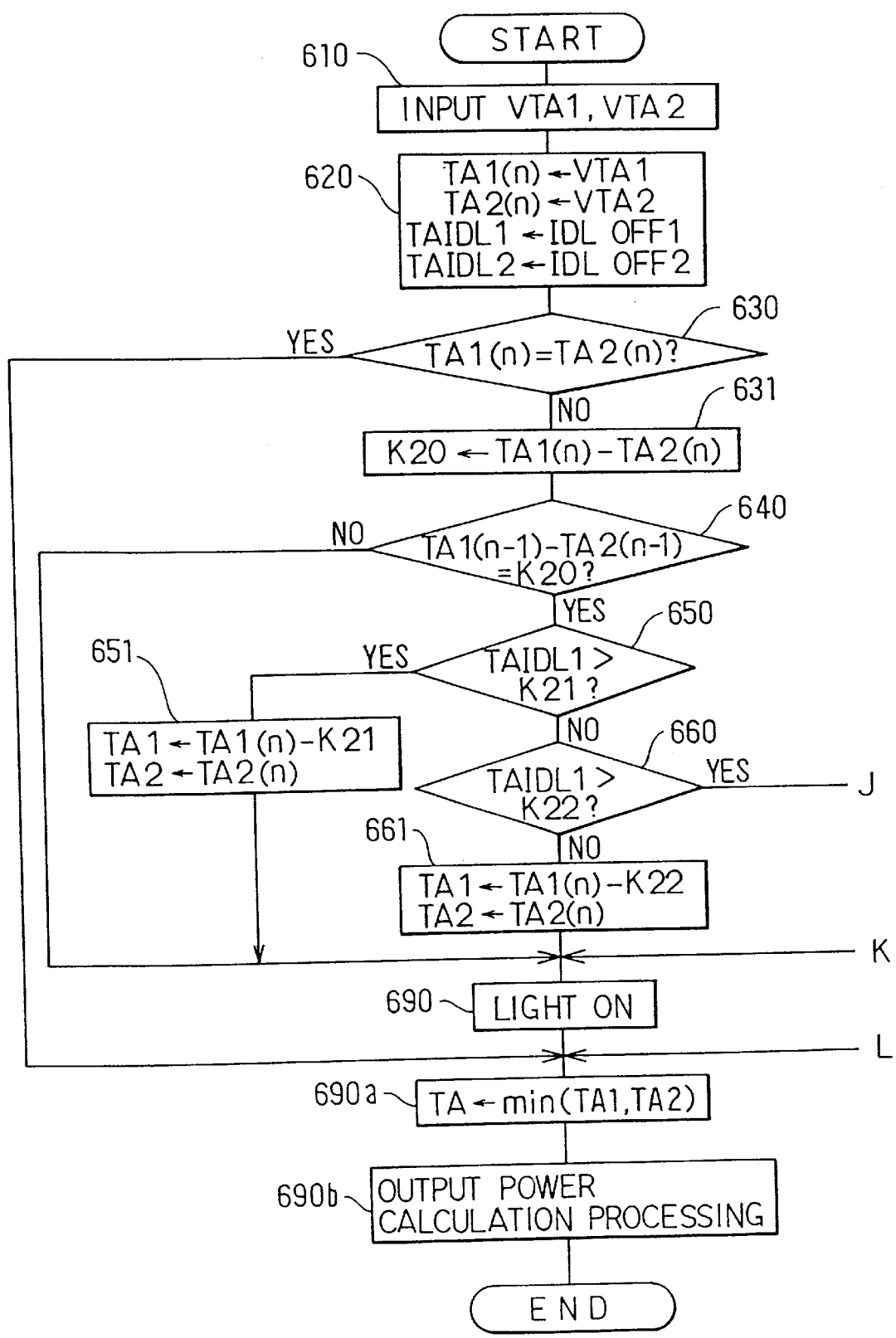
FIG. 37 is a flow chart illustrating a part of a process performed by a microcomputer in a fifth embodiment.
Figure 38:
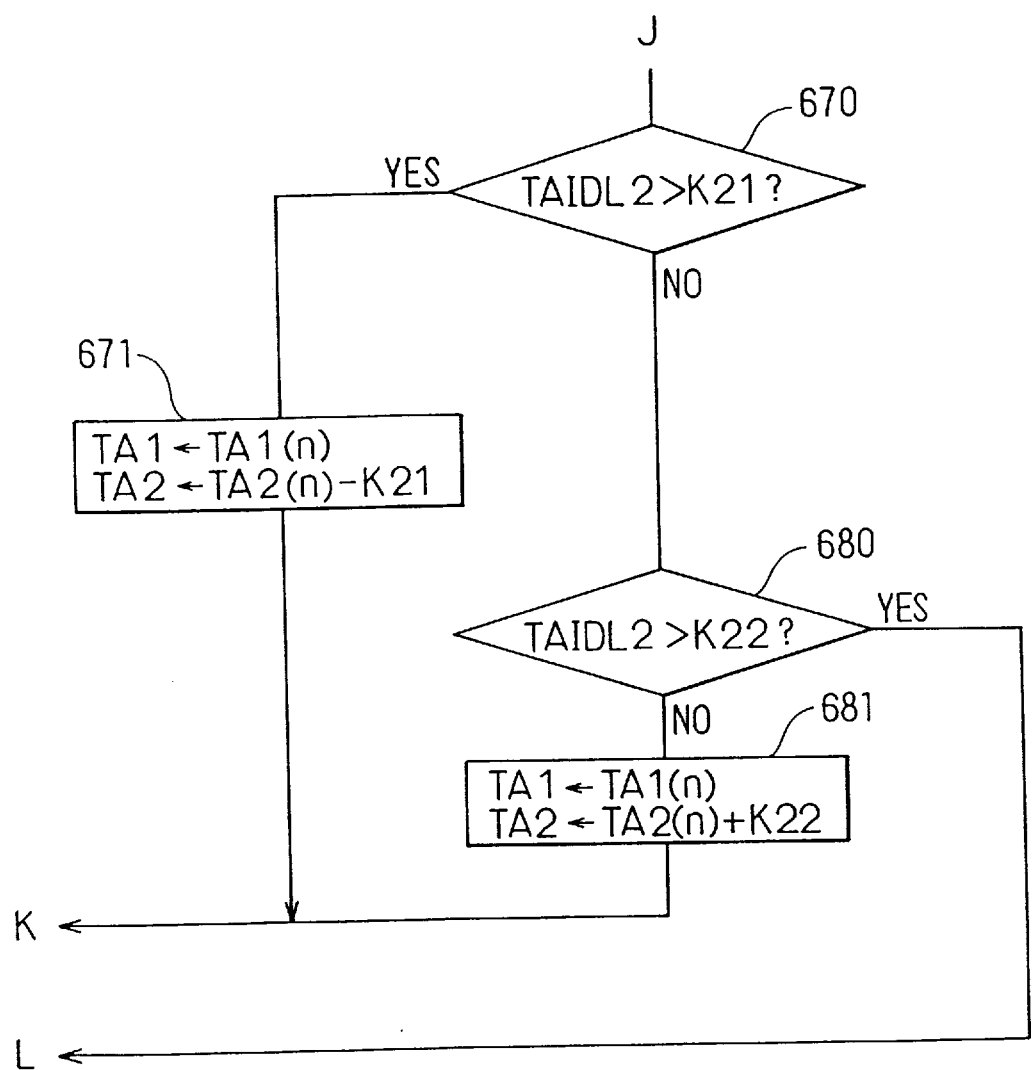
FIG. 38 is a flow chart illustrating a remainder of a process performed by a microcomputer in a fifth embodiment.

A microcomputer 60 of the fifth embodiment executes flow charts shown in FIGS. 37 and 38 instead of flow charts shown in FIGS. 2, 3, 18 through 28 described in the second embodiment. The other structures of the fifth embodiment are the same as the second embodiment.

In FIG. 37, sensor voltages VTA1 and VTA2 converted into digital signals are fed to microcomputer 60 at step 610. At step 620, first and second detected depression amounts TA1(n) and TA2(n) are calculated based on sensor voltages VTA1 and VTA2. In addition, first and second IDL depression amounts TAIDL1 and TAIDL2 are calculated from sensor voltages VTA1 and VTA2, respectively, when IDLSW 20 outputs an ON signal.

At step 630, it is determined if first detected depression amount TA1(n) is equal to second detected depression amount TA2(n). When TA1(n)=TA2(n), since both first and second accelerator sensors 40 and 40A can be assumed to be normal, a final detected depression amount TA is determined at step 690a by choosing a minimum value of TA1 and TA2 in order to drive electrical motor M safely.

When TA1(n)≠TA2(n), the difference between TA1(n) and TA2(n) is substituted for K20 at step 631. At step 640, it is determined if the difference between previous TA1(n-1) and previous TA2(n-1) is equal to K20. If TA1(n-1)-TA2(n-1)=K20, it is assumed that first sensor voltage VTA1 is changing in parallel to second sensor voltage VTA2. In this case, it is further determined at step 650 if first IDL depression amount TAIDL1 is greater than a positive constant value K21. When TAIDL1>K21, since it is assumed that the sensor voltage VTA1 abnormally deviates toward the plus direction from second sensor voltage VTA2, first detected depression amount TA1 is corrected at step 651. That is, TA1 is calculated according to the following equation (32).

$$TA1=TA1(n)-K21 \quad (32)$$

In addition, second detected depression amount TA2 is updated so as to be TA2(n) at step 651.

When TAIDL1≦K21, it is further determined at step 660 if first IDL depression amount TAIDL1 is greater than a negative constant value K22. When TAIDL1≦K22, since it is assumed that the sensor voltage VTA1 abnormally deviates toward the minus direction from second sensor voltage VTA2, first detected depression amount TA1 is corrected at step 661. That is, TA1 is calculated according to the following equation (33).

$$TA1=TA1(n)+K22 \quad (33)$$

In addition, second detected depression amount TA2 is updated so as to be TA2(n) at step 661.

When TAIDL1>K22 at step 660, it is further determined at step 670 if second IDL depression amount TAIDL2 is greater than a positive constant value K21. When TAIDL2≦K21, since it is assumed that the sensor voltage VTA2 abnormally deviates toward the plus direction from first sensor voltage VTA1, second detected depression amount TA2 is corrected at step 671. That is, TA2 is calculated according to the following equation (34).

$$TA2=TA2(n)-K21 \quad (34)$$

In addition, first detected depression amount TA1 is updated so as to be TA1(n) at step 671.

When TAIDL1≦K21 at step 670, it is further determined at step 680 if second IDL depression amount TAIDL2 is greater than a negative constant value K22. When TAIDL2≦K22, since it is assumed that the sensor voltage VTA2 abnormally deviates toward the minus direction from first sensor voltage VTA1, second detected depression amount TA2 is corrected at step 681. That is, TA2 is calculated according to the following equation (35).

$$TA2=TA2(n)+K22 \quad (35)$$

In addition, first detected depression amount TA1 is updated so as to be TA1(n) at step 681.

After the processing of step 651, 661, 671 or 681 is completed, an alarm light L is lit at step 690.

After that, a final detected depression amount TA is determined at step 690a by choosing a minimum value of TA1 and TA2. Further, microcomputer 60 executes a processing to calculate an output signal to motor M based on the final detected depression amount TA calculated in FIGS. 37 and 38.

As described above, when either first or second accelerator sensor 40 or 40a has an abnormality so that sensor voltage VTA1 or VTA2 deviates in parallel to a normal sensor voltage output, detected depression amount TA1 or TA2 is corrected by its sensor voltage deviation. Therefore, motor M can be safely and properly driven without a sudden change of a vehicle running state.

(Sixth Embodiment)

Next, a sixth embodiment of the present embodiment is explained with reference to FIGS. 39 and 40.

Figure 39:
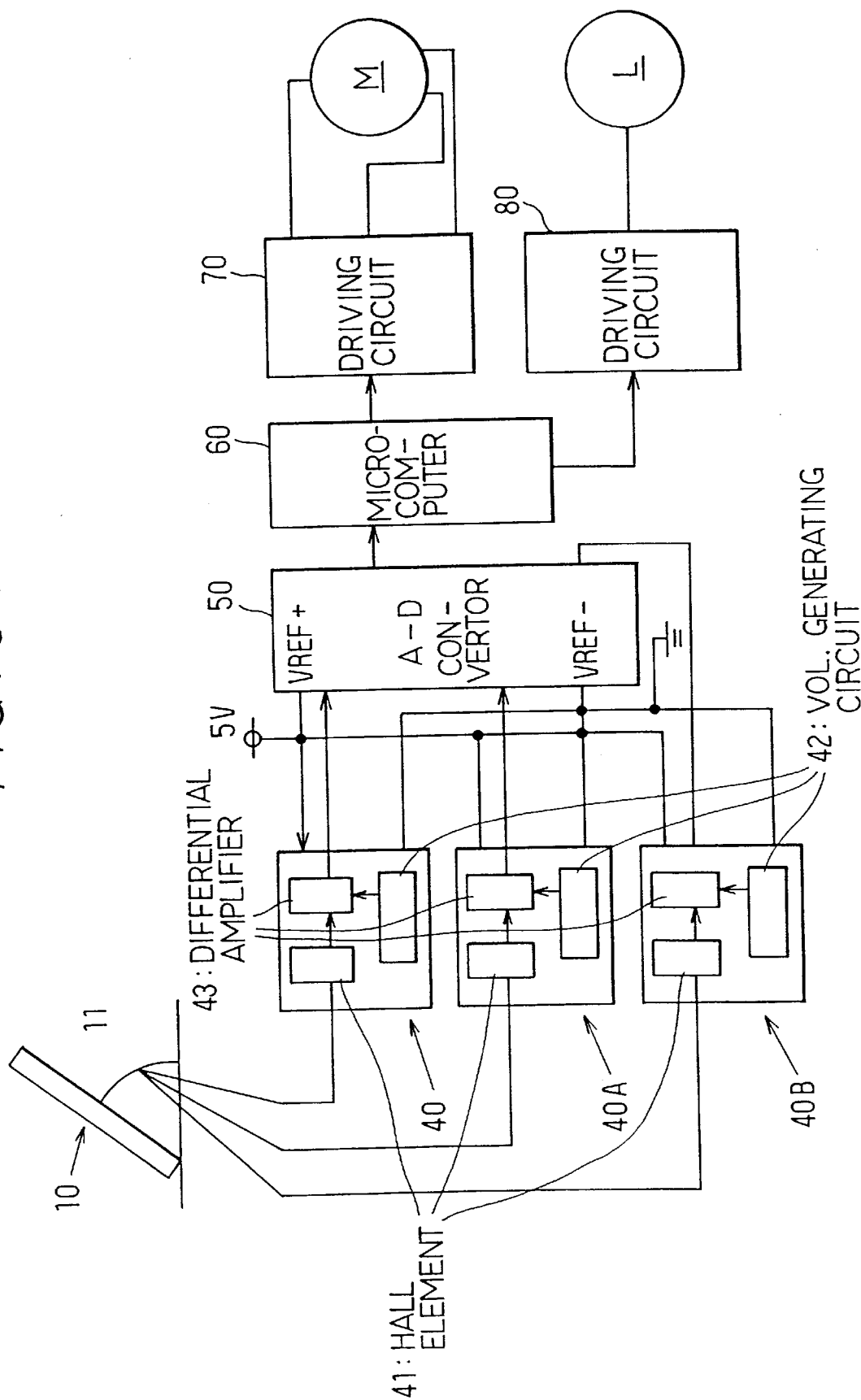
FIG. 39 is a block diagram illustrating a vehicular control device according to a sixth embodiment of the present invention.

As shown in FIG. 39, a control circuit of the sixth embodiment has a third accelerator sensor 40B in addition to first and second accelerator sensors 40 and 40A. Third accelerator sensor 40B has the same structure and function as first accelerator sensor 40 described in the first embodiment. In the sixth embodiment, a sensor voltage of third accelerator sensor 40B is represented by VTA3. An analog-digital convertor 50 converts all of the sensor voltages VTA1, VTA2 and VTA3 into digital signals.

Figure 40:
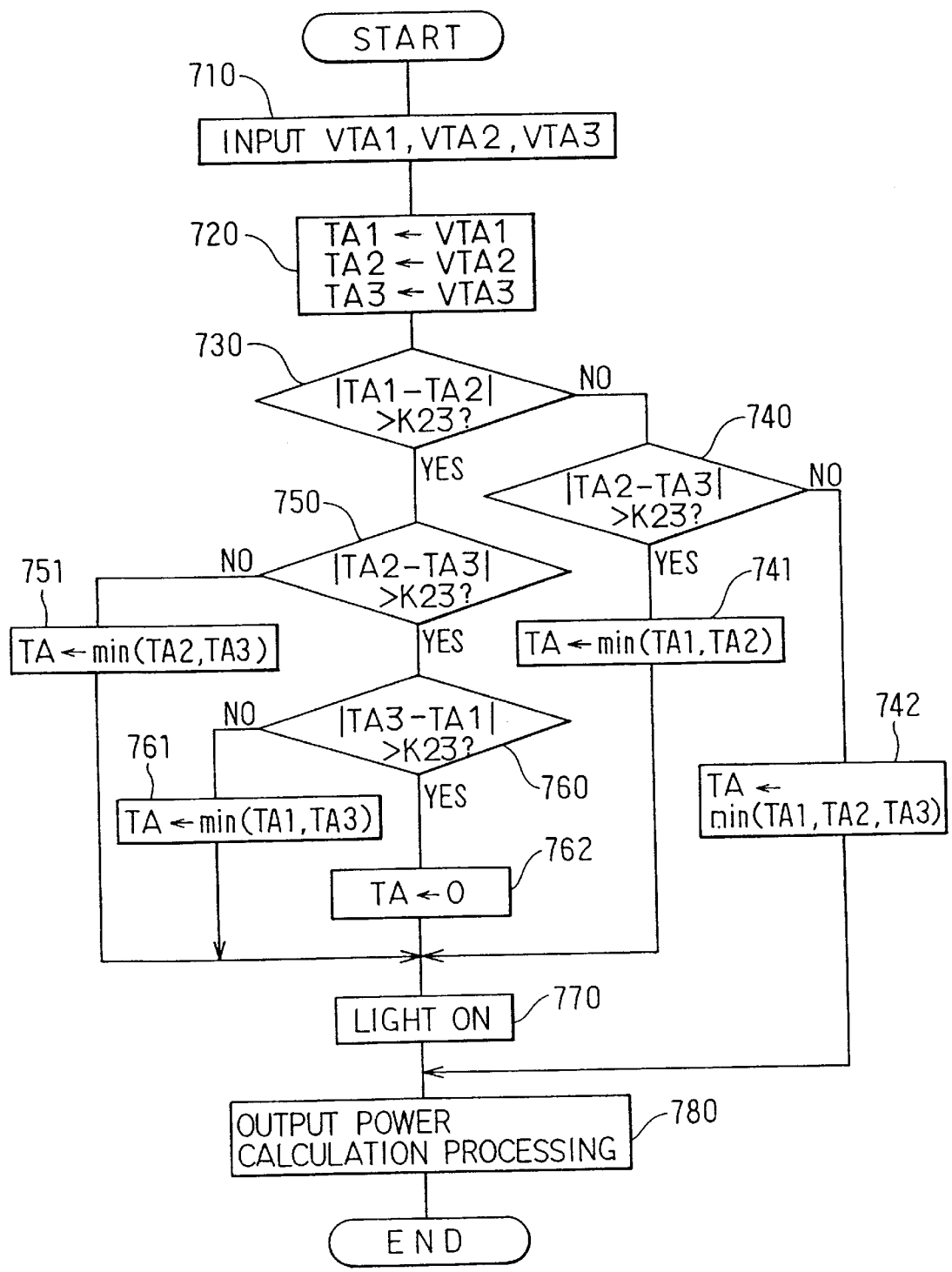
FIG. 40 is a flow chart illustrating a process performed by a microcomputer shown in FIG. 39.
Figure 41A:
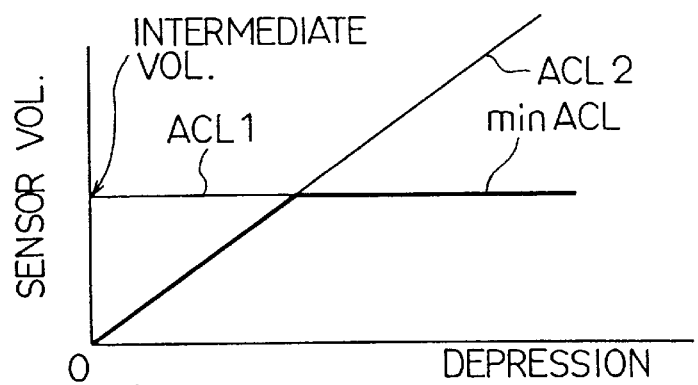
FIGS. 41A to 41C are graphs to explain disadvantages of prior art.
Figure 41B:
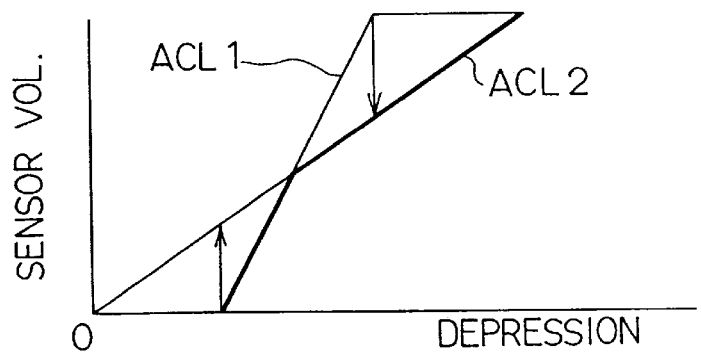
Figure 41C:
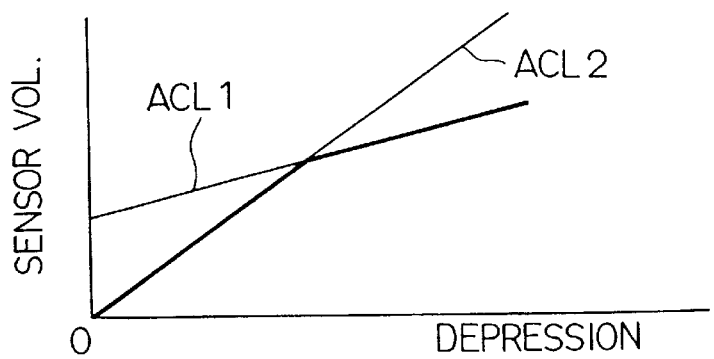

A microcomputer 60 of the sixth embodiment executes the flow chart shown in FIG. 40 instead of flow charts shown in FIGS. 2, 3, 18 through 28 described in the second embodiment. In the sixth embodiment, IDLSW 20 and PSW 30 are eliminated. The other structures of the sixth embodiment are the same as the second embodiment.

In FIG. 40, sensor voltages VTA1, VTA2 and VTA3 converted into digital signals are fed to microcomputer 60 at step 710. At step 720, first, second and third aimed depression amounts TA1, TA2 and TA3 are calculated based on sensor voltages VTA1, VTA2 and VTA3, respectively, according to the foregoing equation (5).

If the absolute value of the difference between TA1 and TA2 is less than a constant value K23 (a predetermined upper limit) and the absolute value of the difference between TA2 and TA3 is also less than the constant value K23, since it can be assumed that all of accelerator sensors 40, 40A and 40B are normal, a final detected depression amount TA is determined by choosing a minimum value of TA1, TA2 and TA3 (steps 730, 740 and 750).

If |TA2-TA3|>K23 at step 740, since only first and second accelerator sensors 40 and 40A are assumed to be normal, a final detected depression amount TA is determined by choosing a minimum value of TA1 and TA2 at step 741.

If |TA1-TA2|>K23 at step 730, either first or second accelerator sensor 40 or 40A is assumed to be abnormal. At step 750, the absolute value of the difference between TA2 and TA3 is compared with the constant value K23. If |TA2-TA3|≦K23 at step 750, since first accelerator sensor 40 is assumed to be abnormal, a final detected depression amount TA is determined by choosing a minimum value of TA2 and TA3 at step 751.

When |TA2-TA3|>K23 at step 750, it is further determined at step 760 if the absolute value of the difference between TA3 and TA1 is greater than the constant value K23. If |TA3-TA1|≦K23 at step 760, since second accelerator sensor 40A is assumed to be abnormal, a final detected depression amount TA is determined by choosing a minimum value of TA1 and TA3 at step 761. When |TA3−TA1|>K23 at step 760, since it is impossible to determine which accelerator sensor is abnormal, a final detected depression amount TA is set to 0 at step 762.

After the processing of step 741, 751, 761 or 762 is completed, an alarm light L is lit at step 770.

At step 780, microcomputer 60 executes a processing to calculate an output signal to motor M based on the final detected depression amount TA calculated in FIG. 40.

As described above, even when one of first, second and third accelerator sensors 40, 40A and 40B has an abnormality, an abnormal accelerator sensor can be determined without IDLSW 20 and PSW 30 by comparing first, second and third detected depression amounts TA1, TA2 and TA3 to each other. Therefore, the motor M can be safely and properly driven without a sudden change of a vehicle running state.

Each step of flow charts in all of the embodiments can be realized by logic circuits.

The present invention can be applied to not only an electrical vehicle but also a vehicle having an internal combustion engine. In this case, an accelerator sensor can detect not only a depression of an accelerator pedal but also an opening degree of a throttle valve for an engine or the like.

An accelerator sensor is not limited to a Hall element, can be formed from the other element which can detect a depression of an accelerator pedal without contacting it.

Furthermore, for those embodiments which cannot detects all modes of failure of the accelerator sensor, several embodiments detecting different failure modes can be combined together.

What is claimed is:

1. A vehicular control device in a vehicle having a driving power generating device and an accelerator mechanism, comprising:

means for detecting an accelerator mechanism operation amount without contacting said accelerator mechanism;

means for detecting an accelerator mechanism first position corresponding to an accelerator mechanism minimum operation amount;

means for detecting an accelerator mechanism second position corresponding to an accelerator mechanism maximum operation amount;

means for determining whether said operation amount detected is abnormal based on said operation amount detected by said detecting means when first position detecting means and said second position detecting means detect said first and second positions of said acceleration mechanism respectively;

means for correcting an abnormal operation amount when detected, said correcting means being responsive to both a difference between said operation amount detected by said detecting means when said first position detection means detects said accelerator mechanism in said first position and a predetermined normal operation amount corresponding to said accelerator mechanism in said first position and a difference between said operation amount detected by said detecting means when said second position detection means detects said accelerator mechanism in said second position and a predetermined normal operation amount corresponding to said accelerator mechanism in said second position; and means for controlling said generating device as a function of said corrected operation amount.

2. A vehicular control device according to claim 1, wherein said controlling means limits a changing speed of a control signal provided to said driving power generating device to below a predetermined upper limit when said difference between said operation amount detected when said accelerator mechanism is moved to said first or second position and a predetermined normal operation amount at that time is out of a predetermined range.

3. A vehicular control device in a vehicle having a driving power generating device and an acceleration mechanism, comprising:

a plurality of means for detecting an accelerator mechanism operation amount without contacting said accelerator mechanism;

means for detecting an accelerator mechanism first position corresponding to an accelerator mechanism minimum operation amount;

means for detecting an accelerator mechanism second position corresponding to an accelerator mechanism maximum operation amount;

means for determining whether each accelerator mechanism operation amount detected by said plurality of accelerator detecting means is abnormal based on each operation amount detected by said plural detecting means when said first and second position detecting means detect said first and second positions of said accelerator mechanism, respectively;

means for correcting said operation amount, when abnormal, said correcting means being responsive to both a difference between said abnormal operation amount when said accelerator mechanism is in said first position and a predetermined normal operation amount corresponding to said accelerator mechanism in said first position and a difference between said abnormal operation amount when said accelerator mechanism is in said second position and a predetermined normal operation amount corresponding to said accelerator mechanism in said second position; and means for controlling said generating device as a function of at least one of said operation amounts determined to be normal and said corrected operation amount.

4. A vehicular control device according to claim 3, wherein said controlling means limits a changing speed of a control signal provided to said driving power generating device to below a predetermined upper limit when said difference between said operation amount detected when said accelerator mechanism is moved to said first or second position and a predetermined normal operation amount at that time is out of a predetermined range.

5. A vehicular control device applied to a vehicle having a driving power generating device comprising:

first and second accelerator detecting means for detecting an operation amount of an accelerator mechanism of a vehicle without contacting said accelerator mechanism;

minimum position detecting means for detecting a minimum position corresponding to a minimum operation amount of said accelerator mechanism;

determining means for determining whether a sensitivity of said first accelerator detecting means or said second accelerator detecting means is smaller than a normal sensitivity by monitoring said operation amounts detected by said first accelerator detecting means and said second accelerator detecting means when said minimum position detecting means detects said minimum position of said accelerator mechanism;

selecting means for selecting a minimum value of said operation amounts detected by said first and second accelerator detecting means in a range in which both of said operation amounts are smaller than an intermediate value of said operation amount and for selecting a maximum value of said operation amounts detected by said first and second accelerator detecting means in a range in which both of said operation amounts are larger than an intermediate value of said operation amount, when said sensitivity of said first accelerator detecting means or said second accelerator detecting means is determined to be smaller; and control means for controlling said driving power generating device as a function of said value selected by said selecting means.

6. A vehicular control device according to claim 5, wherein said determining means includes:

comparing means for comparing said operation amount detected by said first accelerator detecting means and said operation amount detected by said second accelerator detecting means, magnitude relation determining means for determining whether a magnitude relation of said operation amount detected by said first accelerator detecting means and said operation amount detected by said second accelerator detecting means reverses responsive to an operation of said accelerator mechanism, and activating means for activating said selecting means when said magnitude relation is determined to reverse.

7. A vehicular control device applied to a vehicle having a driving power generating device comprising:

first and second accelerator detecting means for detecting an operation amount of an accelerator mechanism of a vehicle without contacting said accelerator mechanism;

determining means for determining whether the operation amounts detected by said first and second accelerator detecting means continue to detect an intermediate value of said operation amount for a predetermined time period;

selecting means for selecting said operation amount of said accelerator detecting means of which said operation amount changes within said predetermined time period, when said determining means determines that one of first and second accelerator detecting means continues to detect said intermediate value; and control means for controlling said driving power generating device as a function of said operation value selected by said selecting means when said determining means determines that one of first and second accelerator detecting means continues to detect said intermediate value.

8. A vehicular control device applied to a vehicle having a driving power generating device comprising:

first, second and third accelerator detecting means for detecting an operation amount of an accelerator mechanism of a vehicle without contacting said accelerator mechanism;

first determining means for determining whether a difference of said operation amounts detected by said first and second accelerator detecting means is greater than a predetermined upper limit;

second determining means for determining whether a difference of said operation amounts detected by said second and third accelerator detecting means is greater than said predetermined upper limit;

third determining means for determining whether a difference of said operation amounts detected by said third and first accelerator detecting means is greater than said predetermined upper limit;

first setting means for setting a minimum value of said operation amounts detected by said first and second accelerator detecting means as a normal value when said first determining means determines that said difference is less than or equal to said predetermined upper limit and said second determining means determines that said difference is greater than said predetermined upper limit;

second setting means for setting a minimum value of said operation amounts detected by said second and third accelerator detecting means as a normal value when said first determining means determines that said difference is greater than said predetermined upper limit and said second determining means determines that said difference is less than or equal to said predetermined upper limit;

third setting means for setting a minimum value of said operation amounts detected by said third and first accelerator detecting means as a normal value when said first and second determining means determine that said difference is greater than said predetermined upper limit and said third determining means determines that said difference is less than or equal to said predetermined upper limit; and control means for controlling said driving power generating device as a function of said minimum value set by said first, second or third setting means.

9. A vehicular control device applied to a vehicle having a driving power generating device comprising:

first and second accelerator detecting means for detecting an operation amount of an accelerator mechanism of a vehicle without contacting said accelerator mechanism;

determining means for determining whether a sensitivity of each of said first and second accelerator detecting means is smaller or larger than a normal sensitivity;

first selecting means for selecting said operation amount detected by said first accelerator detecting means when said determining means determines that said sensitivity of said second accelerator detecting means is smaller or larger than said normal sensitivity;

second selecting means for selecting said operation amount detected by said second accelerator detecting means when said determining means determines that said sensitivity of said first accelerator detecting means is smaller or larger than said normal sensitivity; and control means for controlling said driving power generating device as a function of said value selected by said first and second selecting means.

10. A vehicular control device according to claim 9, wherein said determining means has a minimum position detecting means for detecting a minimum position corresponding to a minimum operation amount of said accelerator mechanism, said determining means determines that said sensitivity is smaller, when said operation amount detected by said first or second accelerator detecting means when said minimum position detecting means detects said minimum position of said accelerator mechanism is greater than a predetermined upper limit.

11. A vehicular control device according to claim 9, wherein said determining means further comprises:
- means for detecting a minimum position corresponding to an accelerator mechanism minimum operation amount, wherein
- said determining means determines that said sensitivity is larger, when said operation amount detected by said first or second accelerator detecting means when said minimum position detecting means detects said minimum position of said accelerator mechanism is lower than a predetermined lower limit.

12. A vehicular control device according to claim 9, wherein said determining means further comprises:
- means for detecting a minimum position corresponding to a minimum operation amount of said accelerator mechanism and means for detecting a maximum position corresponding to a maximum operation amount of said accelerator mechanism, wherein
- said determining means determines whether said sensitivity is smaller or larger than the normal sensitivity, based on said detected minimum and maximum operation amount.

13. A vehicular control device applied to a vehicle having a driving power generating device comprising:
- accelerator detecting means for detecting an operation amount of an accelerator mechanism of a vehicle without contacting said accelerator mechanism;
- deviation determining means for determining whether a relation of said operation amount detected by said accelerator detecting means to an operation of said accelerator mechanism deviates from a predetermined normal relation;
- correction means for correcting said detected operation amount by a deviation from said predetermined normal relation in order to cause said relation of said operation amount against said operation of said accelerator mechanism to match said predetermined normal relation; and
- control means for controlling said driving power generating device as a function of said operation amount corrected by said correction means.

14. A vehicular control device according to claim 13, wherein said deviation determining means has a minimum position detecting means for detecting a minimum position corresponding to a minimum operation amount of said accelerator mechanism, said deviation determining means determines that said relation of said operation amount detected by said accelerator detecting means to an operation of said accelerator mechanism deviates from a predetermined normal relation, when said operation amount detected by said accelerator detecting means is out of a predetermined range when said minimum position detecting means detects said minimum position of said accelerator mechanism.

15. A vehicular control device according to claim 14, wherein said deviation determining means has a maximum position detecting means for detecting a maximum position corresponding to a maximum operation amount of said accelerator mechanism, said correction means corrects said detected operation amount responsive to a difference of said operation amount detected when said minimum position detecting means detects said minimum position and a predetermined normal value at that time, and a difference of said operation amount detected when said maximum position detecting means detects said maximum position and a predetermined normal value at that time.

16. A vehicular control device according to claim 13, wherein said accelerator detecting means has first and second detecting means which detects operation amount of an accelerator mechanism separately, said control means controls said driving power generating device as a function of a minimum value of said operation amounts of said first and second detecting means.

17. A vehicular control device according to claim 13, wherein said control means limits a changing speed of a control signal provided to said driving power generating device to below a predetermined upper limit when said difference between said operation amount detected when said accelerator mechanism is moved to said predetermined position and a predetermined normal operation amount at that time is out of a predetermined range.

18. A vehicular control device in a vehicle having a driving power generating device and an accelerator mechanism, comprising:
- an accelerator sensor element constructed and arranged to detect an accelerator mechanism operation amount without contacting said accelerator mechanism;
- a limit sensor mechanism constructed and arranged to detect an accelerator mechanism first position corresponding to an accelerator mechanism minimum operation amount and an accelerator mechanism second position corresponding to an accelerator mechanism maximum operation amount; and
- a computer which determines whether said operation amount detected by said accelerator sensor element is abnormal based on said operation amount detected by said accelerator sensor element when said limit sensor mechanism detects said accelerator mechanism in said first and second positions of said accelerator mechanism, respectively;
- said computer deriving a corrected operation amount for correcting an abnormal operation amount when detected, said computer being responsive to both a difference between said operation amount detected by said accelerator sensor element when said limit sensor mechanism detects said accelerator mechanism in said first position and a predetermined normal operation amount corresponding to said accelerator mechanism in said first position and a difference between said operation amount detected by said accelerated sensor element when said limit sensor mechanism detects said accelerator mechanism in said second position and a predetermined normal operation amount corresponding to said accelerator mechanism in said second position;
- said computer controlling said power generating device as a function of said corrected operation amount.

19. A vehicular control device according to claim 18, wherein said computer limits a changing speed of a control signal provided to said driving power generating device to below a predetermined upper limit when said difference between said operation amount detected when said accelerator mechanism is moved to said first or second position and a predetermined normal operation amount at that time is out of a predetermined range.

20. A vehicular control device applied to a vehicle having a driving power generating device and an accelerator mechanism, comprising:
- a first and a second accelerator sensor, each detecting an operation amount of said accelerator mechanism;
- a minimum position detecting sensor which detects a minimum position of said accelerator mechanism corresponding to a minimum operation amount; and a computer which determines whether a sensitivity of said first accelerator sensor or said second accelerator sensor is smaller than a normal sensitivity by monitoring said operation amounts detected by said first and second accelerator sensors when said minimum position detecting sensor detects said minimum position of said accelerator mechanism;

said computer selecting a minimum value of said operation amounts detected by said first and second accelerator sensors in a range in which both of said operation amounts are smaller than an intermediate value of said operation amount and selecting a maximum value of said operation amounts detected by said first and second accelerator sensors in a range in which both of said operation amounts are larger than an intermediate value of said operation amount, when said sensitivity of said first or second accelerator sensors is determined to be smaller;

said computer controlling said driving power generating device as a function of said value selected by said computer.

21. A vehicular control device according to claim 20, wherein said computer also compares said operation amount detected by said first accelerator sensor and said operation amount detected by said second accelerator sensor, determines whether a magnitude relation of said operation amount detected by said first accelerator sensor and said operation amount detected by said second accelerator detecting sensor reverses responsive to an operation of said accelerator mechanism, and selects said minimum value and maximum value of said operation amounts when said magnitude relation is determined to reverse.

22. A vehicular control device applied to a vehicle having a driving power generating device comprising:

first and second accelerator sensors for detecting an operation amount of an accelerator mechanism of a vehicle without contacting said accelerator mechanism; and a computer which determines whether the operation amounts detected by said first and second accelerator sensors continue to detect an intermediate value of said operation amount for a predetermined time period;

said computer selecting said operation amount of said accelerator sensor of which said operation amount changes within said predetermined time period, when said computer determines that one of said first and second accelerator sensors continues to detect said intermediate value;

said computer controlling said driving power generating device as a function of said operation value selected when said computer determines that one of first and second accelerator sensors continues to detect said intermediate value.

* * * * *